US012361893B2

(12) United States Patent
Kim et al.

(10) Patent No.: US 12,361,893 B2
(45) Date of Patent: Jul. 15, 2025

(54) ELECTRONIC DEVICE FOR DISPLAYING CONTENT ON BASIS OF PLURALITY OF SCANNING RATES AND OPERATING METHOD THEREFOR

(71) Applicant: Samsung Electronics Co., Ltd., Suwon-si (KR)

(72) Inventors: Seungjin Kim, Suwon-si (KR); Minwoo Lee, Suwon-si (KR); Joonyung Park, Suwon-si (KR); Gwanghui Lee, Suwon-si (KR); Juseok Lee, Suwon-si (KR); Woojun Jung, Suwon-si (KR); Mooyoung Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/467,166

(22) Filed: Sep. 14, 2023

(65) Prior Publication Data

US 2024/0005876 A1   Jan. 4, 2024

Related U.S. Application Data

(63) Continuation of application No. PCT/KR2022/001152, filed on Jan. 21, 2022.

(30) Foreign Application Priority Data

Mar. 17, 2021  (KR) .................. 10-2021-0034900

(51) Int. Cl.
*G09G 3/3266* (2016.01)
*G06F 3/041* (2006.01)
(Continued)

(52) U.S. Cl.
CPC ......... *G09G 3/3266* (2013.01); *G06F 3/0416* (2013.01); *G06F 3/04166* (2019.05);
(Continued)

(58) Field of Classification Search
CPC ......... G06T 2207/20221; G06T 3/4038; G06T 5/50; G06T 15/205; G06T 2207/20021;
(Continued)

(56) References Cited

U.S. PATENT DOCUMENTS 10,974,142 B1 *   4/2021  Cerny ................... A63F 13/335
2005/0093886 A1 *   5/2005  Kubota ................ H04N 1/3872
345/619
(Continued)

FOREIGN PATENT DOCUMENTS

CN    104238977 A    12/2014
CN    106933526 A     7/2017
(Continued)

OTHER PUBLICATIONS

International Search Report dated Apr. 26, 2022, issued in International Patent Application No. PCT/KR2022/001152.
(Continued)

*Primary Examiner* — Dismery Mercedes
(74) *Attorney, Agent, or Firm* — Jefferson IP Law, LLP

(57) ABSTRACT

An electronic device is provided. The electronic device includes a display driver integrated circuit (IC), a display and a processor configured to receive an interrupt signal from the display driver IC based on a plurality of scanning rates set to a plurality of regions of the display, obtain a plurality of vertical synchronization signals associated with a plurality of regions, based on the received interrupt signal, obtain pieces of content to be displayed in a plurality of regions based on the plurality of vertical synchronization signals, synthesize content based on the coordinate infor-
(Continued)

mation about the pieces of content, and transmit, to the display driver IC, information about the synthesized pieces of content and information about the remaining pieces of the synthesized content so the synthesized pieces of content and the remaining pieces of the synthesized content are displayed in the plurality of regions.

20 Claims, 26 Drawing Sheets

(51) Int. Cl.
| | |
|---|---|
| G06F 3/14 | (2006.01) |
| G09G 3/34 | (2006.01) |
| G09G 3/36 | (2006.01) |
| H04N 7/01 | (2006.01) |
| H04N 21/43 | (2011.01) |

(52) U.S. Cl.
CPC ......... G06F 3/1446 (2013.01); G09G 3/3426 (2013.01); G09G 3/3666 (2013.01); G09G 2310/04 (2013.01); G09G 2320/0686 (2013.01); G09G 2340/0407 (2013.01); G09G 2340/0435 (2013.01); G09G 2340/10 (2013.01); H04N 7/013 (2013.01); H04N 21/4302 (2013.01)

(58) Field of Classification Search
CPC ............. G09G 3/20; G09G 2340/0435; G09G 3/3266; G09G 2310/04; G09G 2310/0221; G09G 2340/04; G09G 2340/0407; G09G 3/3666; G09G 2320/0686; G09G 2320/0613; G09G 2360/122; G09G 5/391; G09G 3/3426; G09G 3/3225; G09G 3/2092; G09G 2340/10; G06F 3/147; G06F 3/1446; G06F 3/0416; H04N 21/4316; H04N 21/4312; H04N 7/0127; H04N 21/4302; H04N 5/06; H04N 5/21
See application file for complete search history.

(56) References Cited

U.S. PATENT DOCUMENTS

| | | | |
|---|---|---|---|
| 2005/0140695 A1 | 6/2005 | Dunton et al. | |
| 2008/0192060 A1* | 8/2008 | Ogiso | G09G 5/399 |
| | | | 345/546 |
| 2011/0032231 A1* | 2/2011 | Maruyama | G09G 3/2096 |
| | | | 345/208 |
| 2011/0193892 A1 | 8/2011 | Eom | |
| 2012/0162238 A1 | 6/2012 | Fleck et al. | |
| 2014/0232835 A1* | 8/2014 | Kojima | H04N 13/261 |
| | | | 348/54 |
| 2014/0307168 A1 | 10/2014 | Law et al. | |
| 2016/0277735 A1 | 9/2016 | Lee et al. | |
| 2017/0295343 A1 | 10/2017 | Konishi et al. | |
| 2017/0301057 A1 | 10/2017 | Metcalfe | |
| 2018/0081525 A1* | 3/2018 | Wang | G06F 3/04845 |
| 2019/0122327 A1* | 4/2019 | Jeon | G09G 5/18 |
| 2019/0182563 A1* | 6/2019 | Jung | G06F 3/167 |
| 2020/0004491 A1 | 1/2020 | Seo et al. | |
| 2020/0258454 A1 | 8/2020 | Wang et al. | |
| 2021/0019011 A1* | 1/2021 | Kitagawa | G02F 1/13338 |
| 2021/0027707 A1 | 1/2021 | Park et al. | |
| 2021/0035524 A1 | 2/2021 | Chun et al. | |
| 2021/0055848 A1 | 2/2021 | Bae et al. | |
| 2022/0066727 A1* | 3/2022 | Takaya | G09G 5/393 |
| 2022/0093034 A1* | 3/2022 | Noh | H04N 5/21 |
| 2022/0122543 A1* | 4/2022 | Wai | G09G 3/3266 |
| 2023/0116975 A1* | 4/2023 | Chen | G06F 9/451 |
| | | | 345/629 |
| 2023/0136814 A1* | 5/2023 | Kim | G09G 5/00 |
| | | | 345/204 |
| 2023/0386382 A1* | 11/2023 | Cai | G06F 3/0488 |

FOREIGN PATENT DOCUMENTS

| | | |
|---|---|---|
| CN | 111613181 A | 9/2020 |
| EP | 3 920 172 A1 | 12/2021 |
| JP | H01-280790 A2 | 11/1989 |
| JP | 2017-191187 A | 10/2017 |
| JP | 2019-211519 A | 12/2019 |
| JP | 2020-034869 A | 3/2020 |
| KR | 10-1031472 B1 | 4/2011 |
| KR | 10-1056434 B1 | 8/2011 |
| KR | 10-2014-0015278 A | 2/2014 |
| KR | 10-2015-0126976 A | 11/2015 |
| KR | 10-2019-0045764 A | 5/2019 |
| KR | 10-2019-0074776 A | 6/2019 |
| KR | 10-2020-0003596 A | 1/2020 |
| KR | 10-2021-0013477 A | 2/2021 |

OTHER PUBLICATIONS

Korean Office Action dated Oct. 17, 2024, issued in Korean Application No. 10-2021-0034900.
European Search Report dated Aug. 13, 2024, in European Application No. 22771590.1.

* cited by examiner

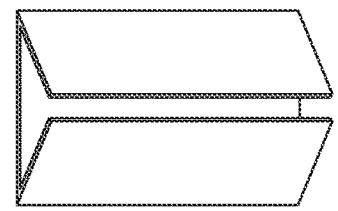
FIG. 2A
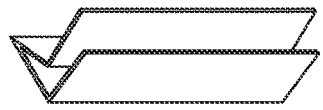
FIG. 2B
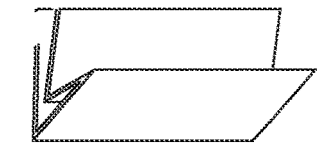
FIG. 2C
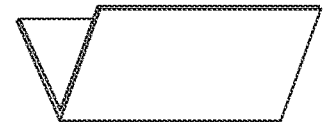
FIG. 2D
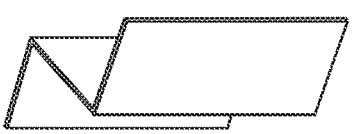
FIG. 2E
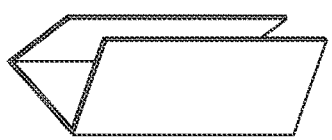
FIG. 2F
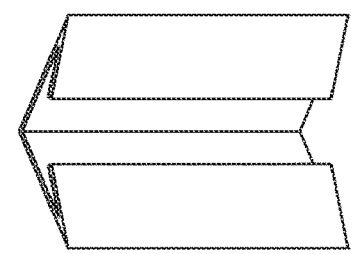
FIG. 2G
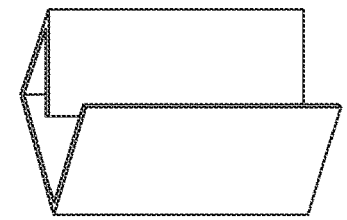
FIG. 2H
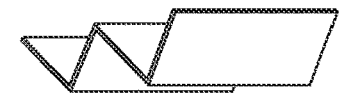
FIG. 2I
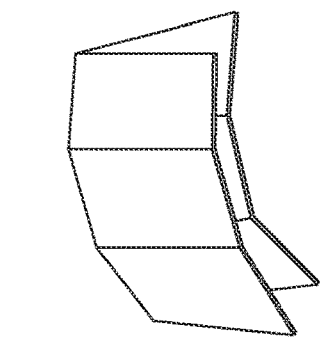
FIG. 2J
FIG. 2K

ELECTRONIC DEVICE FOR DISPLAYING CONTENT ON BASIS OF PLURALITY OF SCANNING RATES AND OPERATING METHOD THEREFOR

CROSS-REFERENCE TO RELATED APPLICATION(S)

This application is a continuation application, claiming priority under § 365(c), of an International application No. PCT/KR2022/001152, filed on Jan. 21, 2022, which is based on and claims the benefit of a Korean patent application number 10-2021-0034900, filed on Mar. 17, 2021, in the Korean Intellectual Property Office, the disclosure of which is incorporated by reference herein in its entirety.

BACKGROUND

1. Field

The disclosure relates to an electronic device for displaying a content based on multiple scanning rates and an operating method therefor.

2. Description of Related Art

As the demand for mobile communication increases and the degree of integration of an electronic device increases, portability of the electronic device, such as a mobile communication terminal, and the convenience in using multimedia functions may be improved. For example, as a touch screen function-integrated display replaces a mechanical (button-type) keypad of the related art, the electronic device may be reduced in size while maintaining an input device function. The removal of the mechanical keypad from the electronic device may improve portability of the electronic device. In an embodiment of the disclosure, in case that a display extends as much as an area where the keypad has been removed, the electronic device including the touch screen function may provide a bigger display than the electronic device including the mechanical keypad while having the same size and weight as the electronic device including the mechanical keypad.

The use of the electronic device outputting a bigger screen may provide convenience in using a web surfing or multimedia function. The electronic device may include a bigger display to output a bigger screen, but in terms of the portability of the electronic device, there may be restrictions on expanding a size of the display. In an embodiment of the disclosure, a display using an organic light-emitting diode may secure portability of an electronic device while providing a bigger screen. For example, the display using an organic light-emitting diode (or an electronic device including the display) may realize a stable operation even with fairly thin thickness and thus may be mounted on a foldable or bendable or a rollable electronic device.

Here, there is a need for a technology for providing a bigger screen and timely controlling a scanning rate for each area of a screen to reduce an operational burden caused by the provision of the bigger screen.

The above information is presented as background information only to assist with an understanding of the disclosure. No determination has been made, and no assertion is made, as to whether any of the above might be applicable as prior art with regard to the disclosure.

SUMMARY

As a display of an electronic device increases in size, the display may include a plurality of regions of which scanning rates are independently controllable. However, in case that the scanning rate is configured for each of the plurality of regions, a vertical synchronization signal may be generated as an interrupt caused at a cycle corresponding to a highest scanning rate among the configured scanning rates, and a content rendering operation may be performed based on the generated vertical synchronization signal. In this case, since the content rendering operation is performed even for regions configured with relatively low scanning rates, resources may be wasted unnecessarily, and a heat problem may be caused.

Aspects of the disclosure are to address at least the above-mentioned problems and/or disadvantages and to provide at least the advantages described below. Accordingly, an aspect of the disclosure is to provide an electronic device and an operating method for generating a vertical synchronization signal only for an area in which a content is to be updated (or display) based on information on a scanning rate configured for each of a plurality of regions based on a generated interrupt so as to prevent the waste of resources and address the heat issue. According to various embodiments of the disclosure, an electronic device and an operating method therefor may allow a processor to synthesize a portion of updated content and to transmit the synthesized content to a display panel so that an amount of data transmitted from the processor to the display panel may be reduced to reduce an operational burden. According to various embodiments of the disclosure, an electronic device and an operating method therefor may allow transmission of identification information (e.g., dead pixel information) for identifying an area to display a content instead of coordinate information so that an amount of data transmitted from the processor to the display panel may be reduced to reduce an operational burden.

Additional aspects will be set forth in part in the description which follows and, in part, will be apparent from the description, or may be learned by practice of the presented embodiments.

In accordance with an aspect of the disclosure, an electronic device is provided. The electronic device includes a display driver integrated circuit (IC), a display, and at least one processor, wherein the at least one processor is configured to receive an interrupt from the display driver IC based on a plurality of scanning rates configured for a plurality of regions of the display, obtain a plurality of vertical synchronization signals associated with a portion of the plurality of regions, based on the received interrupt, obtain content to be displayed on a portion of the plurality of regions based on the plurality of vertical synchronization signals, synthesize a portion of content based on the coordinate information on the content, and transfer, to the display driver IC, information on a portion of the synthesized content and information on a remaining portion of the synthesized content so that a portion of the synthesized content and the remaining portion of the synthesized content are displayed on a portion of the plurality of regions.

In accordance with another aspect of the disclosure, a method of operating an electronic device is provided. The method includes receiving an interrupt from the display driver IC based on a plurality of scanning rates configured for a plurality of regions of a display, obtaining a plurality of vertical synchronization signals associated with a portion of the plurality of regions, based on the received interrupt, obtaining content to be displayed on a portion of the plurality of regions based on the plurality of vertical synchronization signals, synthesizing a portion of content based on the coordinate information on the content, and transferring, to the display driver IC, information on a portion of the synthesized content and information on a remaining portion of the synthesized content so that a portion of the synthesized content and the remaining portion of the synthesized content are displayed on a portion of the plurality of regions.

In accordance with another aspect of the disclosure, an electronic device is provided. The electronic device includes a display driver IC, a display, and at least one processor configured to receive an interrupt from the display driver IC based on a plurality of scanning rates configured for a plurality of regions of the display, obtain at least one vertical synchronization signal associated with at least a portion of the plurality of regions (at least a portion of the plurality of regions are associated with a first frame) based on the received interrupt, obtain at least one content to be displayed on at least a portion of the plurality of regions during the first frame, based on the at least one vertical synchronization signal, and transfer, to the display driver IC, information on a portion of the at least one content so that a portion of the at least one content is displayed on at least a portion of the plurality of regions.

Other aspects, advantages, and salient features of the disclosure will become apparent to those skilled in the art from the following detailed description, which, taken in conjunction with the annexed drawings, discloses various embodiments of the disclosure.

Various embodiments of the disclosure may provide an electronic device and an operating method therefor which may generate a vertical synchronization signal only for an area in which a content is to be updated (or display) based on information on a scanning rate configured for each of a plurality of regions based on a generated interrupt so as to prevent the waste of resources and address the heat issue.

Various embodiments of the disclosure may provide an electronic device and an operating method therefor which may allow a processor to synthesize a portion of updated content and to transmit the synthesized content to a display panel so that an amount of data transmitted from the processor to the display panel may be reduced to reduce an operational burden.

Various embodiments of the disclosure may provide an electronic device and an operating method therefor which may allow transmission of identification information (e.g., dead pixel information) for identifying an area to display a content instead of coordinate information so that an amount of data transmitted from the processor to the display panel may be reduced to reduce an operational burden.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 2A, 2B, 2C, 2D, 2E, 2F, 2G, 2H, 2I, 2J, and 2K are diagrams illustrating an electronic device including at least two housing structures and a flexible display according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
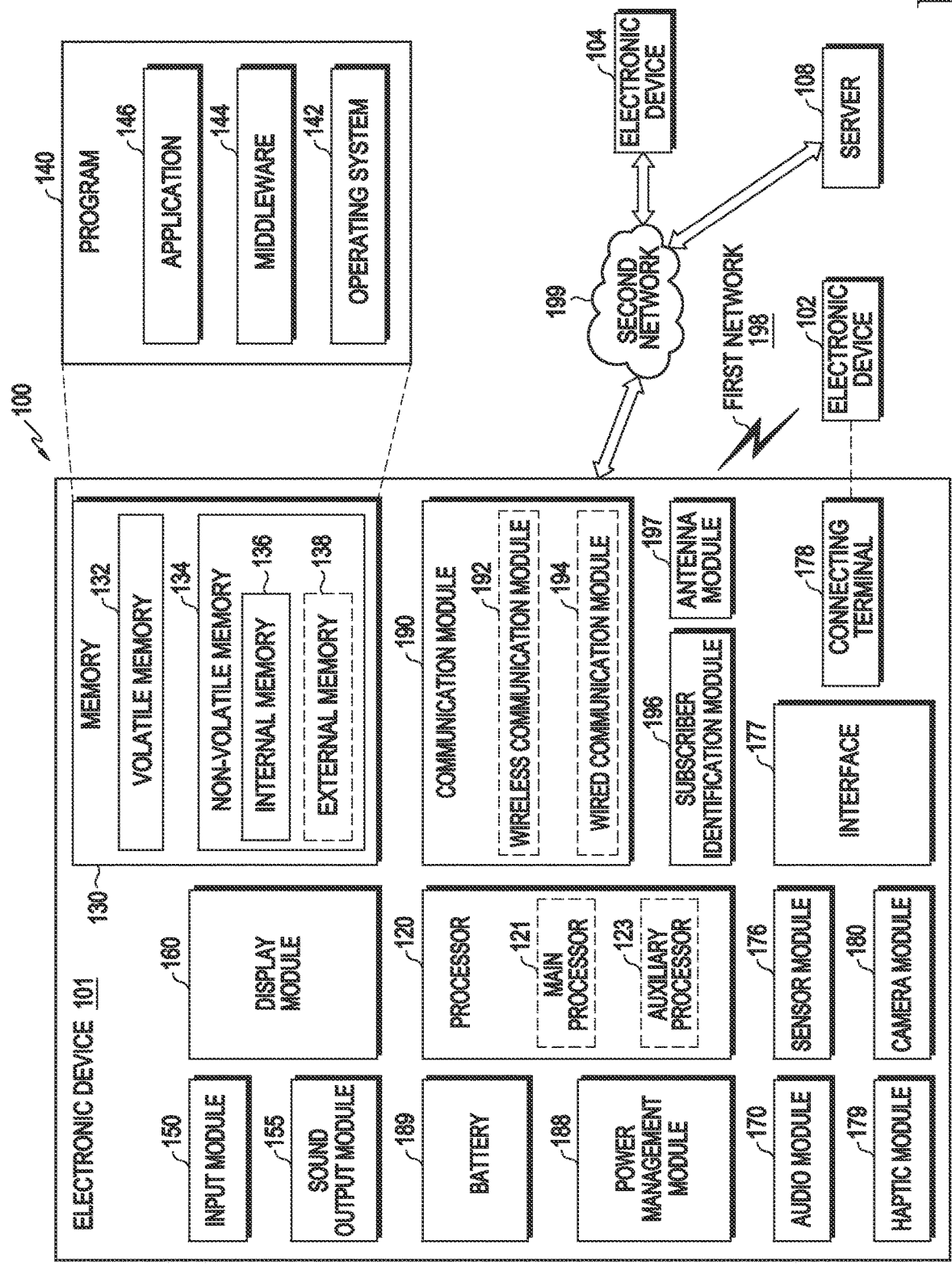
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, an electronic device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Hereinafter, examples of the above-described electronic device 101 according to various embodiments will be described.

FIGS. 2A, 2B, 2C, 2D, 2E, 2F, 2G, 2H, 2I, 2J, and 2K are diagrams illustrating an electronic device including at least two housing structures and a flexible display according to various embodiments of the disclosure.

According to various embodiments of the disclosure, the electronic device may include two or more housings, hinges to which the two or more housings are connected to be foldable, and a flexible display.

According to various embodiments of the disclosure, the flexible display may be disposed on the two or more housings and may curve depending on a rotation state of the housings. One side of the two or more housings is respectively connected to a connected hinge and the two or more housings may rotate around the hinge. The rotation state of the housings will be described below.

According to various embodiments of the disclosure, the electronic device may be formed in various shapes according to the two or more housing structures and the flexible display included in the electronic device and the rotation state of the housing structures.

Referring to FIGS. 2A, 2B, 2C, 2D, 2E, 2F, 2G, 2H, 2I, 2J, and 2K, the various shapes may include a shape for forming two regions on the electronic device (e.g., a flexible display) (half-fold (FIG. 2C)), a shape for forming three regions on the electronic device (e.g., a flexible display) (e.g., tri-fold (FIG. 2A), Z-fold (FIG. 2B), and single open gate-fold (FIG. 2F)), a shape for forming four regions on the electronic device (e.g., flexible display) (e.g., double parallel reverse fold (FIG. 2D), double parallel fold (FIG. 2F), double gate fold (FIG. 2G), roll fold (FIG. 2H), accordion fold (FIG. 2I), and half fold then half fold (FIG. 2J), and a shape for forming more than four regions on the electronic device (e.g., a flexible display) (e.g., half fold then tri fold (FIG. 2K)). The electronic device may include housing structures rotatably connected to each other and a flexible display, and the housing structures may rotate in a corresponding shape. According to an embodiment of the disclosure, in a case of an electronic device including at least two housings and at least two displays disposed in each housing, each display of the electronic device may form an angle with each other according to the rotation state of the housings.

Hereinafter, an electronic device and an operating method therefor according to various embodiments will be described taking an electronic device including two housings and a flexible display as an example. However, an operation of modifying and displaying a content of the electronic device described below may be applied to a description of an electronic device including three or more housings and a flexible display. Accordingly, the modified content displayed by the electronic device including three or more housings and a flexible display may be viewed by a user on a virtual plane.

Meanwhile, although the electronic devices have been described as having one display disposed on a plurality of housings, different displays may be provided on each of the plurality of housings. Accordingly, an electronic device and an operating method therefor to be described below according to various embodiments of the disclosure may be applied to a description of an electronic device including at least two housings and at least two displays disposed in each housing. For example, a description of an area of a flexible display corresponding to one housing hereinafter may be applied to a description of a display corresponding to one housing among a plurality of displays provided in an electronic device.

Hereinafter, an example of the electronic device 101 described with reference to FIG. 2 will be described.

Figure 3:
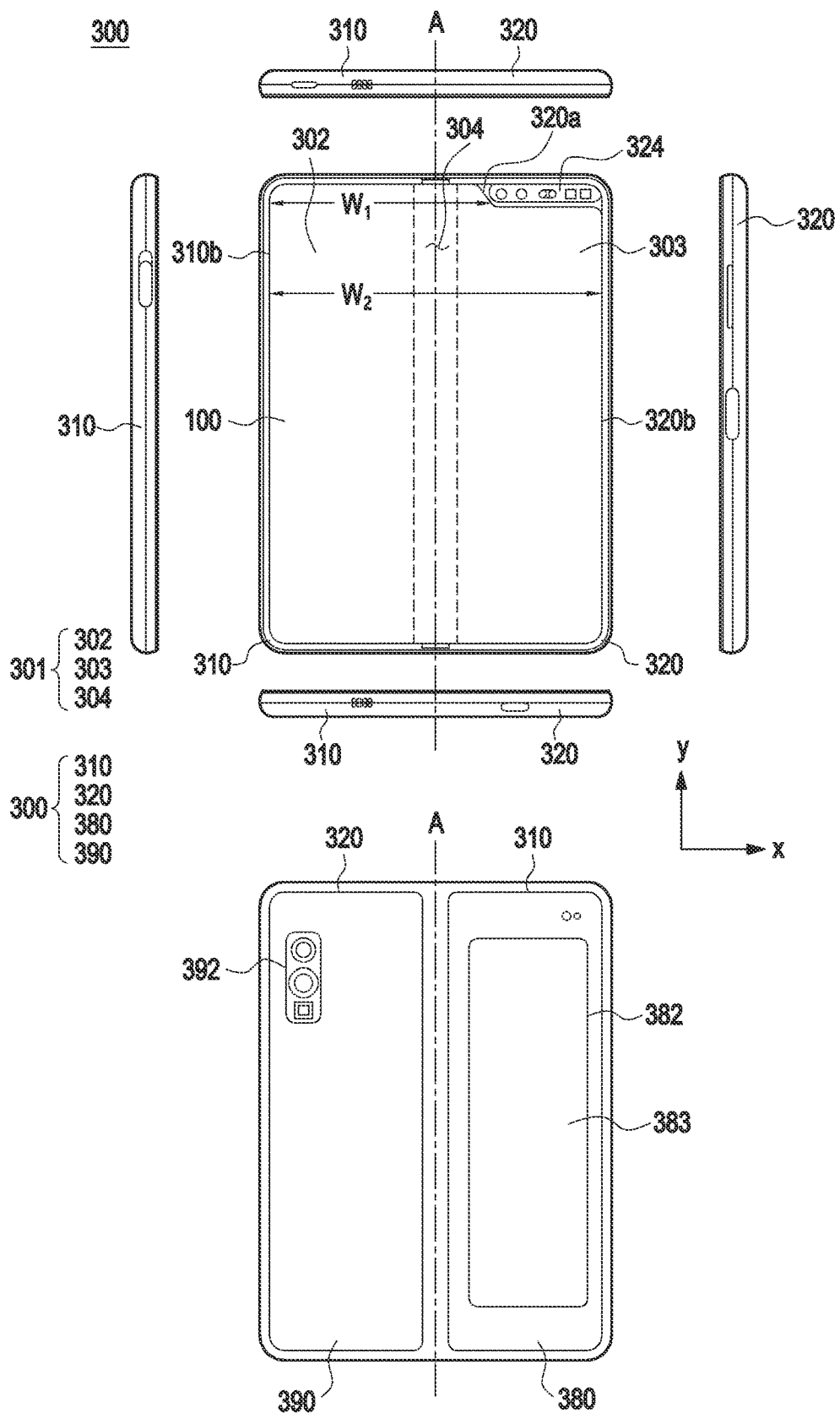
FIG. 3 is a diagram illustrating a unfolded state of an electronic device according to an embodiment of the disclosure.

FIG. 3 is a diagram illustrating an unfolded state of an electronic device according to an embodiment of the disclosure.

Referring to FIG. 3, in an embodiment of the disclosure, an electronic device 300 may include a foldable housing 305, a hinge cover 330 for covering a foldable area of the foldable housing, and a flexible or foldable display 301 (hereinafter, for short, "display" 301) disposed in a space formed by the foldable housing 305. In the disclosure, a surface on which the display 301 is disposed is defined as a first surface or a front surface of the electronic device 300. And the opposite surface thereof is defined as a second surface of a rear surface of the electronic device 300. In addition, a surface surrounding a space between the front surface and the rear surface is defined as a lateral surface of the electronic device 300.

In an embodiment of the disclosure, the foldable housing 305 may include a first housing structure 310, a second housing structure 320 including a sensor area 324, a first rear cover 380, and a second rear cover 390. The foldable housing 305 of the electronic device 300 is not limited to the shape and combination shown in FIG. 3, and may be implemented by another shape or a combination and/or coupling of components. For example, in another embodiment of the disclosure, the first housing structure 310 and the first rear cover 380 may be integrally formed and the second housing structure 320 and the second rear cover 390 may be integrally formed.

In an embodiment of the disclosure described herein, the first housing structure 310 and the second housing structure 320 are arranged opposite sides around a folding axis (A-axis) and have generally symmetric shapes with respect to folding axis A. As described below, an angle or a distance between the first housing structure 310 and the second housing structure 320 may be changed depending on whether the electronic device 300 is in an unfolded state, folded state, or intermediate state. In an embodiment of the disclosure, the second housing structure 320, unlike the first housing structure 310, may additionally include the sensor area 324 in which various sensors are disposed, but may have a symmetrical shape to the first housing structure in other regions.

In an embodiment of the disclosure, as shown in FIG. 3, the first housing structure 310 and the second housing structure 320 may form together a recess for receiving the display 301. In an embodiment of the disclosure, the recess may have two or more different widths in a direction perpendicular to folding axis A due to the sensor area 324.

For example, the recess may have (1) a first width w1 between a first portion 310a parallel to folding axis A in the first housing structure 310 and a first portion 320a formed at an edge of the sensor area 324 in the second housing structure 320 and may have (2) a second width w2 formed by a second portion 310b of the first housing structure 310 and a second portion 320b which is parallel to folding axis A while not corresponding to the sensor area 324 in the second housing structure 320. In this case, the second width w2 may be formed to be longer than the first width w1. In other words, the first portion 310a of the first housing structure 310 and the first portion 320a of the second housing structure 320 which have asymmetric shapes to each other may form the first width w1 of the recess, and the second portion 310b of the first housing structure 310 and the second portion 320b of the second housing structure 320 which have symmetric shapes to each other may form a second width w2 of the recess. As an embodiment of the disclosure, the first portion 320a and the second portion 320b of the second housing structure 320 may have different distances from folding axis A. The width of the recess is not limited to the embodiments described above. In various embodiments of the disclosure, the recess may have a plurality of widths due to the shape of the sensor area 324 or an asymmetric shaped portion of the first housing structure 310 and the second housing structure 320.

In an embodiment of the disclosure, at least a portion of the first housing structure 310 and the second housing structure 320 may be formed of a metal or non-metal material having a selected magnitude of strength for supporting the display 301.

In an embodiment of the disclosure, the sensor area 324 may be formed to have a predetermined area adjacent to one side corner of the second housing 320. However, the disposition, shape, and size of the sensor area 324 is not limited to the embodiment described above. For example, in another embodiment of the disclosure, the sensor area 324 may be provided on a different corner or on a predetermined area between the upper corner and the lower corner of the second housing structure 320. In an embodiment of the disclosure, various components embedded in the electronic device 300 for performing various functions may be exposed to the outside of the electronic device 300 through the sensor area 324 or at least one opening formed through the sensor area 324. In various embodiments of the disclosure, the components may include various sensors. The sensor may include, for example, at least one of a front camera, a receiver, or a proximity sensor.

The first rear cover 380 may be disposed on one side of the folding axis on the rear surface of the electronic device, and have, for example, a substantially rectangular periphery which may be surrounded by the first housing structure 310. Similarly, the second rear cover 390 may be disposed on the other side of the folding axis on the rear surface of the electronic device, and may have a periphery surrounded by the second housing structure 320.

In an embodiment of the disclosure, the first rear cover 380 and the second rear cover 390 may have substantially symmetrical shapes to each other with reference to the folding axis (A-axis). However, the first rear cover 380 and the second rear cover 390 do not necessarily have symmetric shapes and in other embodiment of the disclosure, the electronic device 300 may include the first rear cover 380 and the second rear cover 390 having various shapes. In another embodiment of the disclosure, the first rear cover 380 and the first housing structure 310 may be integrally formed and the second rear cover 390 and the second housing structure 320 may be integrally formed.

In an embodiment of the disclosure, the first rear cover 380, the second rear cover 390, the first housing structure 310, and the second housing structure 320 may form a space in which various components (e.g., a printed circuit board or a battery) of the electronic device 300 may be arranged. In an embodiment of the disclosure, one or more components may be arranged at or visually exposed through the rear surface of the electronic device 300. For example, at least a portion of a sub display 383 may be visually exposed through a first rear area 582 of the first rear cover 380. In another embodiment of the disclosure, one or more components or sensors may be visually exposed through a second rear area 392 of the second rear cover 390. In various embodiments of the disclosure, the sensor may include a proximity sensor and/or a rear camera.

The hinge cover 330 may be disposed between the first housing 310 and the second housing 320 and configured to cover an internal component (e.g., a hinge structure). In an embodiment of the disclosure, the hinge cover 330 may be covered or exposed through a portion of the first housing structure 310 and the second housing structure 320 according to a state (an unfolded state (flat state) or a folded state) of the electronic device 300.

By way of example, as shown in FIG. 3, in case that the electronic device 300 is in the unfolded state, the hinge cover 330 may be covered by the first housing structure 310 and the second housing structure 320 so as not to be exposed. For example, in case that the electronic device 300 is in the folded state (e.g., a fully folded state), the hinge cover 330 may be exposed to the outside between the first housing structure 310 and the second housing structure 320. For example, in the intermediate state in which the first housing structure 310 and the second housing structure 320 are folded with a certain angle, the hinge cover 330 may be partially exposed to the outside between the first housing structure 310 and the second housing structure 320. In this case, the exposed area may be smaller than that of the fully folded state. In an embodiment of the disclosure, the hinge cover 330 may include a curved surface.

The display 301 may be disposed in a space formed by the foldable housing 305. For example, the display 301 may be seated in a recess formed by the foldable housing 305 and may form most of the front surface of the electronic device 300.

Accordingly, the front surface of the electronic device 300 may include the display 301, and a portion of the first housing structure 310, and a portion of the second housing structure 320 adjacent to the display 301. The rear surface of the electronic device 300 may include the first rear cover 380, a portion of the first housing structure 310 adjacent to the first rear cover 380, the second rear cover 390, and a portion of the second housing structure 320 adjacent to the second rear cover 390.

The display 301 may be referred to as a display having at least a partial area thereof transformable to a flat surface or a curved surface. In an embodiment of the disclosure, the display 301 may include a folding area 304, a first area 302 disposed at one side (a left side of the folding area 304 shown in FIG. 3) with reference to the folding area 304, and a second area 303 disposed at the other side (a right side of the folding area 304 shown in FIG. 3).

The division of regions in the display 301 of FIG. 3 is exemplary and the display 301 may be divided into a plurality of regions (e.g., two or more than four) according to the structure or function thereof. By way of example, in the embodiment shown in FIG. 3, the area of the display 301 may be divided by the folding axis (A-axis) or the folding area 304 extending in parallel with the y-axis, and in another embodiment of the disclosure, the area of the display 301 may be divided with reference to another folding area (e.g., a folding area in parallel with the x-axis) or another folding axis (e.g., a folding axis in parallel with the x-axis).

The first area 302 and the second area 303 may have overall symmetrical shapes around the folding area 304. However, the second area 303, unlike the first area 302, may include a cut notch area depending on the presence of the sensor area 324, but may have a symmetric shape to the first area 302 in regions other than the notch area. In other words, the first area 302 and the second area 303 may include portions symmetrical to each other and portions asymmetrical to each other.

Hereinafter, the operation of the first housing structure 310 and the second housing structure 320 and each area of the display 301 according to the state (e.g., the unfolded state (flat state) and the folded state) of the electronic device 300 will be described.

In an embodiment of the disclosure, in case that the electronic device 300 is in the unfolded state (flat state) (e.g., FIG. 3), the first housing structure 310 and the second housing structure 320 may be arranged to form an angle of about 180 degrees therebetween and face the same direction. A surface of the first area 302 and a surface of the second area 303 of the display 301 may form an angle of 180 degrees therebetween and face the same direction (e.g., the front direction of electronic device). The folding area 304 may form the same plane with the first area 302 and the second area 303.

In an embodiment of the disclosure, in case that the electronic device 300 is in the folded state, the first housing structure 310 and the second housing structure 320 may be arranged to face each other. The surface of the first area 302 and the surface of the second area 303 of the display 301 may form a narrow angle (e.g., between 0 degrees and 10 degrees) therebetween and face to each other. At least a portion of the folding area 304 may be formed to be a curved surface having a certain curvature.

In an embodiment of the disclosure, when the electronic device 300 is in the intermediate state, the first housing structure 310 and the second housing structure 320 may be arranged at a certain angle. The surface of the first area 302 and the surface of the second area 303 of the display 301 may form an angle therebetween larger than that of the folded state and smaller than that of the unfolded state. At least a portion of the folding area 304 may be formed of a curved surface having a certain curvature, and in this case, the curvature may be smaller than that of the folded state.

Hereinafter, other examples of the above-described electronic device 101 according to various embodiments will be described.

Figure 4:
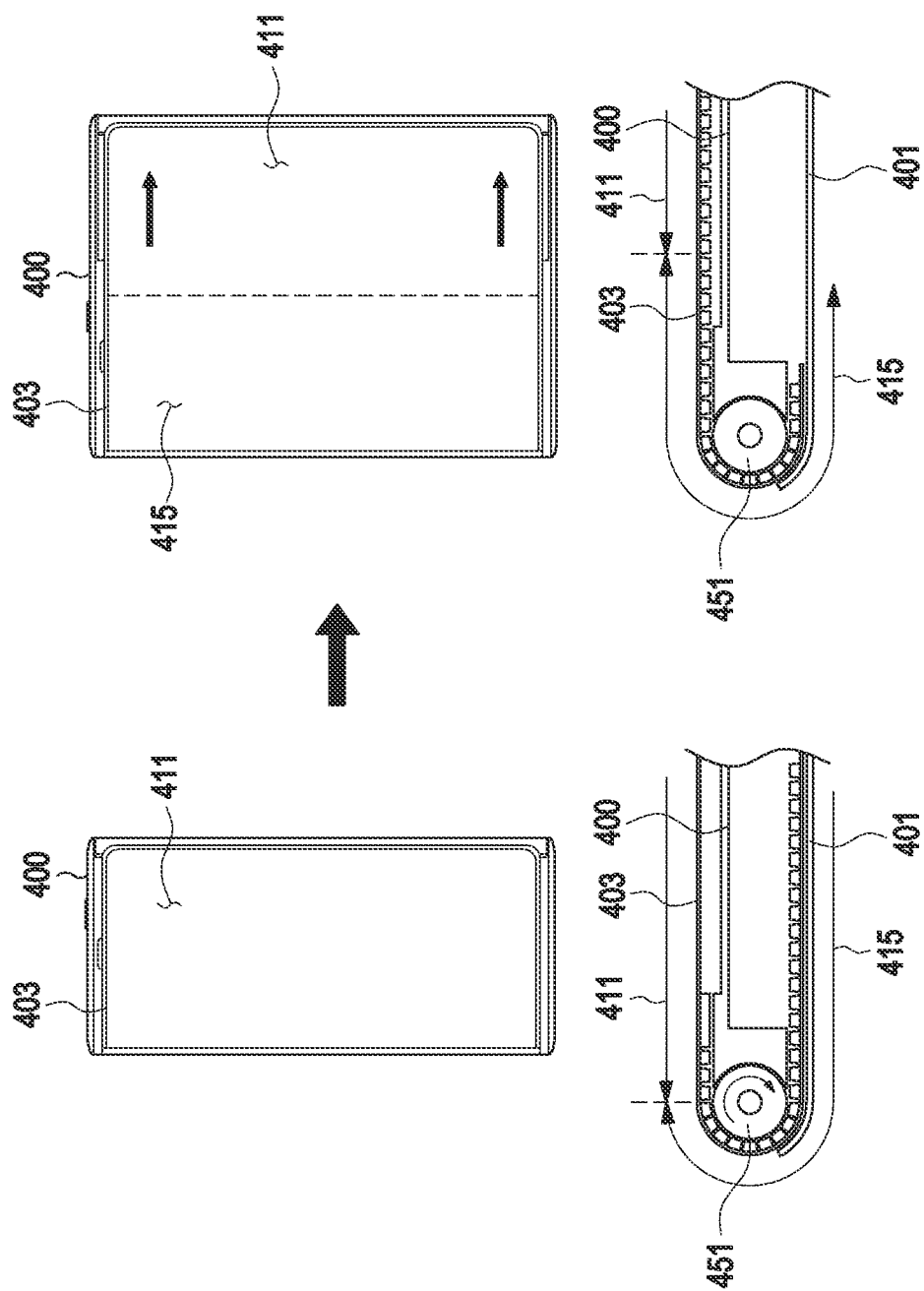
FIG. 4 is a diagram for illustrating an electronic device including a structure in which a display may be drawn in or out according to an embodiment of the disclosure.

FIG. 4 is a diagram for illustrating an electronic device including a structure in which a display may be drawn in or out according to an embodiment of the disclosure.

Referring to FIG. 4, according to various embodiments of the disclosure, an electronic device 400 may include a structure for allowing a flexible display 403 to be drawn in or out in at least one direction. For example, the electronic device 400 may include at least one roller 451 provided at a portion corresponding to at least one direction and at least one structure which may reciprocate by means of rotation of at least one roller and to which a portion 411 of the flexible display 403 is disposed. The rotation of the roller 451 may be performed by a movement device (e.g., a motor). As a portion of a predetermined area 451 of the flexible display 403 is received or exposed according to the reciprocating of the at least one structure, an area of the flexible display 403 may be expanded or reduced along at least one direction on at least one side portion thereof. Alternatively, without limitation to what is described, as described above, the structure of the electronic device 400 may include a fixation member, instead of the roller 451, for allowing the display 403 to be drawn in or out.

Hereinafter, an example of the structure of the electronic device 400 will be described.

For example, the electronic device 400 may include a structure for causing the flexible display 403 to be drawn in or out in a direction. For example, referring to FIG. 4, the electronic device 400 may use the roller 451 provided on one side (e.g., left side or right side (not shown)) to cause a structure on which the flexible display 403 is disposed to reciprocate (e.g., moving in the other direction or moving in one direction), and thereby the flexible display 403 may be drawn out the other direction (e.g., the right side) or drawn in one direction (e.g., the left side). As the flexible display 403 is drawn out, at least a portion of a received area 415 and an area 411 which has been exposed to outside before the flexible display 403 is drawn out may be exposed to the outside.

Without limitation to what is described above, the structure (e.g., the first structure 101 and the roller 451) for allowing the area of the flexible display 403 to be expanded or reduced may be disposed a plurality of portions of the electronic device 400 and the flexible display 403 may be expanded or reduced in directions corresponding to the plurality of portions.

Without limitation to what is shown in part (a) of FIG. 2 and FIG. 4, the electronic device 101 may be implemented to have a structure in which an area of a flexible display may not be extended.

Hereinafter, an example of an operation of controlling a scanning rate for each of a plurality of regions of an electronic device according to various embodiments will be described.

Figure 5:
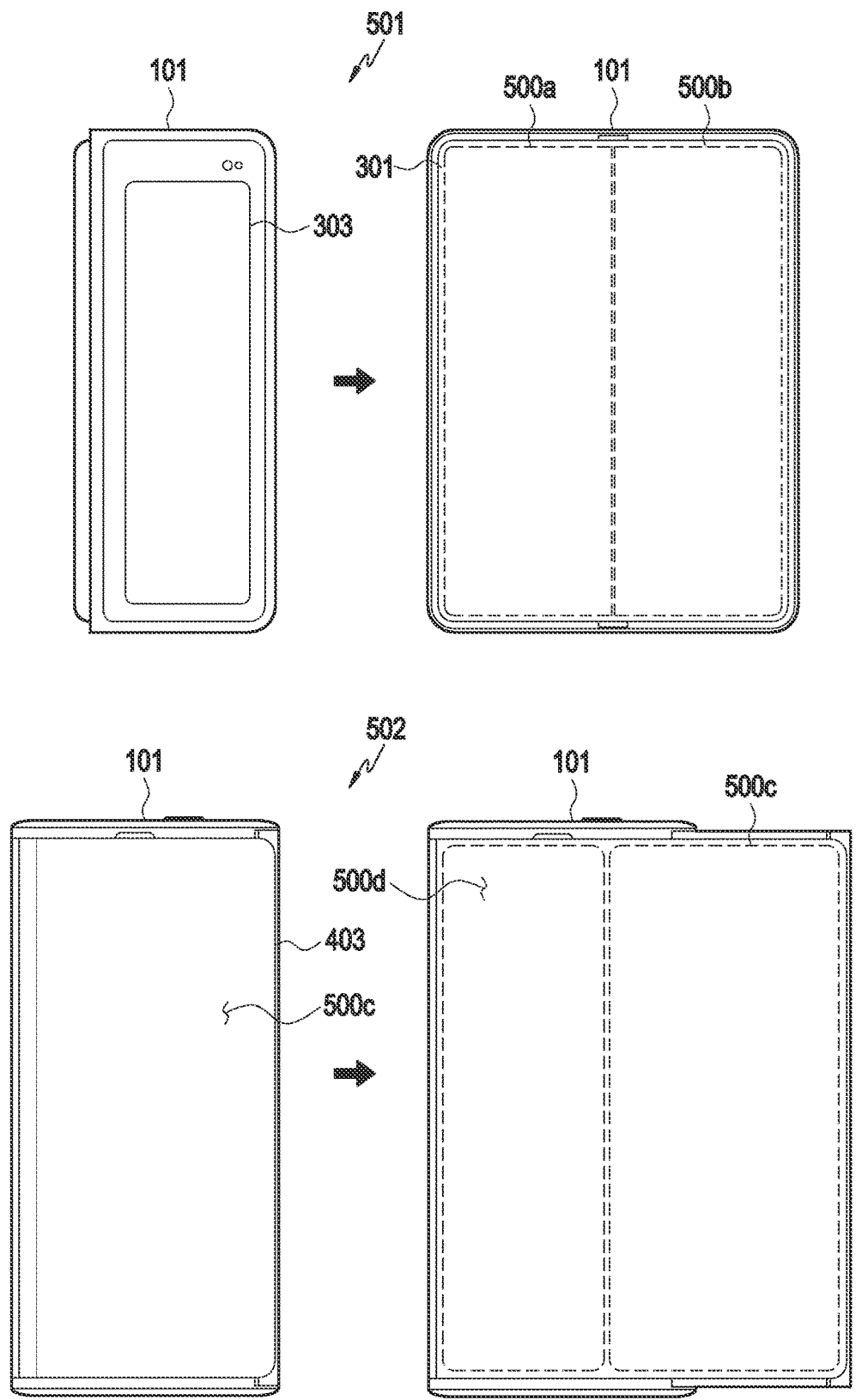
FIG. 5 is a diagram for illustrating an operation of controlling a scanning rate for each of a plurality of regions of an electronic device according to an embodiment of the disclosure.

FIG. 5 is a diagram for illustrating an operation of controlling a scanning rate for each of a plurality of regions of an electronic device according to an embodiment of the disclosure.

Figure 7:
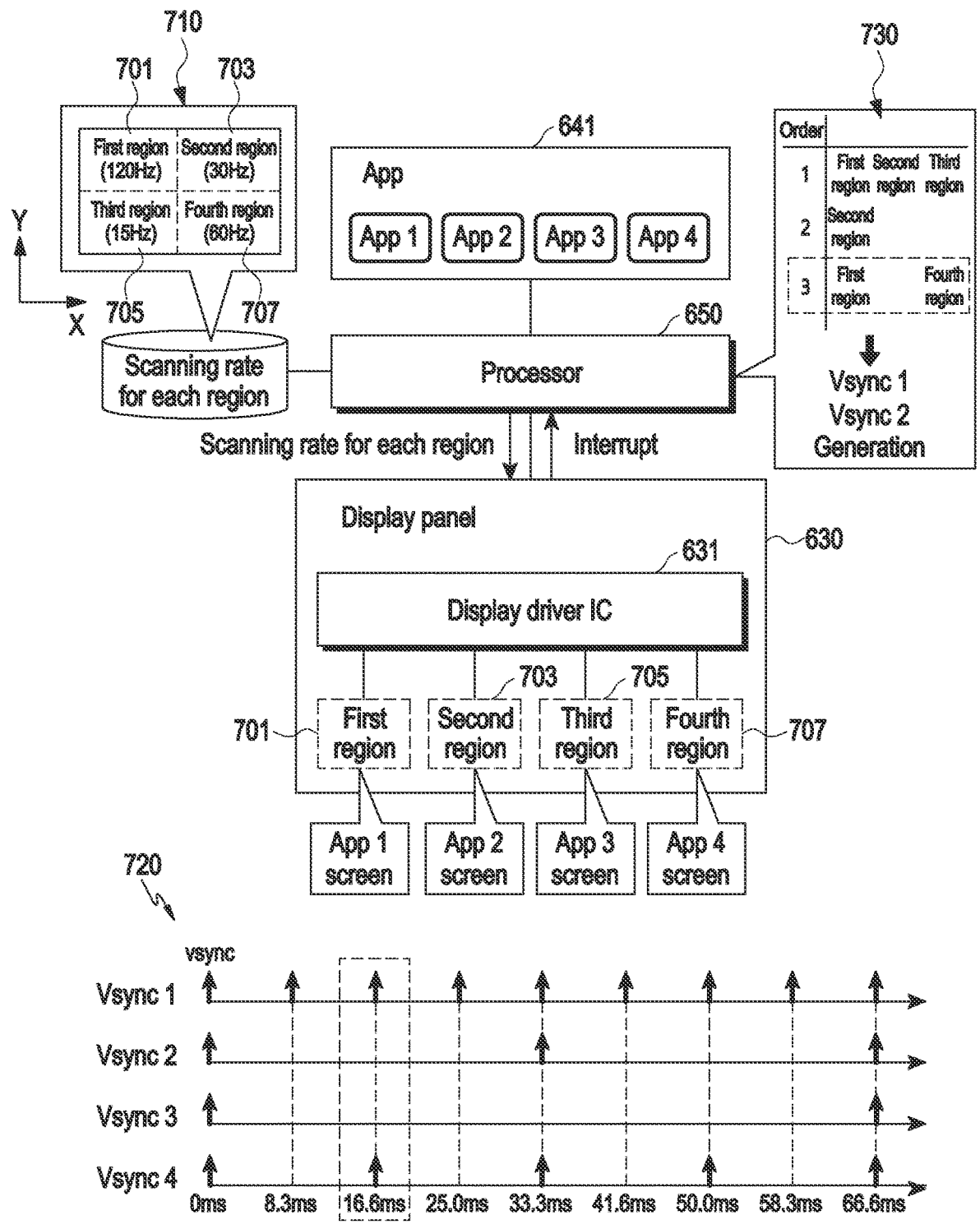
FIG. 7 is a diagram for illustrating an operation of controlling a scanning rate for each of a plurality of regions of a display of an electronic device and vertical synchronization signals based on an operation of controlling a scanning rate according to an embodiment of the disclosure.

Referring to FIG. 5, according to various embodiments of the disclosure, the electronic device 101 may perform an operation of controlling a scanning rate for each of a plurality of regions 500a, 500b, 500c, and 500d of a display (e.g., the flexible display 301 or 403 and a sub display 383). For example, a scanning rate of each of the plurality of regions 500a, 500b, 500c, and 500d may be independently controlled. The plurality of area 500a, 500b, 500c, and 500d may indicate spaces in a range physically distinguished from each other on the display and the term "area" may be replaced with a term, such as "portion" or "region", which is used to describe spaces physically distinguished from each other. The electronic device 101 may include a gate diver IC or a source driver IC corresponding to each of the plurality of regions 500a, 500b, 500c, and 500d for controlling a scanning rate for each of the plurality of regions 500a, 500b, 500c, and 500d so as to control the same, and the control will be described with reference to FIGS. 9, 10A, 10B, and 10C below. In an embodiment of the disclosure, the plurality of regions 500a, 500b, 500c, and 500d may be fixed and/or maintained. The fixation of the regions may indicate that the location, shape, and/or area is not changed. For example, the flexible display 301 or 403 of the electronic device 101 may include a plurality of regions 500a, 500b, 500c, and 500d as shown 501 and 502 of FIG. As shown in 502 of FIG. 5, an area 500c of the plurality of regions 500c and 500d of the flexible display 403 may correspond to an area to be always exposed to the outside and other area 500d may correspond to an area to be drawn in or out. Without limitation to what is shown in FIG. 7, shapes and regions of the plurality of regions 500a, 500b, 500c, and 500d may be implemented in various embodiments. By way of example, the plurality of regions 500a, 500b, 500c, and 500d may have different regions. By way of another example, the plurality of regions 500a, 500b, 500c, and 500d may be implemented to have shapes other than a square. In an embodiment of the disclosure, the plurality of regions 500a, 500b, 500c, and 500d may be variable. For example, based on occurrence of an event for using a multi window, the electronic device 101 may display a content for each of the plurality of regions 500a, 500b, 500c, and 500d. The locations, shapes, and/or areas of the plurality of regions 500a, 500b, 500c, and 500d may be changed by control (e.g., a touch and drag) of a user.

According to various embodiments of the disclosure, the electronic device 101 may perform an operation of controlling a scanning rate for each of the plurality of regions. For example, in case that the electronic device 101 includes the flexible display 301 and the sub display 383 disposed on a surface opposite to the surface on which the flexible display 301 is disposed as shown in 501 of FIG. 5, each scanning rate of the flexible display 301 and the sub display 383 may be controlled. Here, as described above, the electronic device 101 may control a scanning rate for each of the regions 500a and 500b of the flexible display 301.

Hereinafter, an example of configurations of an electronic device according to various embodiments will be described.

Hereinafter, an example of configurations of the electronic device 101 according to various embodiments will be described.

Figure 6:
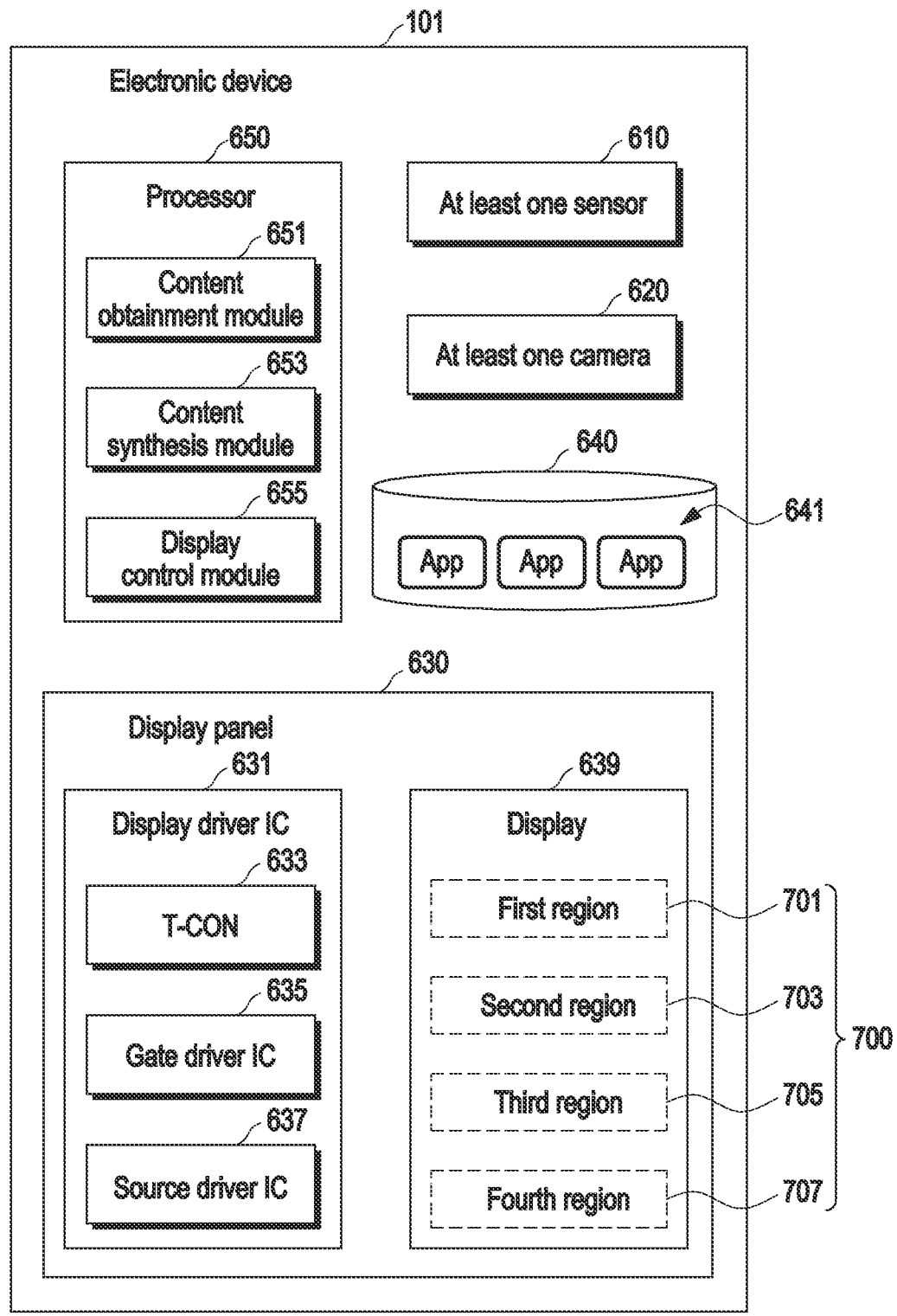
FIG. 6 is a diagram for illustrating an electronic device according to an embodiment of the disclosure.

FIG. 6 is a diagram for illustrating an electronic device according to an embodiment of the disclosure. Without limitation to the configurations shown in FIG. 6, the electronic device 101 may be realized to include more configurations or less configurations than those shown in FIG. 6. Hereinafter, FIG. 6 will be described with reference to FIGS. 7 and 8.

Figure 8:
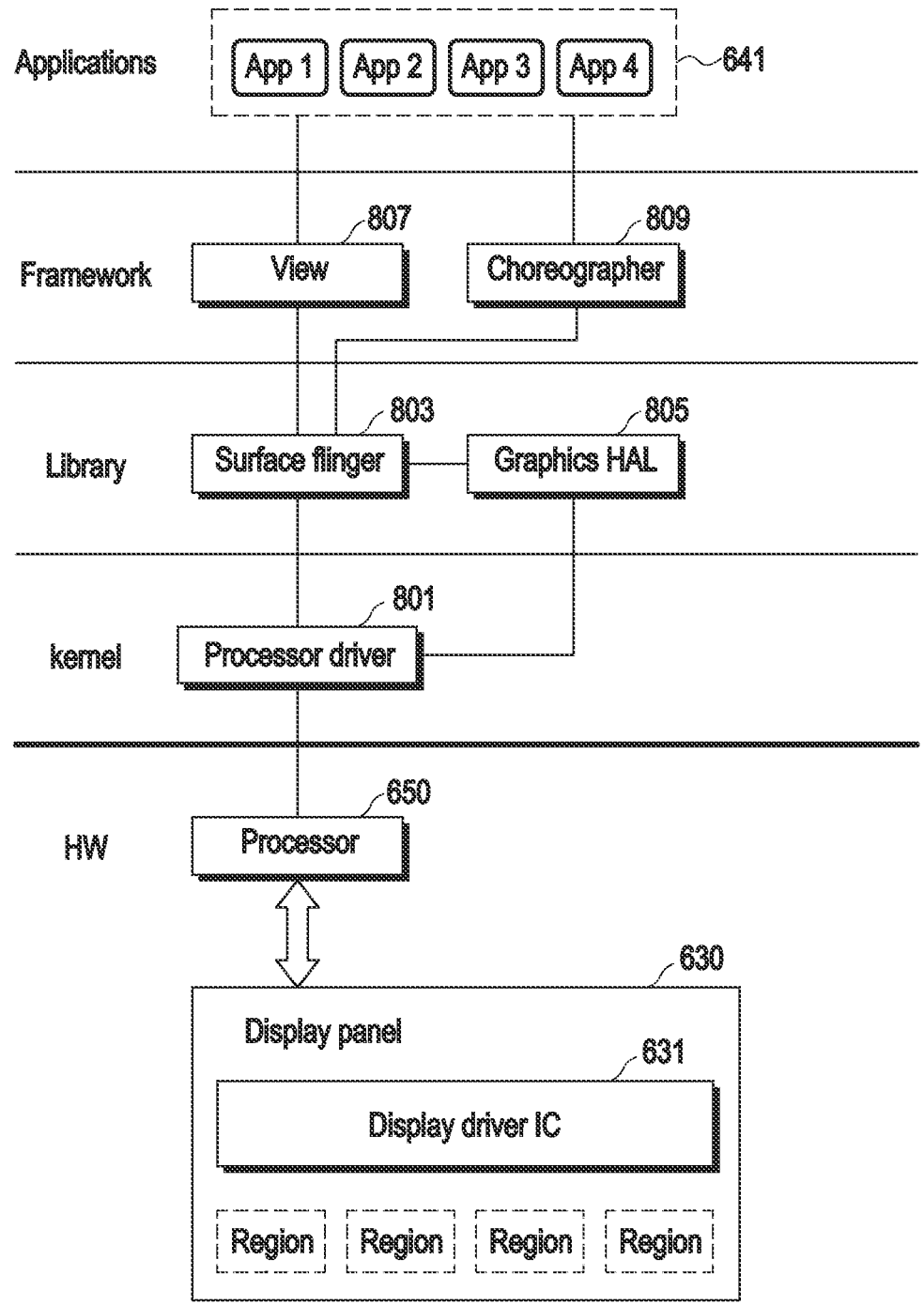
FIG. 8 is a diagram illustrating an electronic device according to an embodiment of the disclosure.

FIG. 7 is a diagram for illustrating an operation of controlling a scanning rate for each of a plurality of regions of a display of an electronic device and vertical synchronization signals based on an operation of controlling a scanning rate according to an embodiment of the disclosure. FIG. 8 is a diagram illustrating an electronic device according to an embodiment of the disclosure.

Referring to FIGS. 6 and 7, the electronic device 101 may include a sensor 610, a camera 620, a display panel 630 including a display driver IC 631 and a display 639, a memory 640 for storing a plurality of applications 641, a content obtainment module 651, a content synthesis module 653, and a processor 650 including a display control module 655. Meanwhile, among the configurations of the electronic device 101 shown in FIGS. 6 and 7, the modules (e.g., the content obtainment module 651, the content synthesis module 653, and the display control module 655) included in the processor 650, the configurations (e.g., the applications 641) stored in the memory 640, and applications, a view 807 of a framework, a choreographer 809, a surface flinger 803 of a library, a graphics HAL 805, and a processor driver 801 of a kernel in FIG. 8, which correspond to the aforementioned components in FIGS. 6 and 7, may be implemented as software. Hereinafter, each configuration included in the electronic device 101 will be described.

Firstly, at least one sensor 610 will be described.

According to various embodiments of the disclosure, the sensor 610 may be provided to detect (or obtain, identify, or sense) data (e.g., an electric value or electric signal) and/or information for identifying a folding state of the electronic device 101 (e.g., the electronic device in FIG. 2A and FIG. 3). The sensor 610 may include at least one sensor, and the sensor 310 may include a Hall-sensor, an angle sensor, a strain sensor, a distance sensor, or a gyroscope sensor (or a tilt sensor), but is not limited thereto. Although not shown, a sensor hub implemented to collect information and/or data detected using the sensor 310 and a sensor hub driver IC for managing information and/or data received from the sensor 310 may be further implemented in the electronic device 101. Accordingly, in case that the electronic device 101 (e.g., the processor 650) is implemented as shown in FIG. 2A and FIG. 3, information on a folding state between housings (e.g., the first housing 310 and the second housing 320) may be identified based on value identified by the sensor 610 when at least one of the housings (e.g., the first housing 310 and the second housing 320) is rotated. The information on the folding state of the electronic device 101 may include at least one of information indicating a state, such as contact or non-contact between the housings (e.g., the first housing 310 and the second housing 320), information on an angle between the housings (e.g., the first housing 310 and the second housing 320), or information on an angle range to which a folding angle between the housings (e.g., the first housing 310 and the second housing 320) belongs.

According to various embodiments of the disclosure, when the display 639 (e.g., the flexible display 403) (or structure or plate) of the electronic device (e.g., the electronic device in FIG. 4) slides, the sensor 610 may sense the slide of the display 639 and return an electrical value (e.g., a current value and/or a voltage value) according to a state of the sliding. The processor 650 to be described below may obtain the electrical value and identify a state related to the sliding. For example, the state related to the sliding may include at least one of start of end of sliding of the display 639, a state related to the electronic device 101 according to sliding (e.g., the open state, the closed state, or the intermediate state), or a distance of sliding. As an example, the sensor 610 may be implemented as a sensor (e.g., an image sensor or an optical sensor) for detecting a predetermined content (e.g., RGB color) displayed on a partial region of a received portion of the display 639, identify, when the display 639 moves, a change of a detected state of the predetermined content (e.g., the content is moved or the content is not displayed), and return an electrical value indicating the start of the sliding. Here, when the sliding ends, the electronic device 101 may display a predetermined content on a partial area of a received portion of the display 639 and the second 610 may detect a displayed content again and return an electrical value indicating the end of sliding. As another example, the sensor 610 may include a sensor for detecting an electromagnet configured to attach when the sliding of the display 639 starts or ends, and return an electrical value indicating the start or end when the sliding starts or ends. As another example, the sensor 610 may be implemented as a sensor (e.g., a pressure sensor, and a resistance sensor) for detecting a dielectric configured to move during the sliding of the display 639, and return an electrical value indicating a sliding distance, based on a moving distance of the dielectric. Accordingly, in case that the electronic device 101 (e.g., the processor 650) is implemented as shown in FIG. 4, when the display 639 slides, a slide distance of the display 639 and an area where the display 639 is exposed may be identified based on a value identified using the sensor 610. However, without limitation thereto, instead of receiving a value from the sensor 610, the electronic device 101 may identify a slide distance of the display 639 and an area where the display 639 is exposed based on a signal for controlling a motor.

Hereinafter, the camera 620 will be described.

According to various embodiments of the disclosure, the camera 620 (e.g., at least one front camera and at least one rear camera) may photograph a static image (or image) and a moving image. For example, the camera 620 may photograph a plurality of images or a moving image in which the display 639 slides. According to an embodiment of the disclosure, the camera 620 may include one or more lenses, image sensors, image signal processors, or flashes.

According to various embodiments of the disclosure, the camera 620 may include at least one camera having a different property or function (or usage). For example, the camera 620 may include cameras having different angles of view. The angles of view may include, for example, a super wide angle of 114° to 94°, a wide angle, a normal lens of 84° to 63°, a telephoto of 28° to 8°, and a super telephoto of 6° to 3°. For example, the camera 620 may include at least one front camera disposed on the front surface for photographing an image and/or video and at least one rear camera disposed on the rear surface for photographing an image and/or video as described above.

Hereinafter, the display 639 and the display driver IC 631 included in the display panel 630 will be described. The display panel 630 may be electrically connected to the processor 650 through at least one interface (e.g., MIPI-DSI and a DP), and may receive information (e.g., information on a content to be displayed) from the processor 650 or transmit information (e.g., an interrupt) to the processor 650. The display panel 630 is not limited what is described and/or illustrated and may include more configurations (e.g., a housing and a power supply device) or may be implemented through a known technology so a redundant description will be omitted.

Hereinafter, the display 639 will be described first. The display 639 may be implemented as the display 639 module shown in FIG. 1 and the flexible display 639 shown in FIG. 2A and FIG. 5, and thus a redundant description will be omitted.

According to various embodiments of the disclosure, the display 639 may display at least one content (e.g., an application execution screen and various types of media content, such as videos and images). For example, the display 639 may display a screen (or a surface or views) that is updated (or renewed) by at least a portion of the plurality of applications 641 as shown in FIG. 7. As described above, the display 639 may include a plurality of regions 701, 703, 705, and 707, and the electronic device 101 may display a content for each of the plurality of areas 700 of the display 639. For example, as shown in FIG. 7, the electronic device 101 may display execution screens of different applications for each of the plurality of regions 701, 703, 705, and 707 of the display 639.

According to various embodiments of the disclosure, the display 639 may include pixels (e.g., 1000 in FIGS. 10A to 10C to be described below), a plurality of gate lines (e.g., 1001 in FIGS. 10A to 10C to be described below), and a plurality of source lines (e.g., 1002 in FIGS. 10A to 10C to be described below). Each of the plurality of pixels may include an element for outputting light of different types (e.g., R, G, and B). The element may include a light source (e.g., an organic light emitting diode (OLED)) for independently generating light of different types (e.g., R, G, and B) depending on a type (e.g., an OLED display 639 or an LCD display 639) of the display 639 or a thin film transistor (TFT) for allowing an output of light output from a back light to be controlled (e.g., controlling a strength of output light). The light output through the TFT may be output as a specific type (e.g., R, G, and B) light corresponding to a color filter by the color filter disposed on the TFT. Elements (e.g., a light source or transistor) arranged for each of the plurality of pixels may be electrically connected through a gate line (e.g., connection to a gate input end of an element) or electrically connected through a source line (e.g., connection to a source input end (or data input end) of an element). Furthermore, as described with reference to FIGS. 10A to 10C, the light source and transistor arranged for each of the plurality of pixels may be connected to a gate driver IC 635 included in the display driver IC 631 through a gate line and applied with a pulse from the gate driver IC to be turned on and may be connected to a source driver IC 637 included in the display driver IC 631 through a source line (or data line) and receive data to display a content from the source driver IC. A control operation of the display driver IC 631 with respect to the light source and transistor arranged for each of the plurality of pixels will be described below.

Hereinafter, the display driver IC 631 will be described.

According to various embodiments of the disclosure, as shown in FIG. 6, the display driver IC 631 may include a timing controller (T-CON) 633, the gate driver IC 635, and the source driver IC (637). The configurations of the display driver IC 631 are not limited to the configurations shown in FIG. 6 and may include more configurations. For example, the display driver IC 631 may further include a power module, a controller resistor, and GRAM. The display driver IC 631 may be implemented through a known technology and thus a detailed description about a display driver IC 631 other than the display driver IC 631 described below will be omitted. As will be described below with reference to FIGS. 9, 10A, 10B, and 10C. A plurality of display driver ICs 631 or a single display driver IC 631 may be included.

According to various embodiments of the disclosure, the display driver IC 631 may display a content at a scanning rate designated for each of the plurality of regions 700 of the display 639. For example, the display driver IC 631 may receive, from the processor 650, information on a content to be displayed and display the content on the display 639 based on the information on the content. The information on a content may include information (e.g., image data, such as surface and views) for displaying a content and information (e.g., coordinate information or identification information (e.g., dead pixel information) for identifying an region on which a content is to be displayed). In an embodiment of the disclosure, the information on a content may be sequentially transferred from the processor 650 to the display driver IC 631 (information on a content to be display on a first region 701 and/or location information of the first region 701 is transferred and then information on a content to be display on a second region 703 and/or location information of the second region 703 is transferred). For example, the display driver IC 631 may receive information on a scanning rate configured to each of the plurality of regions from the processor 650. Based on the information on a content and the information on a scanning rate, the display driver IC 631 may generate and provide (or transfer or transmit) a vertical synchronization signal (Vsync signal) and a horizontal synchronization signal (Hsync signal) at a period corresponding to the scanning rate together with and information on gate lines to be controlled by the gate driver IC 635 and/or the source driver IC 637 for each region of information (e.g., information on a location on which the content is to be displayed) on a content. For example, a Vsync signal may be generated and provided at a first period (e.g., 1/60 Hz) correspond to a scanning rate (60 fps) and a Hsync signal may be provided at a period smaller that the first period (e.g., 1/60 Hz). The Vsync signal may indicate a start and/or end of a frame when displaying a content (e.g., the reception of the Vsync signal indicates an end of a previous frame and a start of a new frame), and the Hsync signal may indicate a time point when a pulse is applied for each of a plurality of gate lines to display a frame. The gate driver IC 635 may identify gate lines corresponding to information on the line and sequentially apply (horizontal line update) a pulse for each of a plurality of gate lines based on the Vsync signal and Hsync signal received for each of identified lines. According to the application of the pulse, light sources and transistors connected to each gate line may be turned on and the light sources and transistors may be controlled to output light having a strength corresponding to a voltage applied through a source line (or data line) in a turn-on state. The display driver IC 631 may transmit pixel data (e.g., RGB data) to be displayed for each pixel of a region to the source driver IC 637 by using the timing controller 633, based on the information on a content. The source driver IC 637 may cause a portion (e.g., a pixel of the content) of a content corresponding to the pixel data for each pixel to be displayed by applying a voltage corresponding to the pixel data to a transistor (e.g., a TFT) or light sources (e.g., an OLED) included for each of a plurality of pixels in a region of the display 639, based on the pixel data. Meanwhile, it will be understood by those skilled in the art that as described above, after the vertical synchronization signal is provided, display update may be performed for a relatively short time period rather than using the entire time period until the next vertical synchronization signal, but various embodiments are not limited thereto. For example, the display driver IC 631 may be configured to provide a vertical synchronization signal and to provide a horizontal synchronization signal at regular intervals without a pause period before a next vertical synchronization signal is provided.

According to various embodiments of the disclosure, in case of generating a vertical synchronization signal for displaying a content at a scanning rate configured for each of the plurality of regions 700 of the display 639, the display driver IC 631 may generate an interrupt based on the generation of the vertical synchronization signal and transfer the interrupt to the processor 650 as shown in FIG. 7. As will be described below, the processor 650 may generate a vertical synchronization signal corresponding to the plurality of regions in a software manner based on the received interrupt, and obtain a content to be updated (or renewed) for each of the plurality of regions based on the generated vertical synchronization signal.

Hereinafter, an example of the processor 650 will be described. The processor 650 may include at least one of an application processor (AP), a central processing unit (CPU), a graphic processing unit (GPU), a display processing unit (DPU), or a neural processing unit (NPU). At least a portion of modules (e.g., the content obtainment module 651, the content synthesis module 653, and the display control module 655) included in the processor 650 may be implemented (e.g., executed) in software, firmware, hardware, or a combination of at least two of these. For example, the modules (e.g., the content obtainment module 651, the content synthesis module 653, and the display control module 655) may be implemented as a form of an application, a program, a computer code, instructions, a routine, or a process which may be executed by the processor 650. Accordingly, when the modules are executed by the processor 650, the modules may cause the processor 650 to perform operations related to the module (or functions provided by the module). Alternatively, the modules may be implemented as a portion of a predetermined application. With no limitation to what is described and/or shown above, each module may be implemented as hardware (e.g., a processor and a control circuit) separate from the processor 650.

Hereinafter, the content obtainment module 651 according to various embodiments will be described first.

According to various embodiments of the disclosure, the content obtainment module 651 may obtain at least one content to be displayed on the display 639. In an embodiment of the disclosure, the content obtainment module 651 may request an update of a screen (or execution screen) (e.g., a surface and views) of an application to at least one application associated with the plurality of regions 700 executing in a foreground mode and obtain information (e.g., coordinate information) on a location on which a screen is to be displayed and a screen updated (or rendered) by at least one application from at least one application. By way of example, a screen of each of multiple applications 641 may be displayed on each of the plurality of regions 700, and the content obtainment module 651 may request a screen update to each of the plurality of applications 641 and obtain information (e.g., coordinate information) on a location on which a screen is to be displayed and a screen from each of the plurality of applications. For another example, a screen of an application of the plurality of applications 641 may be displayed on at least two regions adjacent to each other (e.g., connected to each other or in contact with each other) among the plurality of regions 700 and screens of other applications may be displayed on the remaining regions of the plurality of regions 700, and the content obtainment module 651 may request a screen update to each of the plurality of applications 641 and obtain information (e.g., coordinate information) on a location on which a screen is to be displayed and a screen to be displayed from each of the plurality of applications 641. Referring to FIG. 7, the at least two regions adjacent to each other may include regions, such as a first region 701 and a second region 703, in which coordinates are continuous in one direction (e.g., the x direction) and coordinate ranges correspond (e.g., identical) to each other in the other direction (e.g., the y direction). Without limitation to what is described above, the content obtainment module 651 may obtain a media content or an image to be displayed on each of the plurality of regions.

According to various embodiments of the disclosure, the content obtainment module 651 may obtain at least one content to be displayed on the display 639 based on the generated vertical synchronization signal. For example, as described below, the content obtainment module 651 may identify regions corresponding to vertical synchronization signals based on the vertical synchronization signals (e.g., Vsync 1 and Vsync 4 in FIG. 7) generated by the display control module 655, identify applications (e.g., a first application App1 and a fourth application App4 in FIG. 7) to display a screen on the identified regions, and request a content update to the identified applications. The memory 640 of the electronic device 101 may store information on regions corresponding to the vertical synchronization signals and the content obtainment module 651 may identify regions corresponding to the received vertical synchronization signals with reference to the stored information. Without limitation thereto, the content obtainment module 651 may directly identify applications corresponding to the vertical synchronization signals without an operation of identifying regions corresponding to the vertical synchronization signals and request a content update. As described below, the vertical synchronization signals may be generated at designated period and accordingly, the content obtainment module 651 may update a content at each designated period. Without limitation thereto, the vertical synchronization signals may be generated at a predetermined time interval instead of a designated period. The time interval may vary.

According to various embodiments of the disclosure, the content obtainment module 651 may be implemented as a surface flinger 803 of a library layer, a choreographer 809 and a view 807 of a framework layer. In case of receiving vertical synchronization signals from the processor driver 801 of a kernel layer to be described below, the surface flinger 803 may transfer the vertical synchronization signals to the choreographer 809 of the framework layer. The choreographer 809 may request a content (e.g., a surface or view) update to applications corresponding to the vertical synchronization signals and the applications may transfer the updated content to the view 807 of the framework layer. The surface flinger 803 may obtain the updated content through the view 807.

Hereinafter, the content synthesis module 653 according to various embodiments will be described.

According to various embodiments of the disclosure, the content synthesis module 653 may transfer information (e.g., image data on a content and information on a location where a content is to be displayed) on the content obtained through the content obtainment module 651 to the display control module 655 to be displayed on the display 639. In an embodiment of the disclosure, the content synthesis module 653 may synthesize a portion of content based on the information (e.g., coordinate information) on a location where content is to be displayed obtained by the content obtainment module 651, obtain information (e.g., coordinate information) on a location where a portion of the synthesized content is to be displayed, and transfer information (e.g., image data and location information) on a portion of the synthesized content to the display control module 655. A content synthesis operation by the content synthesis module 653 will be described below with reference to FIGS. 15, 16A, and 16B.

According to various embodiments of the disclosure, the content synthesis module 653 may be implemented as the graphics HAL 805 of the library layer. The graphics HAL 805 may receive information on content (e.g., screens of applications) updated form the surface flinger 803.

Hereinafter, the display control module 655 according to various embodiments will be described.

According to various embodiments of the disclosure, the display control module 655 may control the display driver IC 631 so that a content is displayed at a designated scanning rate for each of the plurality of regions 700 of the display 639. For example, the electronic device 101 may configure a scanning rate for each of the plurality of regions 700 based on a designated event, and store information 710 (e.g., coordinate information on a region and a scanning rate value configured to a region) on a scanning rate configured for each of the regions 700 in the memory 640 and/or transfer the same to the display panel 630 (e.g., the display driver IC 631). As described above, the display driver IC 631 may generate a vertical synchronization signal and/or horizontal synchronization signal corresponding to each region based on the received scanning rate and control a content to be displayed on each region at a corresponding scanning rate. In an embodiment of the disclosure, the designated event may correspond to configuring a scanning rate for each of the plurality of regions (e.g., a first region 701, a second region 703, a third region 705, and a fourth region 707) by a user. By way of example, the electronic device 101 may configure different scanning rates for each of the plurality of regions (e.g., the first region 701, the second region 703, the third region 705, and the fourth region 707) by a user's configuration when using a multi window. Here, the electronic device 101 may display a panel (or window) for configuring a scanning rate for each region and receive a scanning rate value to be configured for each region (e.g., the first region 701, the second region 703, the third region 705, and the fourth region 707) on the panel from the use.

Alternatively, without limitation thereto, the electronic device 101 may store information on a scanning rate to be configured for each of the plurality of regions (e.g., the first region 701, the second region 703, the third region 705, and the fourth region 707) for each of a plurality of events in advance and identify a scanning rate for each region corresponding to an incurred event with reference to the pre-stored information based on the occurrence of the event. By way of example, the event may correspond to detecting starting of the sliding of the display 403 of the electronic device 101 as shown in FIG. 4, and according to the event a scanning rate of the first region 500c may be configured as a first scanning rate and a scanning rate of the second region 500d to be exposed to the outside may be configured as a second scanning rate higher (or lower) than the first scanning rate. Alternatively, without limitation thereto, a scanning rate may be pre-configured for each of the plurality of regions 700.

According to various embodiments of the disclosure, the display control module 655 may perform at least one operation for obtaining a content to be displayed on the display 639. For example, the display control module 655 may periodically generate (720) signals for requesting a content update based on an interrupt received from the display panel 630. In an embodiment of the disclosure, the periodically generated signals may include vertical synchronization signals as shown in 720 of FIG. 7. For example, the display control module 655 may identify regions (e.g., the first region 701 and the fourth region 707) corresponding to a time point or order in which interrupt is received based on information 730 on regions where a content is to be displayed for each time point (or order, or time interval) as shown in FIG. 7 and generated vertical synchronization signals (e.g., Vsync 1 and Vsync 4) corresponding to the identified regions. The display control module 655 may calculate regions to display a content for each time point (or order, time interval, or frame) based on the information 710 on a scanning rate configured for each of the plurality of regions (e.g., the first region 701, the second region 703, the third region 705, and the fourth region 707). For example, in case that a scanning rate configured to the first region is 120 Hz, a scanning rate configured to the second region is 30 Hz, a scanning rate configured to the third region is 15 Hz, and a scanning rate configured to the fourth region is 60 Hz, the electronic device 101 may obtain (or identify or calculate) information 730 on regions in which content is to be displayed at an 8.3 ms period corresponding to the highest scanning rate of 120 Hz, as shown in FIG. 7. As described above, the refresh rates may be configured to a plurality of a designated factor (e.g., 15), and accordingly, scanning rates having a relationship of a plurality of a specified factor (e.g., 15) may be provided as scanning rates configurable by a user and selected by the user, but is not limited thereto. The display control module 655 may identify regions corresponding to a time point when an interrupt is received from the information 730 and identify vertical synchronization signals corresponding to the identified regions stored in the electronic device 101 so as to generate identified vertical synchronization signals. For example, the memory 640 may store that a first vertical synchronization signal Vsync 1 corresponds to the first region 701, a second vertical synchronization signal Vsync 2 corresponds to the second region 703, a third vertical sync signal Vsync 3 corresponds to the third region 705, and a fourth vertical sync signal Vsync 4 corresponds to the fourth region 707, but without limitation thereto, may store that different vertical synchronization signals correspond to each region 700. By way of example, referring to FIG. 7, when receiving an interrupt at 16.6 ms, the electronic device 101 may identify a time point (or order, time interval, or frame) corresponding to 16.6 ms from the information, identify the first region 701 and the fourth region 707 corresponding the identified time point, and generate a first vertical synchronization signal Vsync 1 corresponding to the first region 701 and a second vertical synchronization signal Vsync 4 corresponding to the fourth region 707. As will be described below, the content obtainment module 651 may obtain vertical synchronization signals from the display control module 655 and request a content (e.g., a screen, surface, and view) update to applications corresponding to the obtained vertical synchronization signals. However, without limitation to what is described and/or shown, the display control module 655 may perform an operation for obtaining content to be displayed on the display 639 without performing an operation of receiving an interrupt and generating vertical synchronization signals based on the received interrupt. For example, regardless of the reception of the interrupt, the display control module 655 may generate at least one vertical synchronization signal corresponding to at least one region corresponding to a current time point at a designated period (e.g., 8.3 ms) based on the information 730 on a region on which a content is to be displayed for each of time points (or orders, time intervals, or frames) identified based on the above-described a plurality of scanning rates. For another example, in response to receiving the interrupt, the display control module 655 may generate various types of information, rather than the vertical synchronization signal, to cause the content obtainment module 651 to perform a content update operation. By way of example, in response to receiving the interrupt, the display control module 655 may generate information for identifying regions corresponding to a current time point (e.g., regions on which a content is to be displayed at a current time point). According to reception of the information, the content obtainment module 651 may identify regions corresponding to a current time point and applications corresponding to the regions and request a content (e.g., a screen, surface, and view) update to the identified applications.

According to various embodiments of the disclosure, the display control module 655 may perform at least one operation for displaying a content on the display 639. For example, based on transferring (e.g., transferring to the content obtainment module 651) of the above-described signal for requesting a content update, the display control module 655 may receive information on content to be currently displayed (e.g., to be displayed at a time point of 16.6 ms) and transfer the received information on content to the display panel 630. As described above, the display panel 630 (e.g., the display driver IC 631) may display at least one content on a portion (e.g., the first region 701 and the fourth region 704) of the plurality of regions (e.g., the first region 701, the second region 703, the third region 705, and the fourth region 707), based on the received information on content.

According to various embodiments of the disclosure, the display control module 655 may be implemented as the processor driver 801 (e.g., a DPU driver) of the kernel layer as shown in FIG. 8. The processor driver 801 may receive an updated content from the surface flinger 803 and/or graphics HAL 805 of the library layer.

Hereinafter, implementation examples of the display driver IC 631 according to various embodiments will be described.

Figure 9:
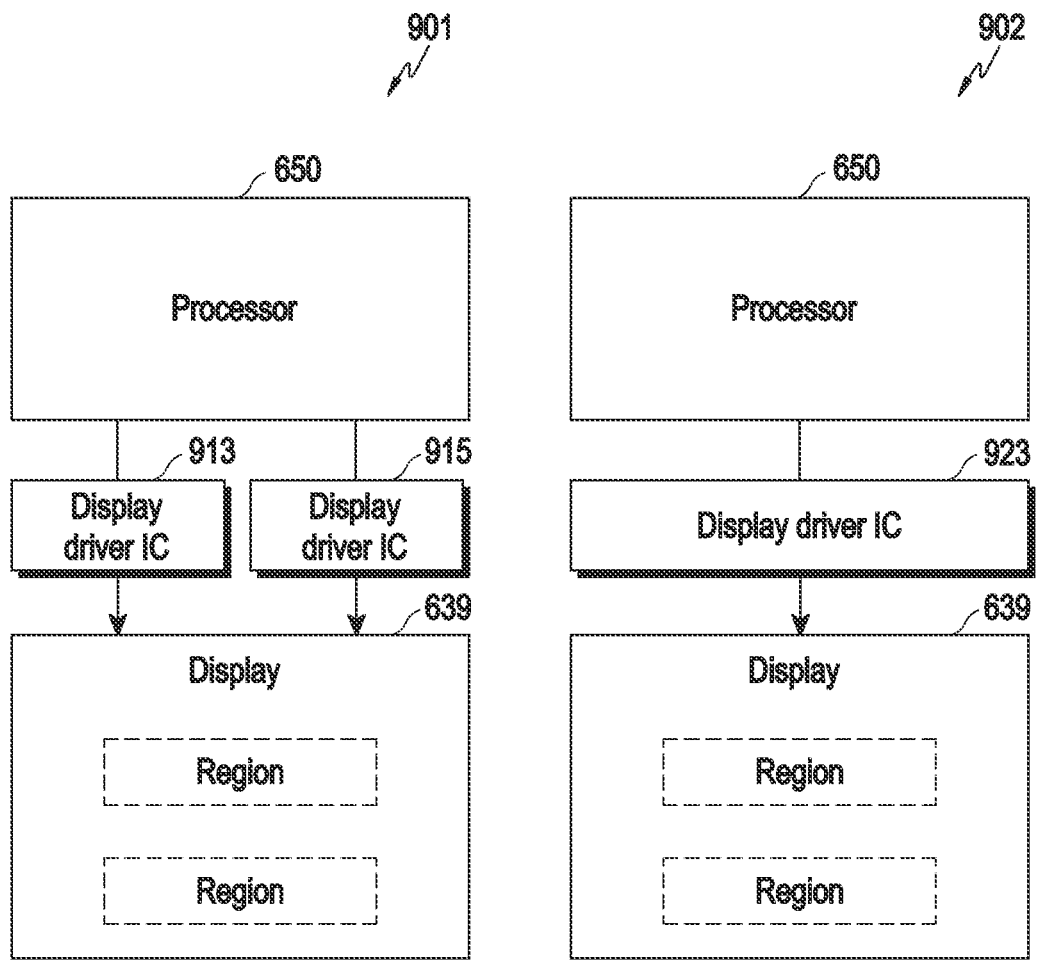
FIG. 9 is a diagram for illustrating an implementation of a display diver IC for controlling a plurality of regions of a display according to an embodiment of the disclosure.

FIG. 9 is a diagram for illustrating an implementation of a display diver IC for controlling a plurality of regions of a display according to an embodiment of the disclosure. Hereinafter, FIG. 8 will be described with reference to FIGS. 10A to 10C.

Figure 10A:
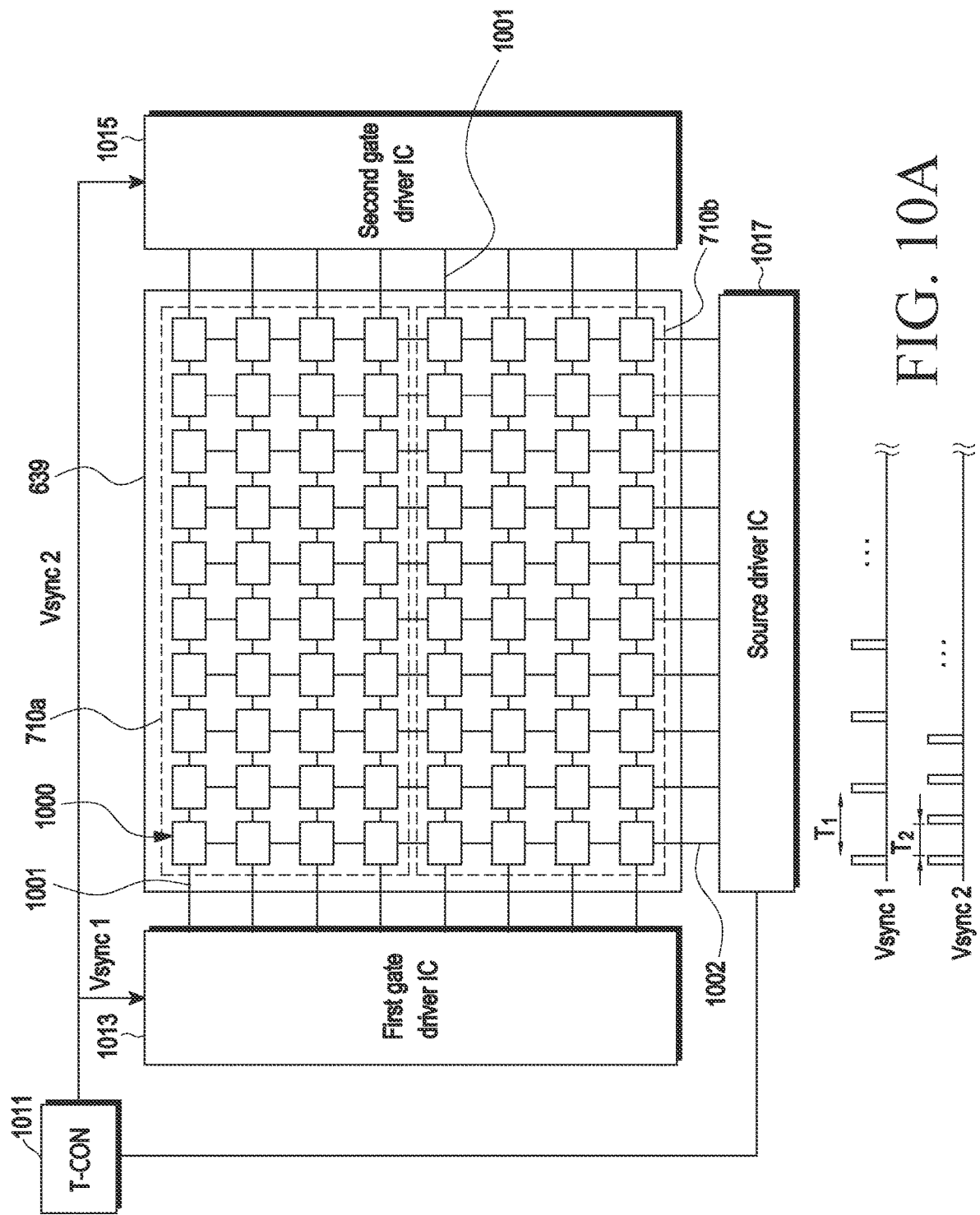
FIG. 10A is a diagram for illustrating a display driver IC including gate driver ICs corresponding to a plurality of regions according to an embodiment of the disclosure.
Figure 10B:
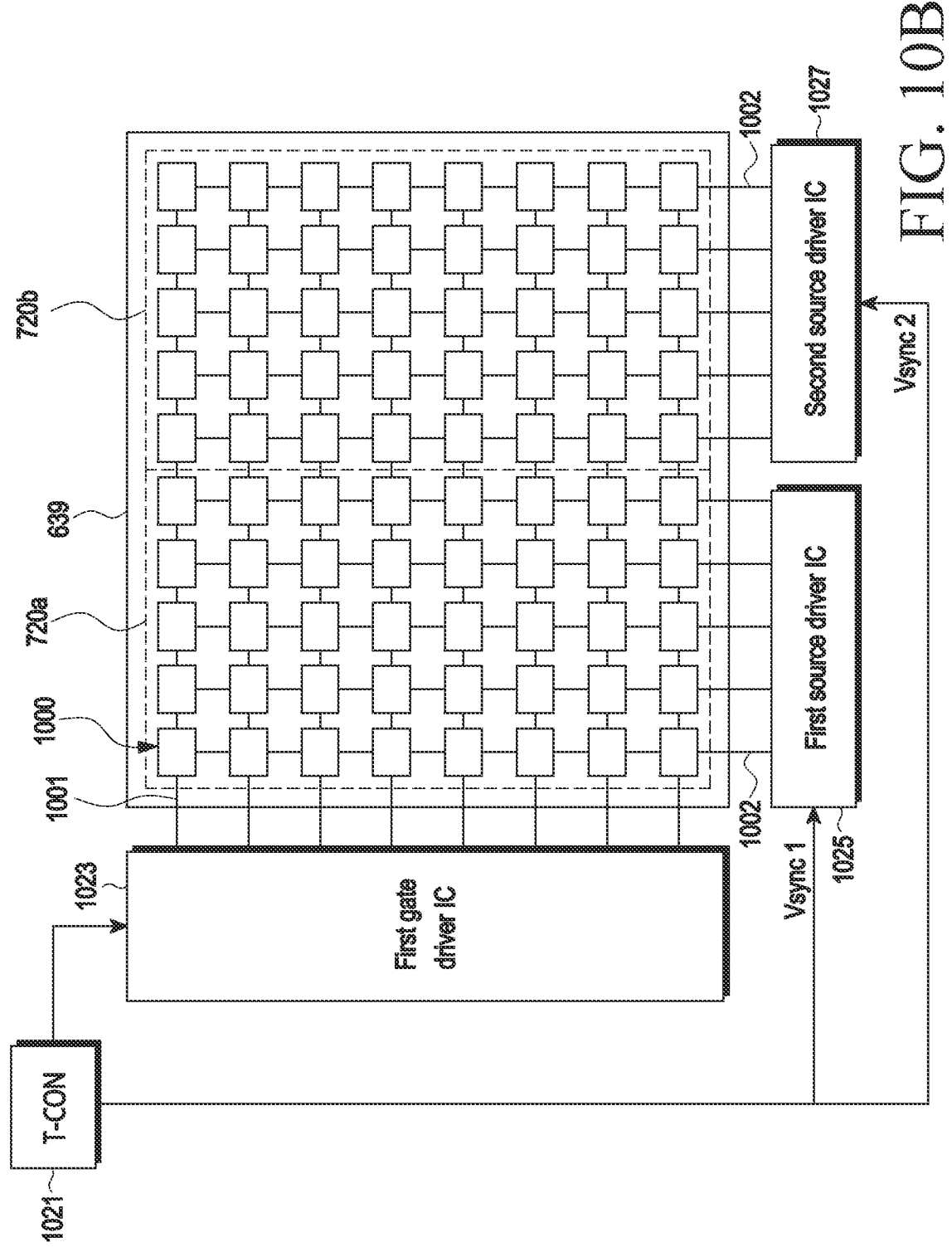
FIG. 10B is a diagram for illustrating a display driver IC including source driver ICs corresponding to a plurality of regions according to an embodiment of the disclosure.
Figure 10C:
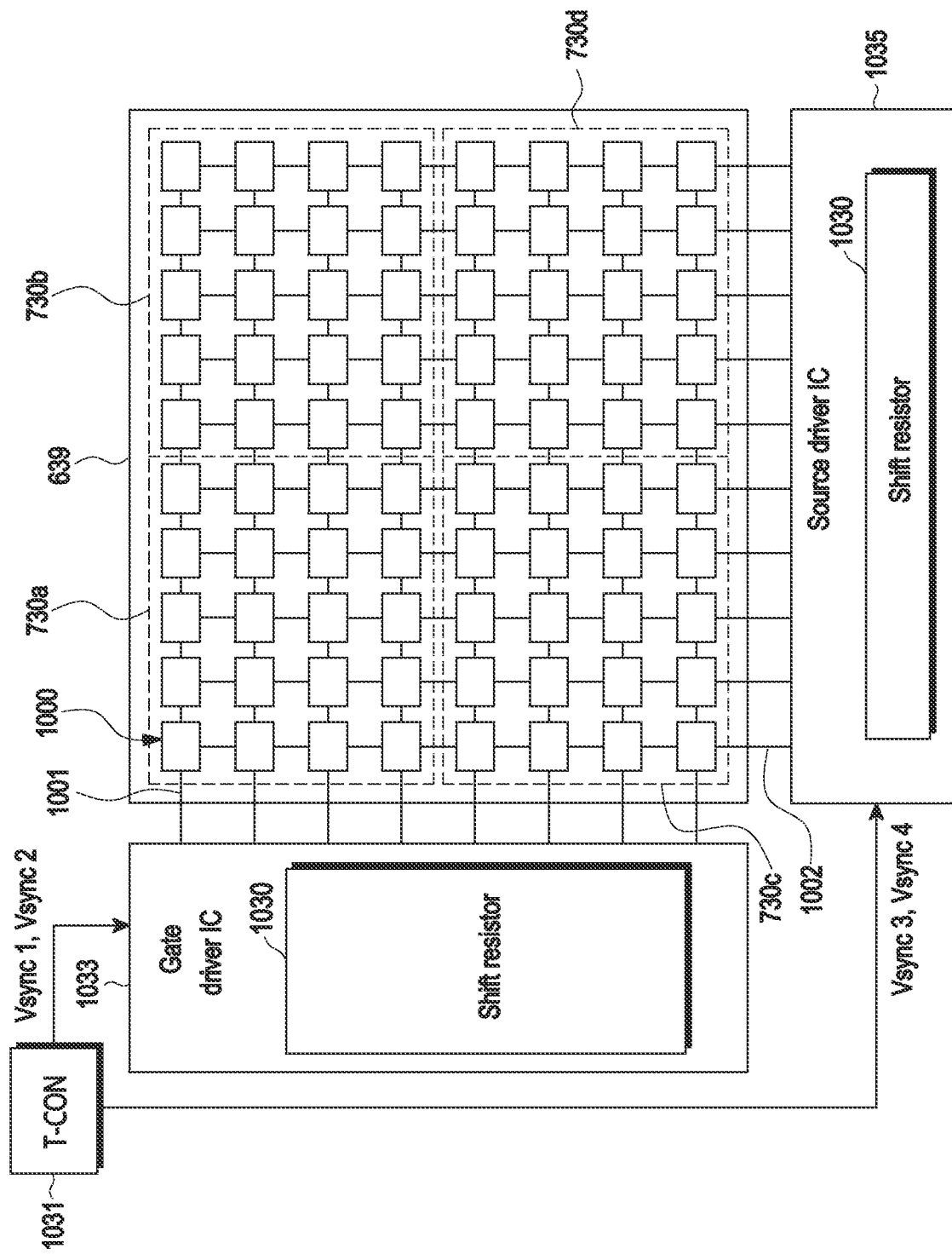
FIG. 10C is a diagram for illustrating a display driver IC including a shift register for controlling a plurality of regions according to an embodiment of the disclosure.

FIG. 10A is a diagram for illustrating a display driver IC including gate driver ICs corresponding to a plurality of regions according to an embodiment of the disclosure. FIG. 10B is a diagram for illustrating a display driver IC including source driver ICs corresponding to a plurality of regions according to an embodiment of the disclosure. FIG. 10C is a diagram for illustrating a display driver IC including a shift register for controlling a plurality of regions according to an embodiment of the disclosure.

Referring to FIGS. 9, 10A, 10B, and 10C, according to various embodiments of the disclosure, the electronic device 101 may include at least one display driver IC 631 (e.g., 913, 915, or 923 in FIG. 9). In an embodiment of the disclosure, the electronic device 101 may include a plurality of display driver ICs (e.g., a first display driver IC 913 and a second display driver IC 915) as shown in 901 of FIG. 9. For example, the plurality of display driver ICs (e.g., the first display driver IC 913 and the second display driver IC 915) may control pixels 1000 (e.g., light sources or transistors) of the plurality of regions 700 of the display 639. The number of the display driver ICs (e.g., the first display driver IC 913 and the second display driver IC 915) may correspond to the number of the plurality of regions 700 to independently control the scanning rate. The plurality of display driver ICs 631 may represent a plurality of gate driver ICs 635 and/or a plurality of source driver ICs 637. By way of example, in case that there is one source driver IC 637 but a plurality of gate driver ICs 635, it may be understood that the electronic device 101 includes a plurality of display driver ICs 631. In an embodiment of the disclosure, as shown in 902 of FIG. 9, the electronic device 101 may include a single display driver IC 923 to control the plurality of regions 700 of the display 639. Hereinafter, each of implementation examples in which a plurality of display driver ICs 631 are implemented (e.g., 901 in FIG. 9) and a single display driver IC 631 is implemented (e.g., 902 in FIG. 9) and operation examples thereof will be described below.

Firstly, examples in which a plurality of display driver ICs (e.g., the first display driver IC 913 and the second display driver IC 915) are implemented and operation examples will be described with reference to FIGS. 10A and 10B.

According to various embodiments of the disclosure, as shown in FIG. the electronic device 101 may include a source driver IC 1015 and gate driver ICs (e.g., a first gate driver IC 1013 and a second gate driver IC 1015) corresponding to and the plurality of regions 710a and 710b of the display 639. Referring to FIG. 10A, in case that the plurality of regions 710a and 710b are segmented in one direction (e.g., the X direction), the gate driver ICs may be connected to pixels 1000 of the plurality of regions 710a and 710b through gate lines 1001 extending in a direction (e.g., the X direction) parallel with one direction and independently control scanning rates of the regions segmented in one direction. The gate driver ICs (e.g., the first gate driver IC 1013 and the second gate driver IC 1015) may turn on the pixels 1000 of the corresponding regions 710a and 710b at a designated scanning rate. Referring to FIG. the timing controller (T-CON) 1011 may transfer vertical synchronization signals (e.g., a first Vsync and a second Vsync) having a designated period (e.g., a first period T1 and a second period T2) to the plurality of gate driver ICs (e.g., the first gate driver IC 1013 and the second gate driver IC 1015), based on information for each scanning rate for each regions (e.g., the first region 710a and the second region 710b) from the processor 650. The vertical synchronization signals (e.g., the first Vsync and the second Vsync) may have periods (e.g., the first period T1 and the second period T2) corresponding to scanning rates. By way of example, in case that the scanning rate is 120 Hz, a transfer period of a vertical synchronization signal may be 8.3 ms. In case that scanning rates configured for each of the regions (e.g., the first region 710a and the second region 710b) correspond, periods at which each of the vertical synchronization signals are transferred correspond to each other, and in case that scanning rates configured for each of the regions (e.g., the first region 710a and the second region 710b) are different, periods at which each of the vertical synchronization signals are transferred may be different. For example, in case that a scanning rate configured to one region (e.g., the first region 710a) is higher than that of another region (e.g., the second region 710b), a period of a vertical synchronization signal (e.g., Vsync 1) transferred to the gate driver IC (e.g., the first gate driver IC 1013) corresponding to the one region may be shorter than a period of a vertical synchronization signal (e.g., Vsync 2) transferred to a gate driver IC (e.g., the second gate driver IC 1015) corresponding to the other region. Conversely, In case that a scan rate is relatively small, a period of the vertical synchronization signal may be relatively long. Based on vertical synchronization signals Vsync 1 and Vsync 2 received at designated periods, each of the gate driver ICs (e.g., the first gate driver IC 1013 and the second gate driver IC 1015) may sequentially apply a pulse in unit of line to which pixels are arranged for each regions (e.g., the first region 710a and the second region 710b) to display a frame image on each region at a designated period. The source drive IC 1017 may apply a voltage corresponding to data to pixels 1000 of each of the turned-on regions 710a and 710b through a source line 1002 so as to allow a content to be displayed on each of the regions 710a and 710b.

According to various embodiments of the disclosure, as shown in FIG. the electronic device 101 may include a gate driver IC 1023 and source driver ICs (e.g., a first source driver IC 1025 and a second source driver IC 1027) corresponding to and the plurality of regions 720a and 720b of the display 639. Referring to FIG. 10B, in case that the plurality of regions 720a and 720b are segmented in one direction (e.g., the Y direction), the source driver ICs (e.g., the first source driver IC 1025 and the second source driver IC 1027) may be connected to pixels 1000 of the plurality of regions 720a and 720b through source lines 1002 extending in a direction (e.g., the Y direction) parallel with one direction and independently control scanning rates of the regions 720a and 720b segmented in one direction. The source driver ICs (e.g., the first source driver IC 1025 and the second source driver IC 1027) may apply a voltage to the pixels 1000 of the corresponding regions 720a and 720b at a designated scanning rate. Referring to FIG. 10B, the timing controller (T-CON) 1021 may transfer vertical synchronization signals (e.g., a first Vsync and a second Vsync) having a designated period (e.g., a first period and a second period) to the plurality of source driver ICs (e.g., the first source driver IC 1025 and the second source driver IC 1027), based on information for each scanning rate for each regions (e.g., the first region 720a and the second region 720b) from the processor 650. The vertical synchronization signals may be generated as described with reference to FIG. 10A, and thus a redundant description will be omitted. The gate driver IC 1023 may turn on pixels of the regions in a designated period. Based on periods in which vertical synchronization signals are received, the plurality of source driver ICs (e.g., the first source driver IC 1025 and the second source driver IC 1027) may sequentially apply an voltage to turned-on pixels for each region in unit of line (e.g., a row line or column line) to which pixels are arranged for each regions to display a frame image on each region at a designated period.

According to various embodiments of the disclosure, as shown in FIG. the electronic device 101 may be implemented to include a single display driver IC (e.g., a gate driver IC 1033 and a source driver IC 1035), wherein the gate driver IC 1033 and/or the source driver IC 1035 includes a shift resistor 1030. The gate driver IC 1033 and/or the source driver IC 1035 may cause a content to be displayed at a period corresponding to a scanning rate configured for each of the plurality of regions 730*a*, 730*b*, 730*c*, and 730*d* by using the shift resistor. For example, each of the driver ICs (e.g., the gate driver IC 1033 and the source driver IC 1035) may control a frequency of a pulse and/or a voltage applied for each region 730*a*, 730*b*, 730*c*, or 730*d* by skipping a portion of a pulse and/or a voltage to be applied for each region 730*a*, 730*b*, 730*c*, or 730*d* by using the shift resistor 1030, based on a period of vertical synchronization signals Vsync 1, Vsync 2, Vsync 3, and Vsync 4 received from the timing controller 1031. The controlled frequency may correspond to a scanning rate configured for each of the regions 730*a*, 730*b*, 730*c*, or 730*d*.

The display driver IC 631 of the electronic device 101 to be described below may be implemented as the display driver IC described above with reference to in FIGS. 9, 10A, 10B, and 10C, and thus a redundant description will be omitted.

Hereinafter, an example of an operation of an electronic device 101 according to various embodiments will be described.

According to various embodiments of the disclosure, the electronic device 101 may obtain (or update or renew) a content to be displayed for each of a plurality of regions 700*a*, 700*b*, 700*c*, and 700*d* based on a scanning rate configured for each of the plurality of regions 700*a*, 700*b*, 700*c*, 700*d*.

Figure 11:
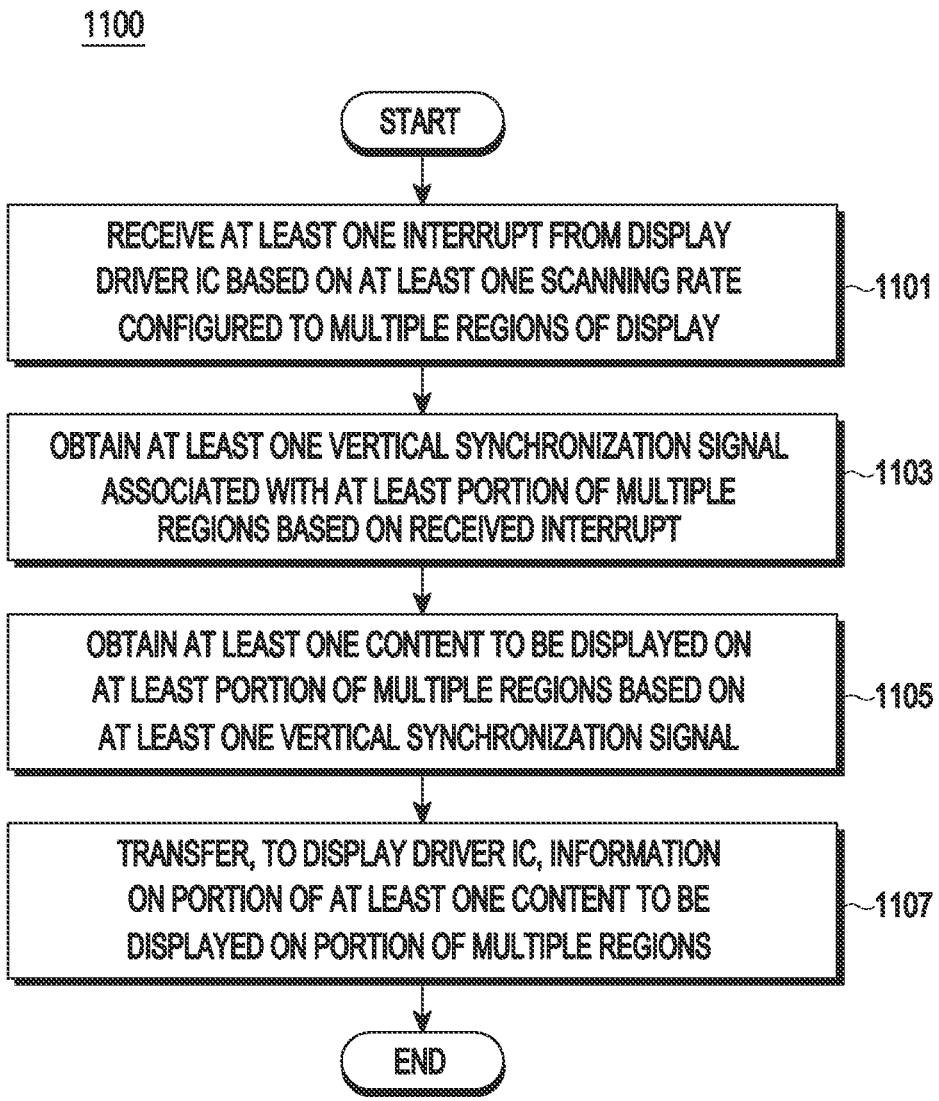
FIG. 11 is a flowchart for illustrating an operation of an electronic device according to an embodiment of the disclosure.

FIG. 11 is a flowchart 1100 for illustrating an operation of an electronic device according to an embodiment of the disclosure. The operations shown in FIG. 11 are not limited to the described order and may be performed in various orders. In addition, according to various embodiments of the disclosure, more operations or the less operations than the operations shown in FIG. 11 may be performed. Hereinafter, FIG. 11 will be described with reference to FIGS. 12, 13A, 13B, and 14.

Figure 12:
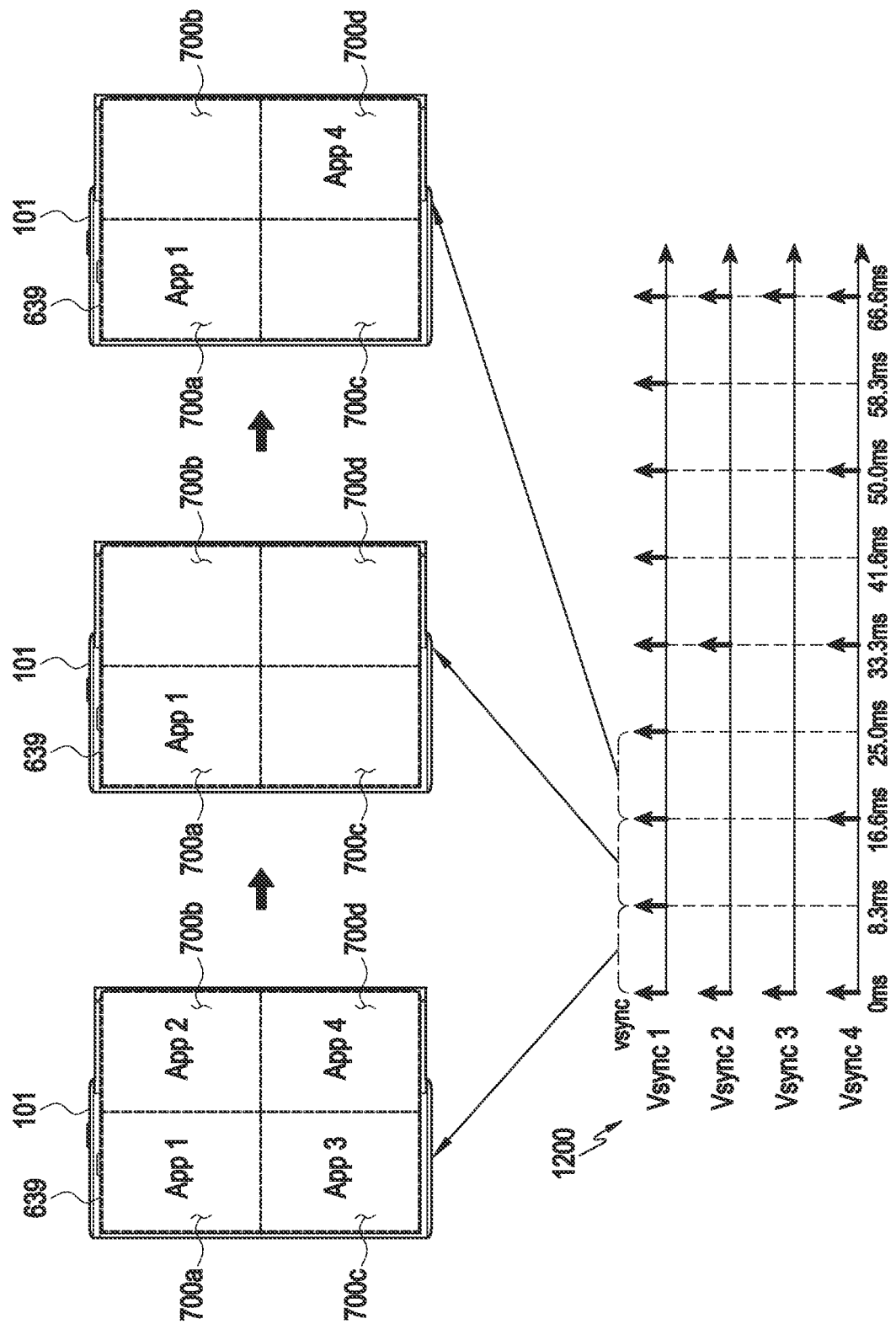
FIG. 12 is a diagram for illustrating an operation of displaying a content for each time point (or order, time interval, or frame) based on a scanning rate selected for each of a plurality of regions of an electronic device according to an embodiment of the disclosure.
Figure 13A:
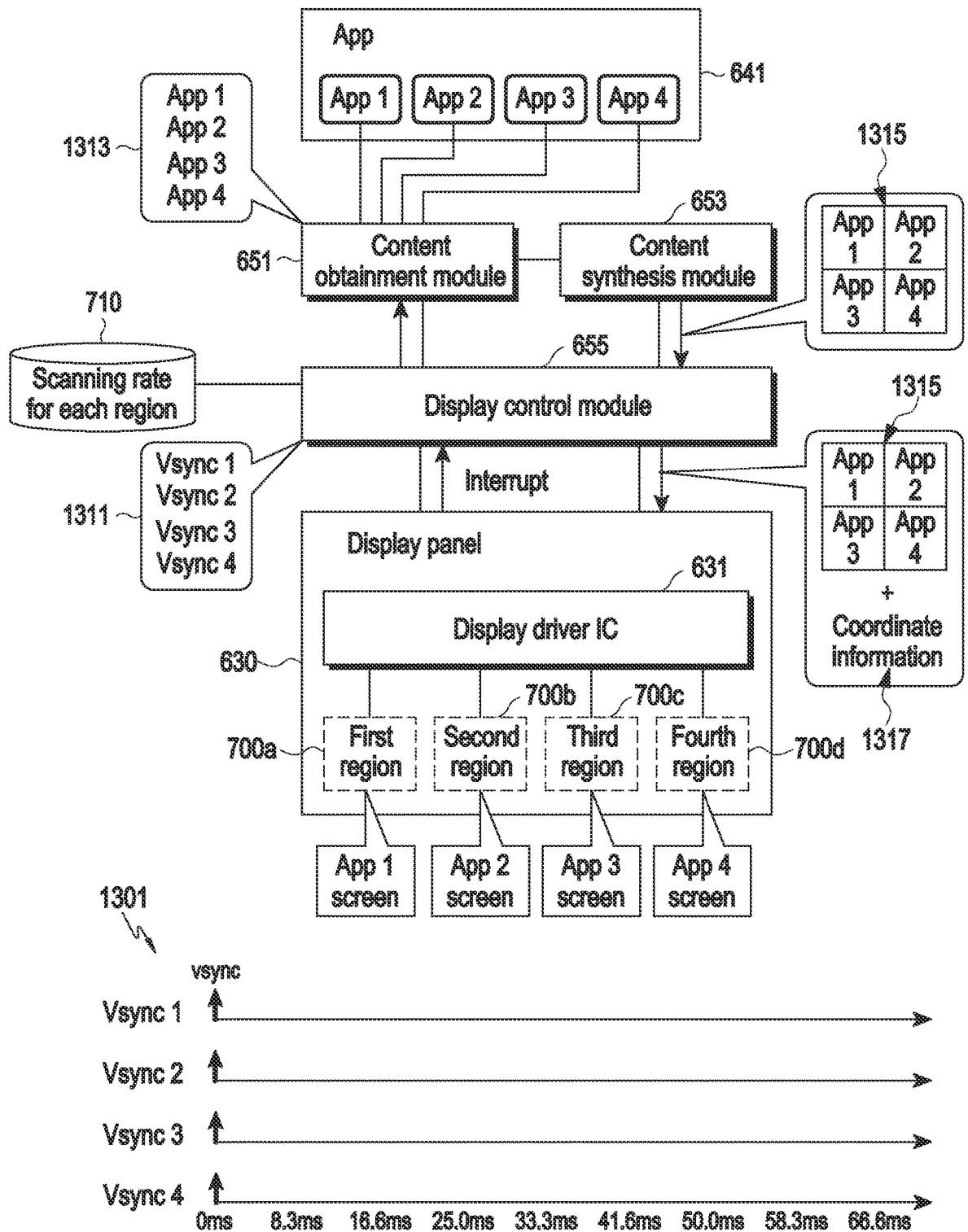
FIG. 13A is a view for illustrating an operation of updating a content at a time point of an electronic device according to an embodiment of the disclosure.
Figure 13B:
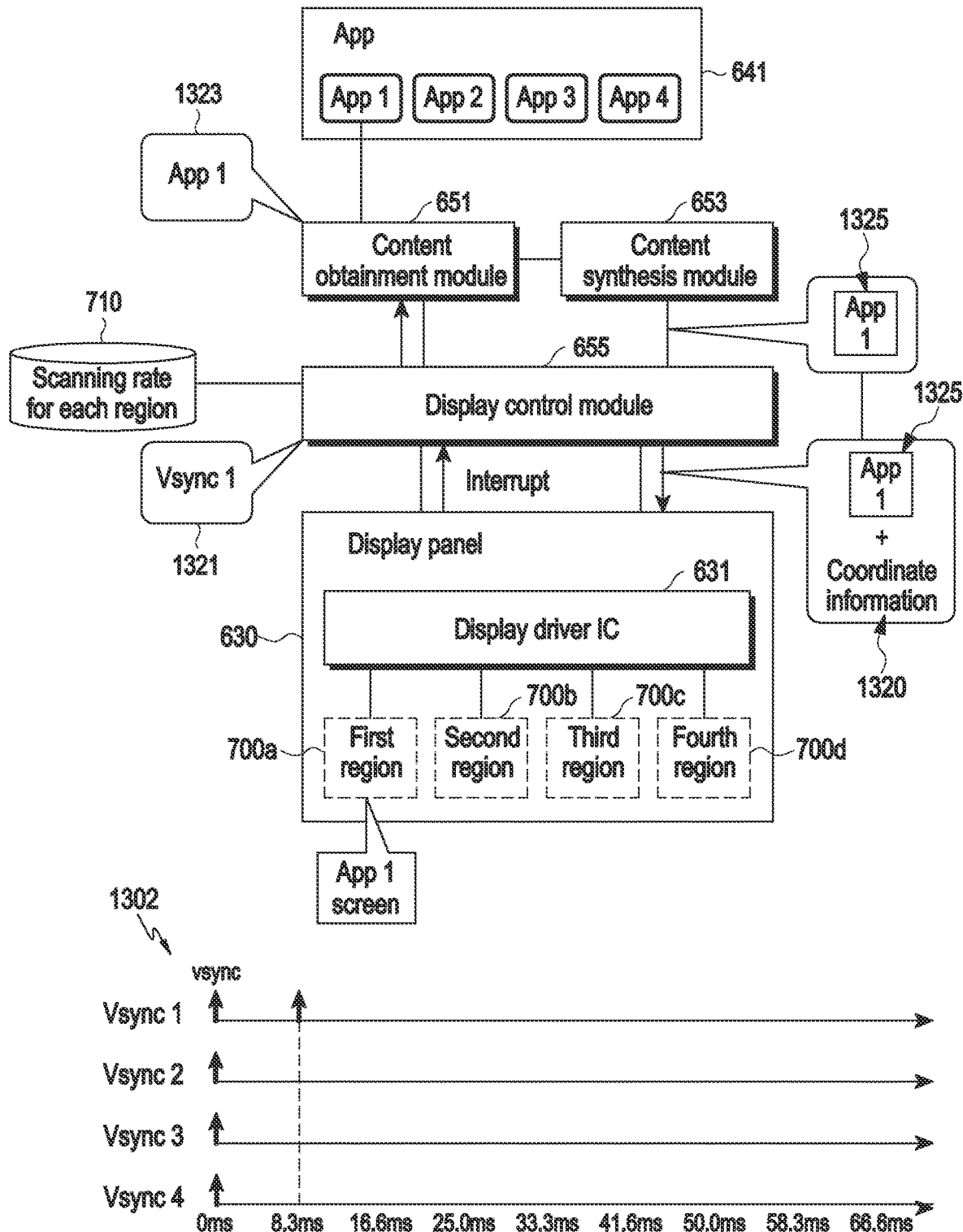
FIG. 13B is a view for illustrating an operation of updating a content at another time point of an electronic device according to an embodiment of the disclosure.
Figure 14:
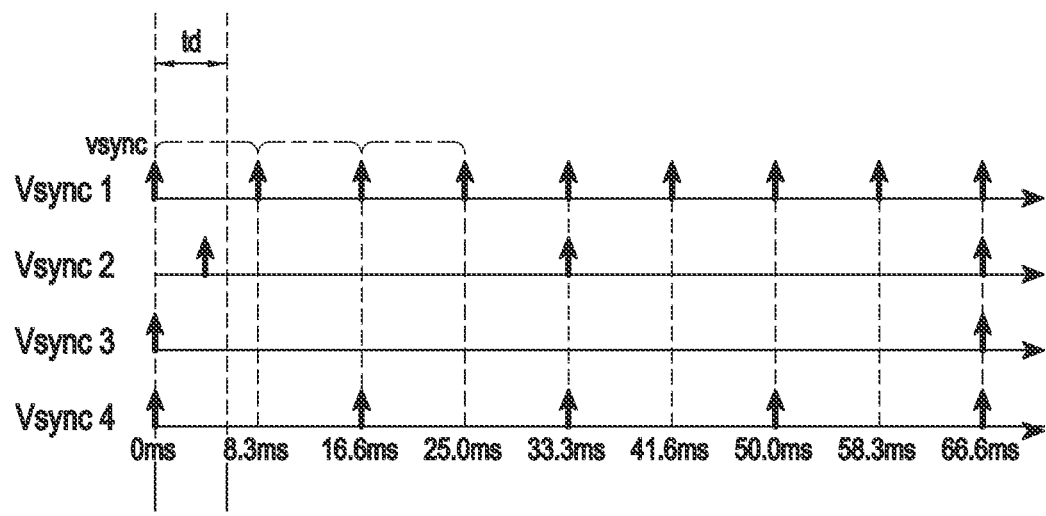
FIG. 14 is a diagram for illustrating a time interval for identifying a vertical synchronization signal of an electronic device according to an embodiment of the disclosure.

FIG. 12 is a diagram for illustrating an operation of displaying a content for each time point (or order, time interval, or frame) based on a scanning rate selected for each of a plurality of regions of an electronic device according to an embodiment of the disclosure. FIG. 13A is a view for illustrating an operation of updating a content at a time point of an electronic device according to an embodiment of the disclosure. FIG. 13B is a view for illustrating an operation of updating a content at another time point of an electronic device according to an embodiment of the disclosure. FIG. 14 is a diagram for illustrating a time interval for identifying a vertical synchronization signal of an electronic device according to an embodiment of the disclosure.

Referring to FIGS. 11, 12, 13, and 14, according to various embodiments of the disclosure, in operation 1101, the electronic device 101 may receive at least one interrupt from the display driver IC 631 based on at least one scanning rate configured to a plurality of regions 700*a*, 700*b*, 700*c*, and 700*d* of the display 639. For example, referring to FIG. 12, the electronic device 101 may execute a plurality of applications 641 (e.g., a first application App 1, a second application App 2, a third application App 3, and a fourth application App 4) and display each screen of the plurality of applications 641 on each of the plurality of regions (e.g., a first regions 700*a*, a second region 700*b*, a third regions 700*c*, and a fourth region 700*d*). Here, a scanning rate may be configured for each of the plurality of regions 700*a*, 700*b*, 700*c*, and 700*d* of the display 639 and the processor 650 may receive an interrupt at a designated period from the display panel 630 (e.g., the display driver IC 631) as shown in FIGS. 13A and 13B. For example, as shown in FIGS. 13A and 13B, in case that the display driver IC 631 generates a vertical synchronization signal at a designated period to display a frame image for each of a plurality of regions 700*a*, 700*b*, 700*c*, and 700*d* based on information on a scanning rate for each of the plurality of regions (e.g., the first regions 700*a*, the second region 700*b*, the third regions 700*c*, and the fourth region 700*d*), the processor 650 (e.g., the display control module 655) may receive an interrupt at a designated period from the display panel 630 through an interface. The scanning rate configured for each of the plurality of regions 700*a*, 700*b*, 700*c*, and 700*d* may be configured by a designated event occurrence (e.g., multi-screen use or configuration by a user) as described above with reference to FIG. 8 or may be configured by a pre-configured value, and thus an abundant description will be omitted. By way of example, each of the plurality of regions 700*a*, 700*b*, 700*c*, and 700*d* may be configured with a different scanning rate and a scanning rate may be configured to 120 Hz in the first region 700*a*, 30 Hz in the second region 700*b*, 15 Hz in the third region 700*c*, and 60 Hz in the fourth region 700*d*. In this case, based on the scanning rate being configured differently, referring to FIG. 12, the electronic device 101 (e.g., the display driver IC 631) may display a content at a specific time point or may not display a content at another specific time point at a designated period (e.g., 8.3 ms) for each of the plurality of regions 700*a*, 700*b*, 700*c*, and 700*d* (e.g., the first region 700*a*, the second region 700*b*, the third region 700*c*, and the fourth region 700*d*). For example, the electronic device 101 (e.g., the display driver IC 631) may display a screen of an application on the first region 700*a*, the second region 700*b*, the third region 700*c*, and the fourth region 700*d* at a first time point (e.g., ms), display a screen of an application on the first region 700*a* at a second time point (e.g., 8.3 ms), and display a screen of an application on the first region 700*a* and the fourth region 700*d* at a third time point (e.g., 16.6 ms). Without limitation thereto, scanning rates configured for each of the plurality of regions 700*a*, 700*b*, 700*c*, and 700*d* may correspond (e.g., identical) to each other.

According to various embodiments of the disclosure, the designated period (e.g., 8.3 ms) in which the interrupt is received may correspond to a highest scanning rate (e.g., 120 Hz configured to the first region 700*a*) among scanning rates configured to the plurality of regions 700*a*, 700*b*, 700*c*, and 700*d*. The display driver IC 631 may perform an operation of generating a vertical synchronization signal for displaying a content for each of the plurality of regions 700*a*, 700*b*, 700*c*, and 700*d*. Here, in order to display a content on a region (e.g., the first region 700*a*) in which a highest scanning rate (e.g., 120 Hz) is configured, the display driver IC 631 may generate Vsync at a period (e.g., 8.3 ms) corresponding to the highest scanning rate (e.g., 120

Hz). Accordingly, interrupts generated at a designated period (e.g., 8.3 ms) may be sequentially transferred from the display driver IC 631 to the processor 650. Other operations of the display driver IC 631 for displaying a content at a scanning rate configured for each of a plurality of regions 700a, 700b, 700c, and 700d will be performed as described above with reference to FIGS. 8, 9, 10A, 10B, and 10C and thus an abundant description will be omitted.

According to various embodiments of the disclosure, in operation 1103, the electronic device 101 may obtain at least one vertical synchronization signal associated with at least a portion of a plurality of regions 700a, 700b, 700c, and 700d based on the received interrupt. For example, as shown in FIGS. 13A and 13B, in response to receiving the interrupt, the electronic device 101 (e.g., the display control module 655) may generate vertical synchronization signals (e.g., a first vertical synchronization signal Vsync 1, a second vertical synchronization signal Vsync 2, a third vertical synchronization signal Vsync 3, and a fourth vertical synchronization signal Vsync 4) corresponding to regions corresponding to a time point at which the interrupt is received, based on information 710 on a scanning rate configured for each of the plurality of regions 700a, 700b, 700c, and 700d. For example, based on information 710 on a scanning rate configured for each of the plurality of regions 700a, 700b, 700c, and 700d, the electronic device 101 (e.g., the display control module 655) may calculate (or obtain or identify) information (e.g., 730 in FIG. 7) on a region on which a content is to be displayed for each of time points (or orders, time intervals, or frames). By way of example, in case that a scanning rate configured to the first region 700a is 120 Hz, a scanning rate configured to the second region 700b is 30 Hz, a scanning rate configured to the third region 700c is 15 Hz, and a scanning rate configured to the fourth region 700d is 60 Hz, the electronic device 101 may obtain (or calculate or identify) information (e.g., 730 in FIG. 7) on regions on which a content is to be displayed at a period of 8.3 ms. Based on the obtained information 730, the electronic device 101 (e.g., the display control module 655) may identify information on regions on which a content is to be displayed at a time point when the interrupt is received and generate (or obtain) vertical synchronization signals corresponding to the identified regions. By way of example, as shown in FIG. 13A, the electronic device 101 (e.g., the display control module 655) may generate (1311) vertical synchronization signals (e.g., the first vertical synchronization signal Vsync 1, the second vertical synchronization signal Vsync 2, the third vertical synchronization signal Vsync 3, and the fourth vertical synchronization signal Vsync 4) corresponding to the first to fourth regions 700a, 700b, 700c, and 700d in response to the interrupt received at 0 ms and may generate (1321), as shown in FIG. 13B, a vertical synchronization signal (e.g., the first vertical synchronization signal Vsync 1) corresponding to the first region 700a in response to the interrupt received at 8.3 ms which is a time point after a designated period (e.g., 8.3 ms). Accordingly, as shown 1301 and 1302, vertical synchronization signals corresponding to regions on which a content is to be displayed may be sequentially generated at a designated period (8.3 ms). The generated vertical synchronization signals may be transferred to the content obtainment module 651. The generated vertical synchronization signals may be pre-configured to correspond to designated regions and accordingly, the content obtainment module 651 may identify regions corresponding to the generated vertical synchronization signals. For example, it may be stored that the first vertical synchronization signal Vsync 1 corresponds to the first region 700a, the second vertical synchronization signal Vsync 2 corresponds to the second region 700b, the third vertical sync signal Vsync 3 corresponds to the third region 700c, and the fourth vertical sync signal Vsync 4 corresponds to the fourth region 700d. Without limitation thereto, as described above, the electronic device 101 may not generate a vertical synchronization signal and may generate information (or signal or data) for identifying at least one region (e.g., on which a content needs to be displayed at a current time point) corresponding to a current time point and transfer the information to the content obtainment module 641.

According to various embodiments of the disclosure, in operation 1105, the electronic device 101 may obtain at least one content to be displayed on at least a portion of the plurality of regions 700a, 700b, 700c, and 700d based on at least one vertical synchronization signal. For example, the electronic device 101 (e.g., the content obtainment module 651) may obtain at least one content (e.g., a screen, surface, and view) from at least one application corresponding to the received at least one vertical synchronization signal. The electronic device 101 (e.g., the content obtainment module 651) may identify regions corresponding to received vertical synchronization signals and identify applications of which screens are displayed on the identified regions among a plurality of applications 641. The electronic device 101 may request a screen update to the identified applications. Each of the applications having received the screen update request may return screens to be displayed at a current time point and information (e.g., coordinate information) on locations on which the screens are to be displayed. Accordingly, the electronic device 101 may obtain location information (e.g., coordinate information) and screens to be displayed at a current time point, which are returned from the applications. The screens may be configured according to performing of a drawing operation by applications based on a received event (e.g., a user touch) and the location information may correspond to coordinate information for defining a region on which a screen is displayed and may include, for example, upper left coordinates (e.g., (0,0)) and upper-right coordinates (e.g., (x,y)). For example, the electronic device 101 (e.g., the content obtainment module 651) may identify (1313) the first to fourth applications App 1, App 2, App 3, and App 4 to be displayed at 0 ms based on the first to fourth vertical synchronization signals Vsync 1, Vsync 2, Vsync 3, and Vsync 4, obtain a screen and information on coordinates for displaying a screen from each of the first to fourth applications App 1, App 2, App 3, and App 4 as shown in FIG. 13A, and may identify (1323) the first application App 1 to be displayed at 8.3 based on the first vertical synchronization signal Vsync 1 and obtain a screen of the first application App 1 and information on coordinates for displaying a screen from the first application App 1 as shown in FIG. 13B. The content obtainment module 651 may transfer the obtained content (e.g., the screens of the applications) 1315 and 1325 and coordinate information 1317 and 1327 to the display control module 655 through the content synthesis module 653 as shown in FIGS. 13A and 13B. Herein, the content synthesis module 653 may synthesize a portion of the content and a description thereof will be given below with reference to FIGS. 15, 16A, and 16B. Without limitation thereto, the content obtainment module 651 may directly transfer the obtained content (e.g., the screens of the applications) 1315 and 1325 and coordinate information 1317 and 1327 to the display control module 655. Meanwhile, as described above, the content synthesis module 653 may receive information (e.g., a signal or data) for identifying at least one region on which a content is to be displayed at a current time point other than the vertical synchronization signals, identify applications corresponding to the received information, and request a content update to the identified applications.

According to various embodiments of the disclosure, the electronic device 101 (e.g., the content obtainment module 651) may obtain content corresponding to vertical synchronization signals obtained during a designated time interval td. In an embodiment of the disclosure, the designated time interval td may correspond to a time interval from a time point when a vertical synchronization signal is first received to a time point after a pre-configured time as shown in FIG. 14. The pre-configured time may be configured to be smaller than a period (e.g., 8.3 ms) corresponding to a highest scanning rate (e.g., 120 Hz) configured to a portion of the plurality of regions 700a, 700b, 700c, and 700d by a predetermined time. In an embodiment of the disclosure, the predetermined time may be configured according to a bandwidth of an interface for electrically connecting the display control module 655 to the display panel 630 and the higher the bandwidth, the smaller the time may be configured, and the smaller the bandwidth, the greater the time may be configured, but is not limited thereto. The plurality of vertical synchronization signals are generated in software by the display control module 655, and thus may be generated with a delay as shown in FIG. 14. Accordingly, the electronic device 101 (e.g., the content obtainment module 651) may be implemented to identify vertical synchronization signals during the designated time interval based on the delayed generation.

According to various embodiments of the disclosure, in operation 1107, the electronic device 101 may transfer, to the display driver IC 631, information on a portion of the at least one content to be displayed on at least a portion of the plurality of regions 700a, 700b, 700c, and 700d. For example, the electronic device 101 (e.g., the display control module 655) may transfer the received content 1315 and 1325 and information 1317 and 1327 (e.g., coordinate information) on locations on which content is to be displayed to the display panel 630 (e.g., the display driver IC 631) through an interface. Meanwhile, the display control module 655 may perform an operation of transmitting information (e.g., dead pixel information) for identifying regions on which content is to be displayed other than coordinate information 1317 and 1327 in order to reduce a data transmission amount and a description thereof will be given below with reference to FIGS. 17, 18A, 18B, and 19. The display driver IC 631 may control the source driver IC 637 so that a content is displayed on at least a portion of a plurality of regions 700a, 700b, 700c, and 700d on which content is to be displayed, based on the information 1315, 1325, 1317, and 1327 on content. By way of example, the display driver IC 631 may perform an operation to display an application screen for each of a plurality of regions 700a, 700b, 700c, and 700d at one time point (e.g., 0 ms) based on screens of the first to fourth applications App 1, App 2, App 3, and App 4 and information of coordinates at which each screen is displayed as shown in FIG. 13A, and may perform an operation to display a screen of the first application App 1 on the first region 700a at another time point (e.g., 8.3 ms) after a designated period, based on the screen of the first application App 1 and coordinate information as shown in FIG. 13B. The operation of the display driver IC 631 for displaying a content is the same as described above with reference to FIG. 8 and FIGS. 10A, 10B, 10C, 11, 12, 13A, and 13B, and thus an abundant description will be omitted.

Hereinafter, an example of an operation of an electronic device 101 according to various embodiments will be described. The example of the operation of the electronic device 101 described above may be applied to an example of an operation of the electronic device 101 to be described below, and thus a redundant description will be omitted.

According to various embodiments of the disclosure, the electronic device 101 may synthesize a portion of a plurality of content based on coordinate information on updated a plurality of content. According to the synthesis, an amount of data transmitted from the processor 650 to the display panel 630 may be reduced.

Figure 15:
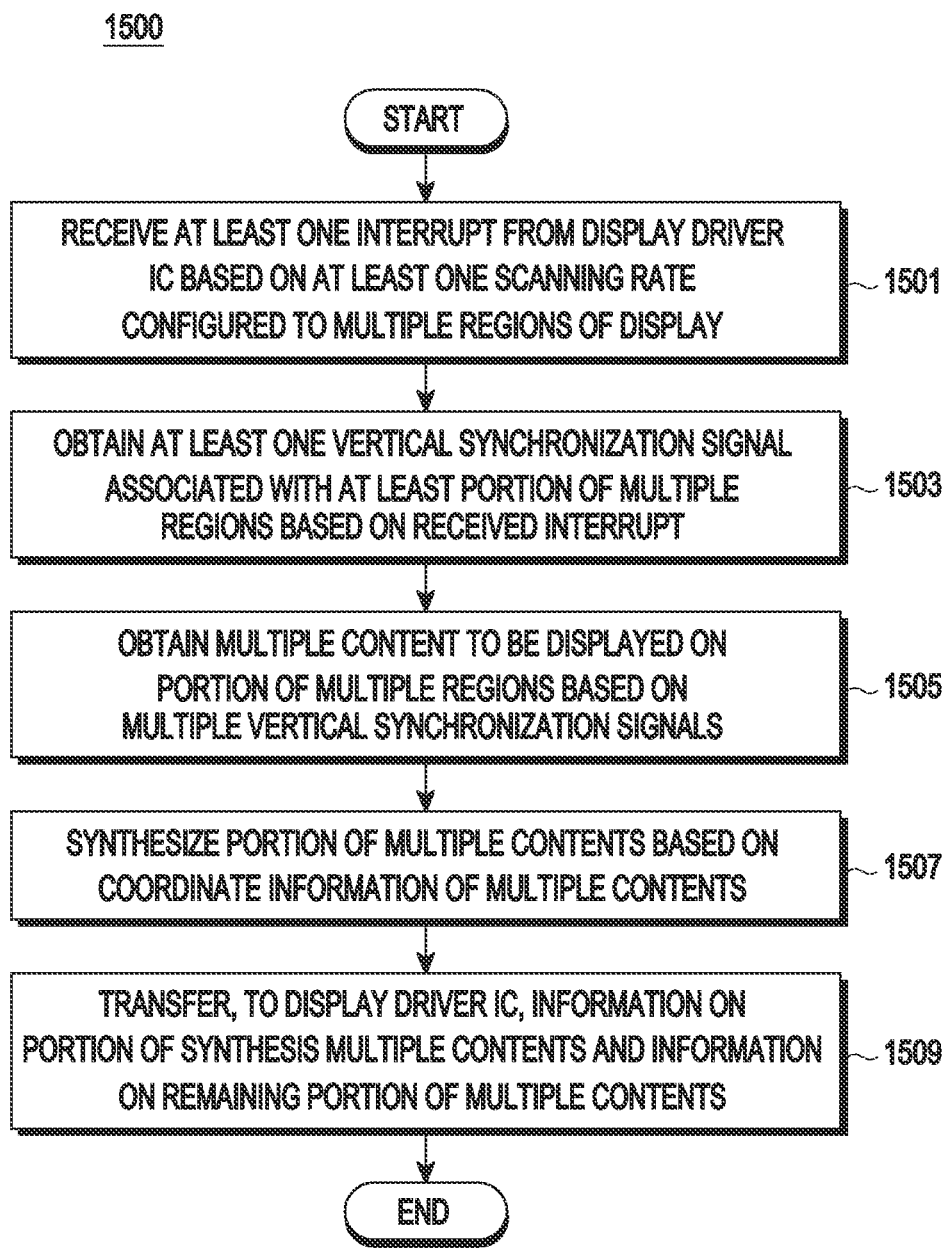
FIG. 15 is a flowchart for illustrating an operation of an electronic device according to an embodiment of the disclosure.

FIG. 15 is a flowchart 1500 for illustrating an operation of an electronic device according to an embodiment of the disclosure. The operations shown in FIG. 15 are not limited to the described order and may be performed in various orders. In addition, according to various embodiments of the disclosure, more operations or the less operations than the operations shown in FIG. 15 may be performed. Hereinafter, FIG. 15 will be described with reference to FIGS. 16A and 16B.

Figure 16A:
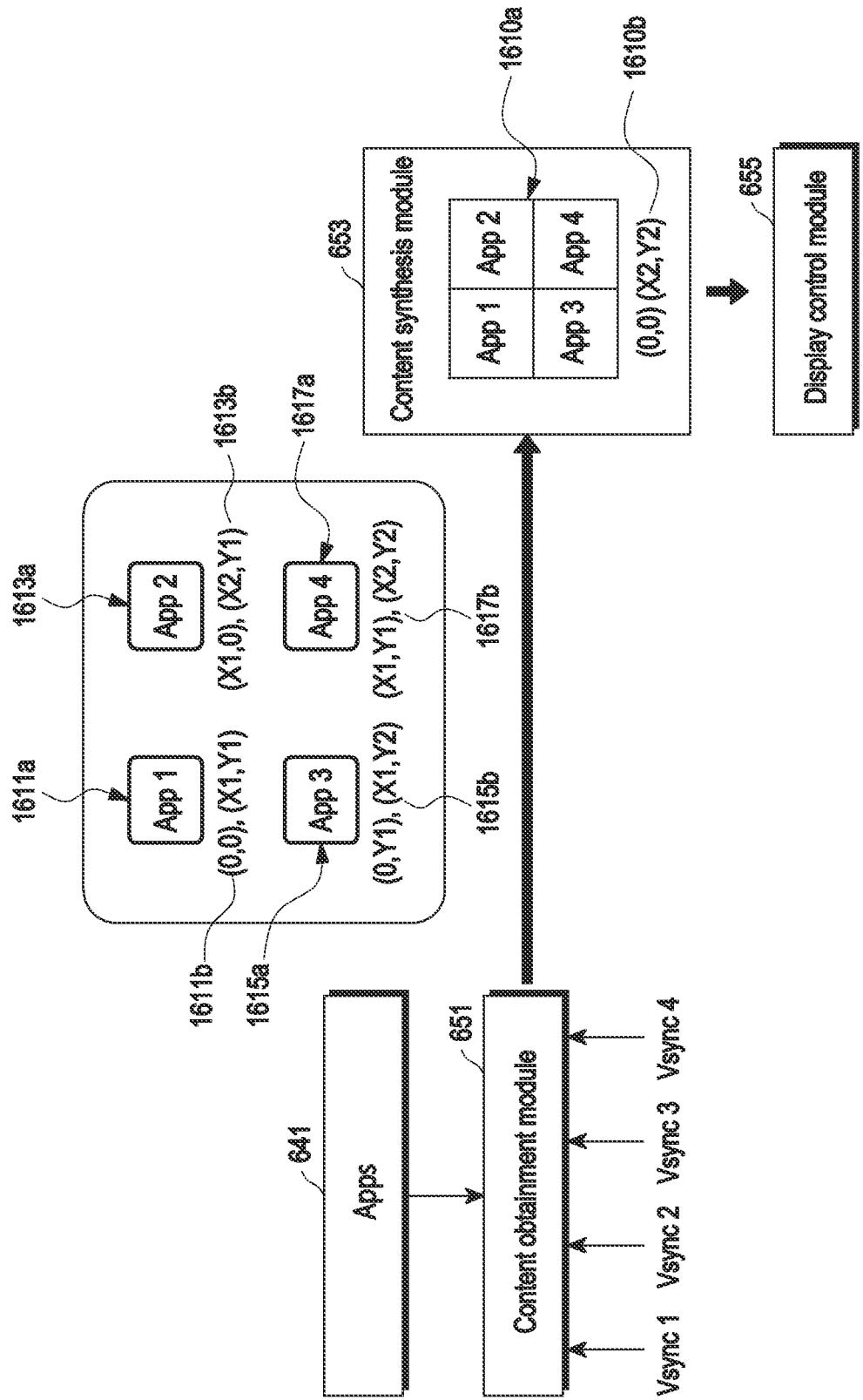
FIG. 16A is a flowchart for illustrating a content synthesis operation of an electronic device according to an embodiment of the disclosure.
Figure 16B:
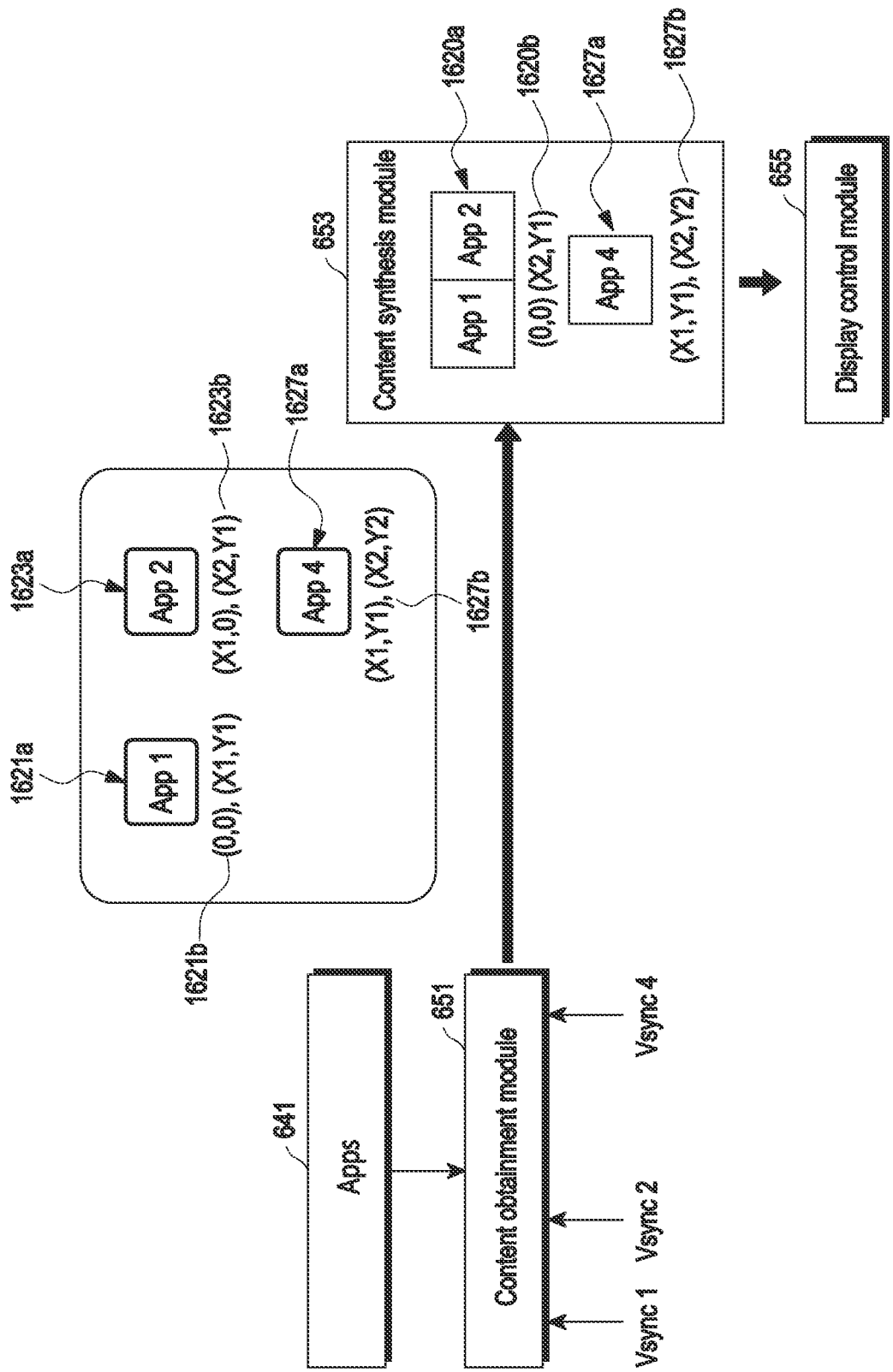
FIG. 16B is a flowchart for illustrating a content synthesis operation of an electronic device according to an embodiment of the disclosure.

FIG. 16A is a flowchart for illustrating a content synthesis operation of an electronic device according to an embodiment of the disclosure. FIG. 16B is a flowchart for illustrating a content synthesis operation of an electronic device according to an embodiment of the disclosure.

Referring to FIGS. 15, 16A, and 16B, according to various embodiments of the disclosure, in operation 1501, the electronic device 101 may receive at least one interrupt from the display driver IC 631 based on at least one scanning rate configured to a plurality of regions 700a, 700b, 700c, and 700d of the display 639. For example, in case that the display driver IC 631 generates a vertical synchronization signal at a designated period to display a frame image for each of a plurality of regions 700a, 700b, 700c, and 700d based on information on a scanning rate for each of the plurality of regions 700a, 700b, 700c, and 700d (e.g., the first regions 700a, the second region 700b, the third regions 700c, and the fourth region 700d), the processor 650 (e.g., the display control module 655) may receive an interrupt at a designated period from the display panel 630 through an interface. Operation 1501 of the electronic device 101 is performed in the same manner as operation 1101 of the electronic device 101 as described above, and thus a redundant description will be omitted.

According to various embodiments of the disclosure, the electronic device 101 may obtain multiple vertical synchronization signals associated with a portion of the plurality of regions 700a, 700b, 700c, and 700d based on the received interrupt in operation 1503 and may obtain a plurality of content to be displayed on a portion of the plurality of regions 700a, 700b, 700c, and 700d based on the plurality of vertical synchronization signals in operation 1505. For example, based on the obtained information, the electronic device 101 (e.g., the display control module 655) may identify information on regions on which a content is to be displayed at a time point when the interrupt is received and generate (or obtain) vertical synchronization signals corresponding to the identified regions. The electronic device 101 (e.g., the content obtainment module 651) may request a screen update to a plurality of applications 641 corresponding to the generated vertical synchronization signals and may obtain a plurality of content (e.g., screens, surfaces, and views) from applications. By way of example, the electronic device 101 may obtain screens 1611a, 1613a, 1615a, and 1617a of the first to fourth applications App 1, App 2, App 3, and App 4 and coordinate information 1611b, 1613b,

1615b, and 1617b of screens at a first time point (e.g., 0 ms) based on the first to fourth vertical synchronization signals Vsync 1, Vsync 2, Vsync 3, and Vsync 4 as shown in FIG. 16A, and may obtain screens 1621a, 1623a, and 1627a of the first to second and fourth applications App 1, App 2, and App 4 and coordinate information 1621b, 1623b, and 1627b of screens at a second time point (e.g., 33.3 ms) different from the first time point based on the first to second and fourth vertical synchronization signals Vsync 1, Vsync 2, and Vsync 4 as shown in FIG. 16B. Operations 1503 to 1505 of the electronic device 101 may be performed in the same manner as operations 1103 to 1105 of the electronic device 101 described above, and thus a redundant description will be omitted.

According to various embodiments of the disclosure, in operation 1507, the electronic device 101 may synthesize a portion of a plurality of content based on coordinate information on a plurality of content. For example, the electronic device 101 (e.g., the content synthesis module 653) may classify a plurality of content obtained in a unit of a designated shape (e.g., a rectangle (e.g., rect)) and synthesize classified groups. The designated shape may be configured to correspond to a shape of the plurality of regions 700a, 700b, 700c, and 700d. Referring to FIGS. 16A and 16B, the content synthesis module 653 may identify a portion which may be synthesized with a largest area in a unit of a designated shape (e.g., a rectangle) among content 1611a, 1613a, 1615a, 1617a, 1621a, 1623a, and 1627a, based on information 1611b, 1613b, 1615b, 1617b, 1621b, 1623b, and 1627b on coordinates at which the screen obtained from the content obtainment module 651 are to be displayed, synthesize a portion of the identified content, and obtain coordinate information on a portion of the synthesized content. By way of example, as shown in FIG. 16A, the content synthesis module 653 may identify screens of the first to fourth applications App1, App 2, App 3, and App 4, which may be synthesized with a largest area in units of rectangles from screens 1611a, 1613a, 1615a, and 1617a of the first to fourth applications App 1, App 2, App 3, and App 4, synthesize screens of the first to fourth applications App1, App 2, App 3, and App 4, and obtain the synthesized content 1610a and coordinate information 1610b (e.g., (0, 0), (X2, Y2)) on the synthesized content 1610a. By way of another example, as shown in FIG. 16B, the content synthesis module 653 may identify screens 1621a and 1623a of the first to second applications App 1 and App 2, which may be synthesized with a largest area in a unit of rectangle, from screens 1621a, 1623a, and 1627a of the first to second and fourth applications App 1, App 2, and App 4, synthesize screens 1621a and 1623a of the first to second applications App 1 and App 2, and obtain the synthesized content 1620a and coordinate information 1620b (e.g., (0, 0), (X2, Y2)) of the synthesized content 1620a. Without limitation to what is shown and/or described, there are two or more synthesized content. In addition, the content synthesis module 653 may perform an operation of synthesizing a portion which may be synthesized with a largest area among the obtained content and synthesizing a portion again which may be synthesized with a largest area among remaining content as described above. The content synthesis module 653 may transfer, to the display control module 655, a remaining portion 1627a which has not been synthesized among content and coordinate information on the remaining portion 1627a together with the synthesized content 1610a and 1620a and the coordinate information 1610b and 1620b of the content according to a result of the synthesis operation.

Hereinafter, an operation of the content synthesis module 653 for identifying synthesizable content will be described.

In an embodiment of the disclosure, in case that one content and another content have coordinate values consecutive in one direction and have the same coordinate value range in another direction, the content synthesis module 653 may identify that the one content and the other content are synthesizable and synthesize one content and the other content. For example, referring to FIG. 16B, based on identifying that coordinate values (0 to X1) of the screen 1621a of the first application App 1 in one direction (e.g., the X direction) and coordinate values (X1 to X2) of the screen 1623a of the second application App 2 in one direction (e.g., the X direction) are consecutive and a coordinate value range (e.g., 0 to Y1) of the screen 1621a of the first application App 1 and the screen 1623a of the second application App 2 is the same, the content synthesis module 653 may synthesis the screen 1621a of the first application App 1 and the screen 1623a of the second application App 2. Without limitation to what is shown and/or described, the content synthesis module 653 may determine whether coordinate values are consecutive in the Y direction and a coordinate value range is the same in the X direction. Accordingly, without limitation to what is described in FIG. 16B, the screen 1623a of the second application App 2 and the screen 1627a of the fourth application App 4 may be synthesized. Without limitation thereto, an operation of synthesizing a larger number of content may be performed instead of an operation of synthesizing two content. After the synthesis, the content synthesis module 653 may further synthesize the synthesized content when the synthesized content have coordinate values consecutive in a different direction and the same coordinate values range in one direction. For example, referring to FIG. 16A, based on identifying that the screens 1611a and 1613a of the first to second applications App 1 and App 2 and the screens 1615a and 1617a of the third to fourth applications App 3 and App 4 have coordinate values consecutive in the Y direction and have the same coordinate value range in the X direction, the content synthesis module 653 may synthesis the synthesized screens 1611a and 1613a of the first to second applications App1 and App 2 and the synthesized screens 1615a and 1617a of the third to fourth applications App 3 and App 4. Accordingly, the content synthesis module 653 may synthesize content with a largest area. Thereafter, the content synthesis module 653 may perform the synthesis operation as described above for the remaining content other than a portion of the synthesized content.

Furthermore, in an embodiment of the disclosure, the content synthesis module 653 may synthesize a portion of the obtained content based on coordinate information preconfigured to be synthesizable and stored in advance. For example, referring to FIG. 16A, regions having coordinate information of (0,0) and (X2, Y2) may be pre-stored as synthesizable, and referring to FIG. 16B, regions having coordinate information of (0,0) and (X2, Y1) may be pre-stored as synthesizable in the memory 640 of the electronic device 101. The content synthesis module 653 may compare coordinate information of currently obtained content with the pre-stored coordinate information, and identify portions (or groups) of the content having coordinate information corresponding to the pre-stored coordinate information. The content synthesis module 653 may identify portions of the identified content (or groups) having a largest area, and synthesize a portion of the identified content. Thereafter, the content synthesis module 653 may perform the synthesis operation as described above for the remaining content other than a portion of the synthesized content.

According to various embodiments of the disclosure, in operation 1509, the electronic device 101 may transfer, to the display driver IC 631, information on a portion of the synthesized a plurality of content and information on the remaining portion of the plurality of content. For example, the display control module 655 may transfer information on the synthesized portion of the received content and information on the remaining portion of the content to the display driver IC 631 so as to allow the content to be displayed on a portion of a plurality of regions 700a, 700b, 700c, and 700d. Operation 1509 of the electronic device 101 is performed in the same manner as operation 1107 of the electronic device 101 as described above, and thus a redundant description will be omitted.

Hereinafter, an example of an operation of an electronic device 101 according to various embodiments will be described. The example of the operation of the electronic device 101 described above may be applied to an example of an operation of the electronic device 101 to be described below, and thus a redundant description will be omitted.

According to various embodiments of the disclosure, the electronic device 101 may transmit at least one content and identification information for identifying at least one region on which at least one content is to be displayed to the display panel 630 (e.g., the display driver IC 631) at a designated period.

Figure 17:
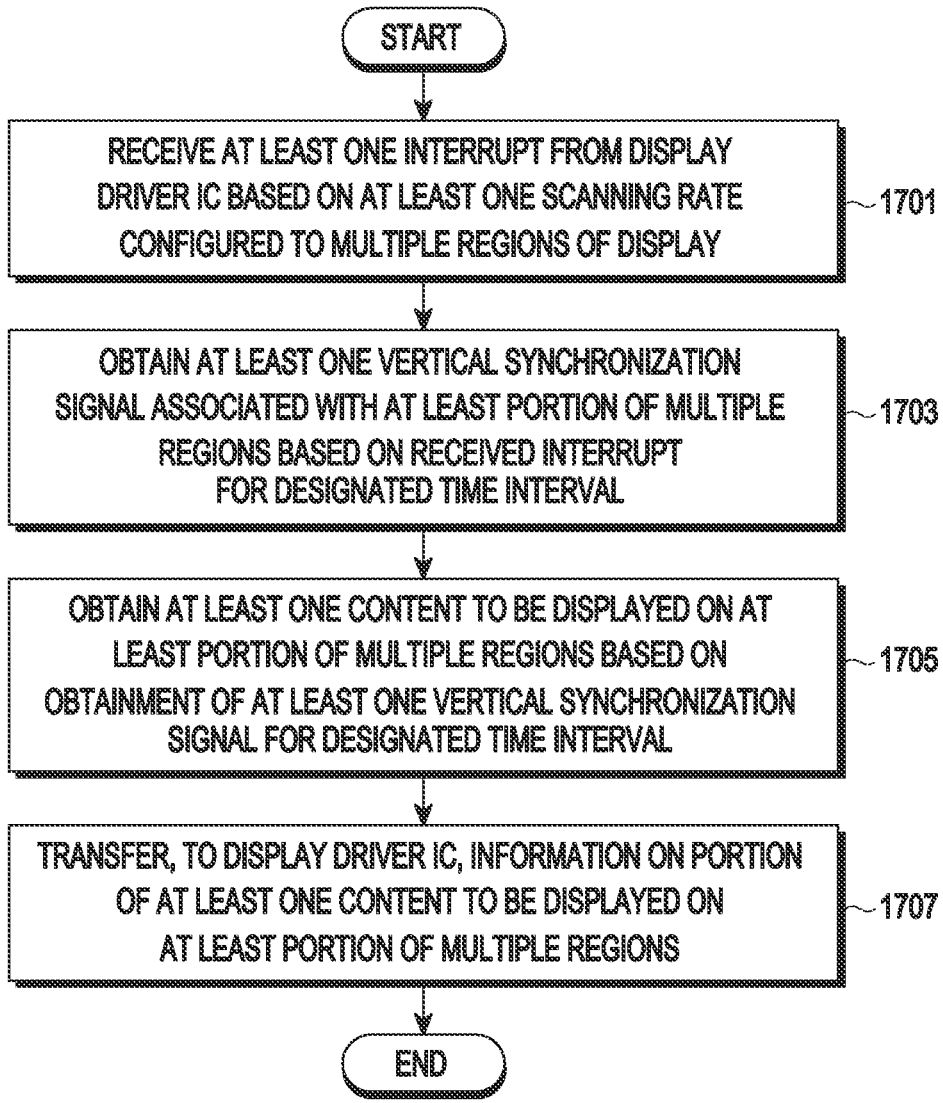
FIG. 17 is a flowchart for illustrating an operation of an electronic device according to an embodiment of the disclosure.

FIG. 17 is a flowchart 1700 for illustrating an operation of an electronic device according to an embodiment of the disclosure. The operations shown in FIG. 17 are not limited to the described order and may be performed in various orders. In addition, according to various embodiments of the disclosure, more operations or the less operations than the operations shown in FIG. 17 may be performed. Hereinafter, FIG. 17 will be described with reference to FIGS. 18A, 18B, and 19.

Figure 18A:
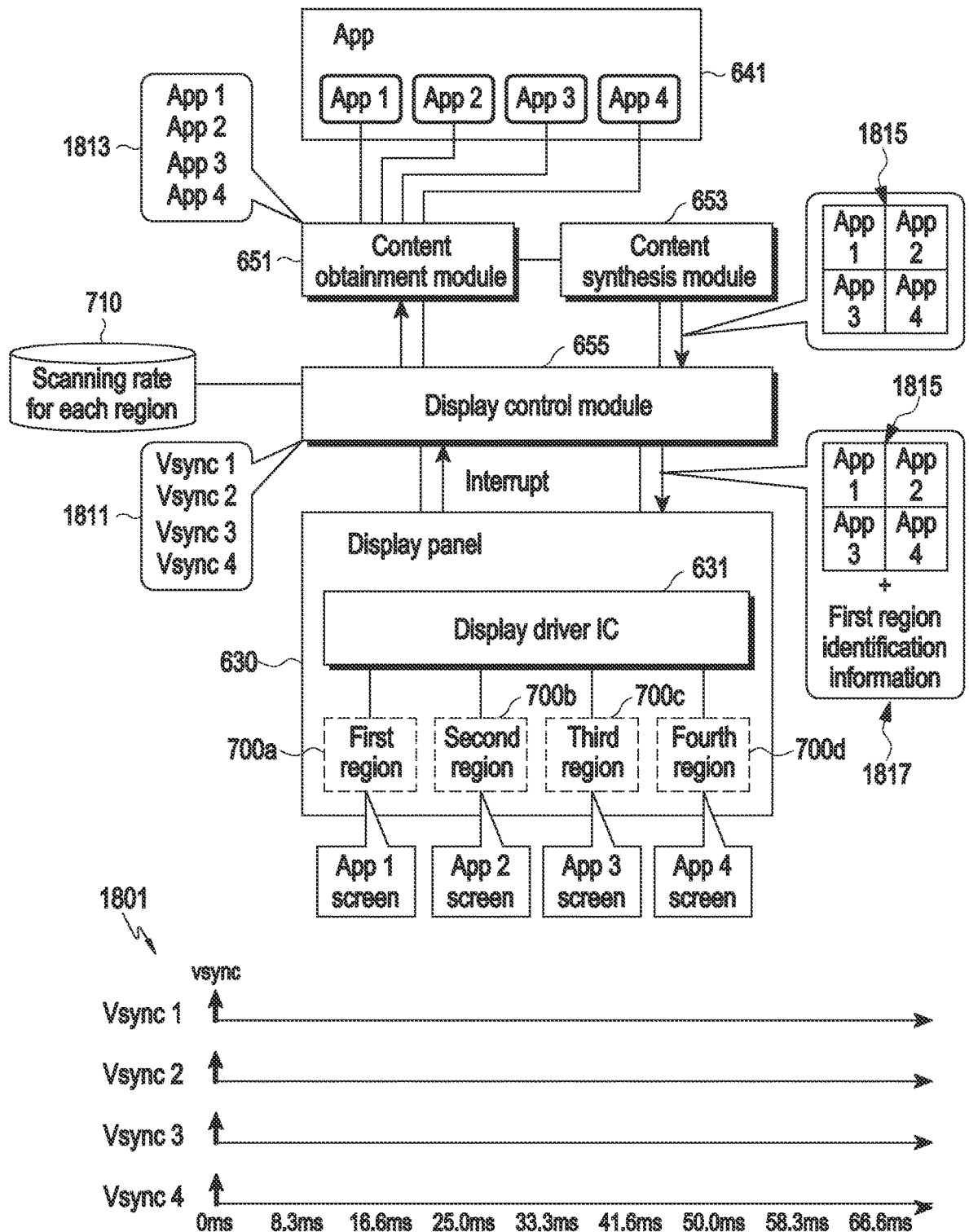
FIG. 18A is a view for illustrating an operation of transmitting, to a display panel, identification information for an area to display a content of an electronic device according to an embodiment of the disclosure.
Figure 18B:
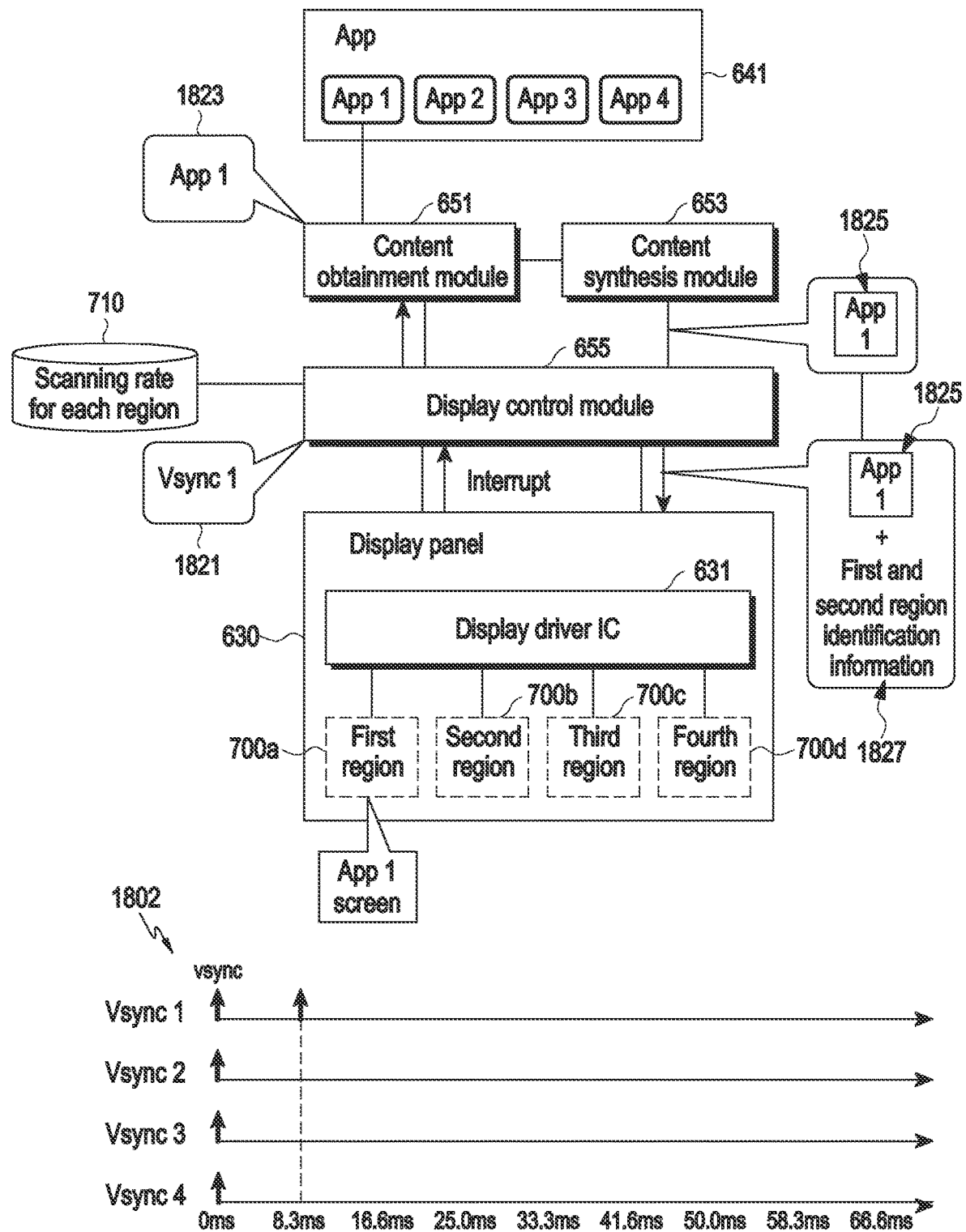
FIG. 18B is a view for illustrating an operation of transmitting, to a display panel, identification information for an area to display a content of an electronic device according to an embodiment of the disclosure.
Figure 19:
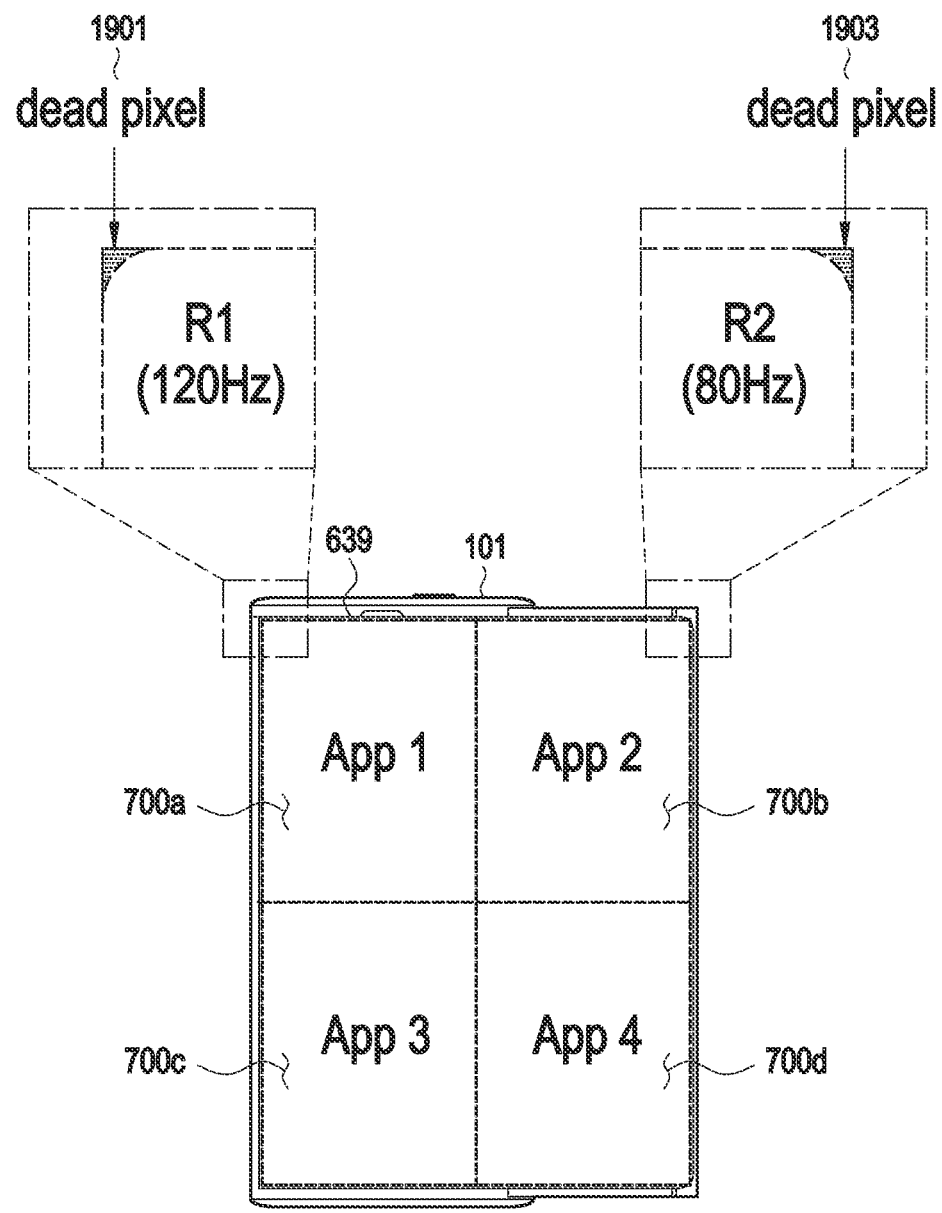
FIG. 19 is a diagram for illustrating dead pixel information as identification information for an area to display a content according to an embodiment of the disclosure.

FIG. 18A is a view for illustrating an operation of transmitting, to a display panel, identification information for an area to display a content of an electronic device according to an embodiment of the disclosure. FIG. 18B is a view for illustrating an operation of transmitting, to a display panel, identification information for an area to display a content of an electronic device according to an embodiment of the disclosure. FIG. 19 is a diagram for illustrating dead pixel information as identification information for an area to display a content according to an embodiment of the disclosure.

Referring to FIGS. 17, 18A, 18B, and 19, according to various embodiments of the disclosure, in operation 1701, the electronic device 101 may receive at least one interrupt from the display driver IC 631 based on at least one scanning rate configured to a plurality of regions 700a, 700b, 700c, and 700d of the display 639. For example, in case that the display driver IC 631 generates a vertical synchronization signal at a designated period to display a frame image for each of a plurality of regions 700a, 700b, 700c, and 700d based on information on a scanning rate for each of the plurality of regions 700a, 700b, 700c, and 700d (e.g., the first regions 700a, the second region 700b, the third regions 700c, and the fourth region 700d), the processor 650 (e.g., the display control module 655) may receive an interrupt at a designated period from the display panel 630 through an interface. Operation 1701 of the electronic device 101 is performed in the same manner as operation 1101 of the electronic device 101 as described above, and thus a redundant description will be omitted.

According to various embodiments of the disclosure, the electronic device 101 may obtain at least one vertical synchronization signal associated with at least a portion of a plurality of regions 700a, 700b, 700c, and 700d based on the received interrupt in operation 1703 and may obtain at least one content to be displayed on at least a portion of the plurality of regions 700a, 700b, 700c, and 700d based on the at least one vertical synchronization signal in operation 1705. For example, the electronic device 101 (e.g., the display control module 655) may identify information on at least one region on which a content is to be displayed at a time point when an interrupt is received and generate (or obtain) at least one vertical synchronization signal corresponding to the identified at least one region. Accordingly, as shown 1801 and 1802, vertical synchronization signals may be sequentially generated for each time point. The electronic device 101 (e.g., the content obtainment module 651) may request a screen update to at least one application corresponding to the generated at least one vertical synchronization signal and obtain at least one content (e.g., a screen, surface, and view) from the at least one application. By way of example, the electronic device 101 may generate (1811) first to fourth vertical synchronization signals Vsync 1, Vsync 2, Vsync 3, and Vsync at a first time point (e.g., 0 ms) and obtain screens 1815 of first to fourth applications App 1, App 2, App 3, and App 4 identified (1813) based on the first to fourth vertical synchronization signals Vsync 1, Vsync 2, Vsync 3, and Vsync 4 and coordinate information (not shown) as shown in FIG. 18A, and may generate (1821) a vertical synchronization signal Vsync 1 at a second time point (e.g., 8.3 ms) and obtain a screen 1825 of the first application App 1 identified (1823) based on the vertical synchronization signal Vsync 1 and coordinate information (not shown). Operations 1703 to 1705 of the electronic device 101 may be performed in the same manner as operations 1103 to 1105 of the electronic device 101 described above, and thus a redundant description will be omitted.

According to various embodiments of the disclosure, in operation 1707, the electronic device 101 may transfer, to the display driver IC 631, information on a portion of the at least one content to be displayed on at least a portion of the plurality of regions 700a, 700b, 700c, and 700d and information for identifying at least a portion of the plurality of regions 700a, 700b, 700c, and 700d. For example, as shown in FIGS. 18A and 18B, the electronic device 101 (e.g., the display control module 655) may transmit identification information (e.g., information 1817 for identifying the first region 700a and information 1827 for identifying the first region 700a and the fourth region 700d) for identifying at least one region on which a content is to be displayed at a time point next to a current time point (or next order, time interval, or frame) together with content obtained at the current time point (or order, time interval, or frame) to the display panel 630 (e.g., the display driver IC 631). The information for identifying the regions may include, for example, dead pixel information and a description thereof will be given below. In case that information on content is received from the content synthesis module 653, the electronic device 101 (e.g., the display control module 655) may identify at least one region to display a content at a next time point (or next order, next time interval, or next frame) of a current time point (or current order or current time interval) based on information 710 on a scanning rate configured for each of a plurality of regions 700a, 700b, 700c, and 700d and transmit information on obtained content and identification information for identifying at least one region to the display panel 630 (e.g., the display driver IC 631). For example, as shown in FIG. 18A, the electronic device 101 (e.g., the display control module 655) may transmit information 1817 for identifying the first region 700a to display a content at a second time point (e.g., 8.3 ms) next to a first time point together with screens 1815 of the first to fourth applications App 1, App 2, App 3, and App 4 obtained at the first time point (e.g., 0 ms) to the display panel 630 and transmit information 1827 for identifying the first region 700a and the fourth region 700d to display a content at a third time point (e.g., 16.6 ms) next to the second time point together with a screen 1825 of the first application App 1 obtained at the second time point (e.g., 8.3 ms) to the display panel 630 (e.g., the display driver IC 631). The display driver IC 631 may control to identify regions on which a content is to be displayed at a next time point of a current time point based on the received identification information and display a content on the identified regions in case that a content is received at the next time point. Here, the display driver IC 631 may be preconfigured to display content (e.g., screens of the first to fourth applications App 1, App 2, App 3, and App 4) on each of a plurality of regions 700a, 700b, 700c, 700d even if information for identifying regions on which a content is to be displayed initially (e.g., at 0 ms) is not received. Alternatively, although not described or shown above, the electronic device 101 (e.g., the display control module 655) may transmit information on coordinates at which content is to be display initially (e.g., at 0 ms) together with the above-described content and identification information to the display panel 630 (e.g., the display driver IC 631) and then may not transmit information on coordinates from a next time point. Accordingly, the display driver IC 631 may perform an operation of displaying content initially (e.g., at 0 ms) based on coordinate information. However, the disclosure is not limited what is described and/or shown, the electronic device 101 (e.g., the display control module 655) may transmit identification information for identifying at least one region on which a content is to be displayed at a current time point rather than identification information for identifying at least one region on which a content is to be displayed at a next time point of the current time point to the display panel 630.

According to various embodiments of the disclosure, the electronic device 101 (e.g., the display control module 655) may store the identification information to be associated with designated at least one pixel of a portion of a plurality of regions 700a, 700b, 700c, and 700d and the display driver IC 631 may display a content for each of regions corresponding to the identification information with reference to the identification information stored to be associated with the designated at least one pixel. For example, the designated at least one pixel may include a dead pixel (e.g., a dead pixel 1901 or 1903). Although not shown in FIG. 19, the third region 700c and the fourth region 700d may include a dead pixel. The dead pixel may be defined as a pixel not exposed to the outside among pixels of each of a plurality of regions 700a, 700b, 700c, and 700d of the display and/or a pixel not used by the electronic device 101. In an embodiment of the disclosure, the electronic device 101 (e.g., the display control module 655) may determine a dead pixel 1901 of a region having a highest scanning rate among a plurality of regions 700a, 700b, 700c, and 700d as a pixel for storing identification for identifying regions on which a content is to be displayed. For example, the display control module 655 may transmit and/or store (e.g., store in GRAM) identification information (e.g., dead pixel information) for identifying a region on which a content is to be displayed to be associated with the dead pixel 1901 as described above. Here, the storing to be associated may be understood as storing information in a portion (or location or address) of a memory (e.g., GRAM) corresponding to the dead pixel 1901. Accordingly, the display driver IC 631 may update a content on regions identified by the identification information at a next time point based on the dead pixel information stored to be associated with the dead pixel 1901.

For example, the identification information for identifying a region on which a content is to be displayed may be implemented as dead pixel information to be described below. For example, the dead pixel information may be implemented to include a value (e.g., 1) indicating whether to update for each of regions 700a, 700b, 700c, and 700d as shown in Table 1 below. By way of example, dead pixel information for the first region 700a may be implemented as 0X3 00011, and dead pixel information for the first region 700a and the fourth region 700d may be implemented as 0X13 10011. The dead pixel information may be updated to be associated with a dead pixel to a memory (e.g., GRAM) of the display driver IC 631 and the display driver IC 631 may identify (e.g., in case of 00011, BIT 1 is 1 and thus identify the first region 700a) a region corresponding to the dead pixel information, on which a content is to be displayed at a next time point (or next frame) with reference to the dead pixel information stored to be associated with the dead pixel from the memory (e.g., GRAM). Meanwhile, a mode for transmitting coordinate information on regions on which a content is to be displayed may be defined as a coordinate mode and as a mode for transmitting and storing (e.g., storing in DRAM) identification information to be associated with the dead pixel may be defined as a dead pixel mode. Here, in [Table 1] below, when a BIT0 value of the dead pixel information is configured to 1, it may be identified that the dead pixel mode is activated, and when the BIT0 value is configured to 0, it may be identified that the dead pixel mode is deactivated, but is not limited thereto. As described above, when a dead pixel 1901 of the first region 700a having a highest scanning rate among dead pixels 1901 and 1903 for each of the regions 700a, 700b, 700c, and 700d is selected, a BIT0 value associated with the dead pixel 1901 may be 1, and a BIT0 value associated with other dead pixels (e.g., 1903) may be 0. Accordingly, the display driver IC 631 may determine whether the dead pixel mode is activated by referring to the BIT0 value stored to be associated with the dead pixels for each of the regions 700a, 700b, 700c, and 700d, and may display a content on regions corresponding to the dead pixel information by referring to the dead pixel information stored to be associated with the corresponding dead pixel (e.g., 1903) in case that the dead pixel mode for the corresponding pixel (e.g., 1903) is activated (e.g., in case that the BIT0 value is 1).

TABLE 1

| BIT | Operation | Description |
|---|---|---|
| BIT0 | Dead pixel mode activation | 0: Deactivation<br>1: Activation |
| BIT1 | First region update | 0: No update |
| BIT2 | Second region update | 1: Update |
| BIT3 | Third region update | |
| BIT4 | Fourth region update | |

Hereinafter, an example of an operation of an electronic device 101 according to various embodiments will be described. The example of the operation of the electronic device 101 described above may be applied to an example of an operation of the electronic device 101 to be described below, and thus a redundant description will be omitted.

According to various embodiments of the disclosure, the electronic device 101 may transmit identification information for identifying at least one region on which at least one content is to be displayed or transmit coordinate information to the display panel 630 (e.g., the display driver IC 631) according to whether a state of a plurality of regions 700a, 700b, 700c, and 700d are maintained. The state of a plurality of regions 700a, 700b, 700c, and 700d may include at least one of a location, a shape, or an area of the regions.

Figure 20:
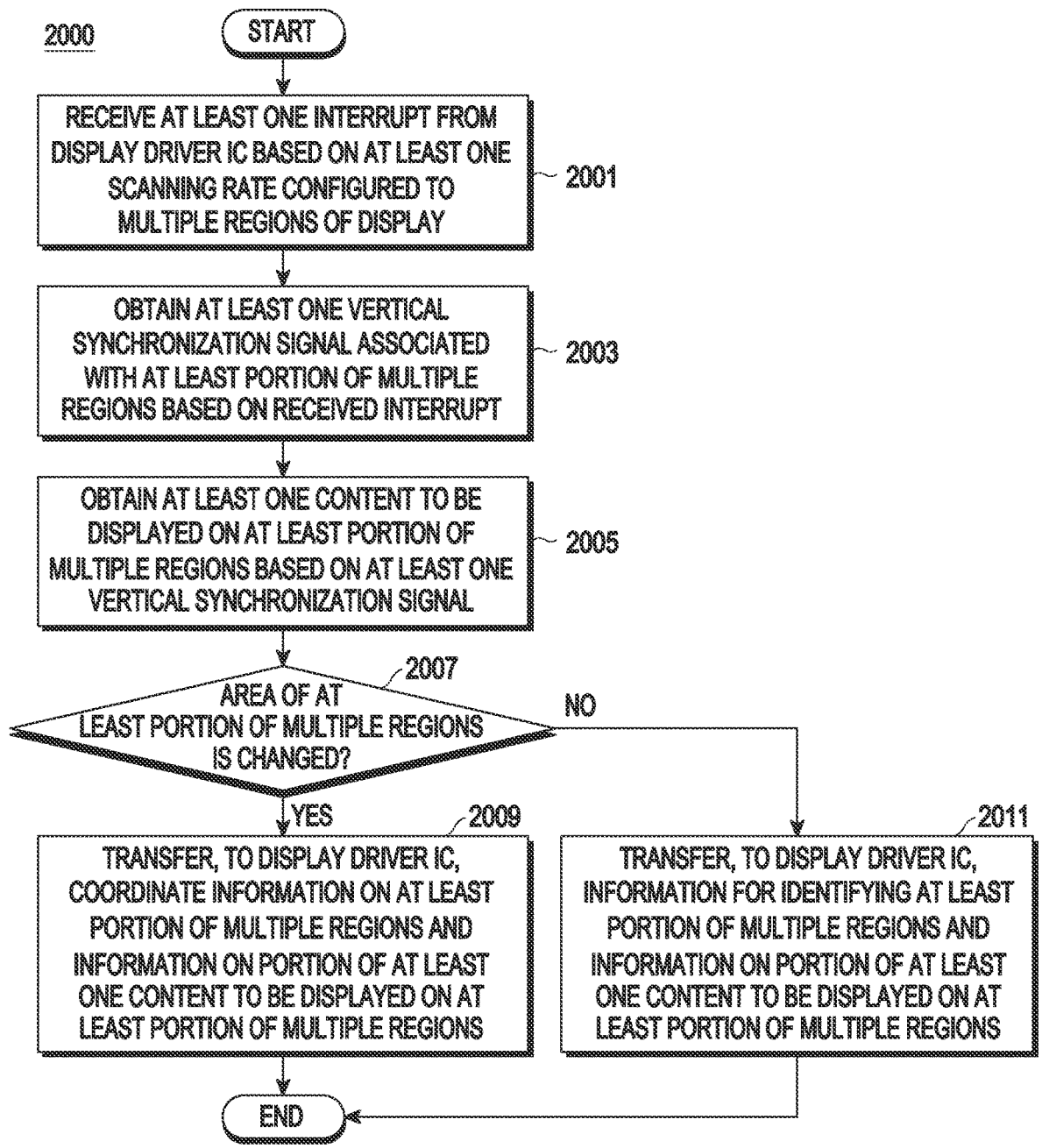
FIG. 20 is a flowchart for illustrating an operation of an electronic device according to an embodiment of the disclosure.

FIG. 20 is a flowchart 2000 for illustrating an example of an operation of an electronic device 101 according to an embodiment of the disclosure. The operations shown in FIG. 20 are not limited to the described order and may be performed in various orders. In addition, according to various embodiments of the disclosure, more operations or the less operations than the operations shown in FIG. 20 may be performed. Hereinafter, FIG. 20 will be described with reference to FIG. 21.

Figure 21:
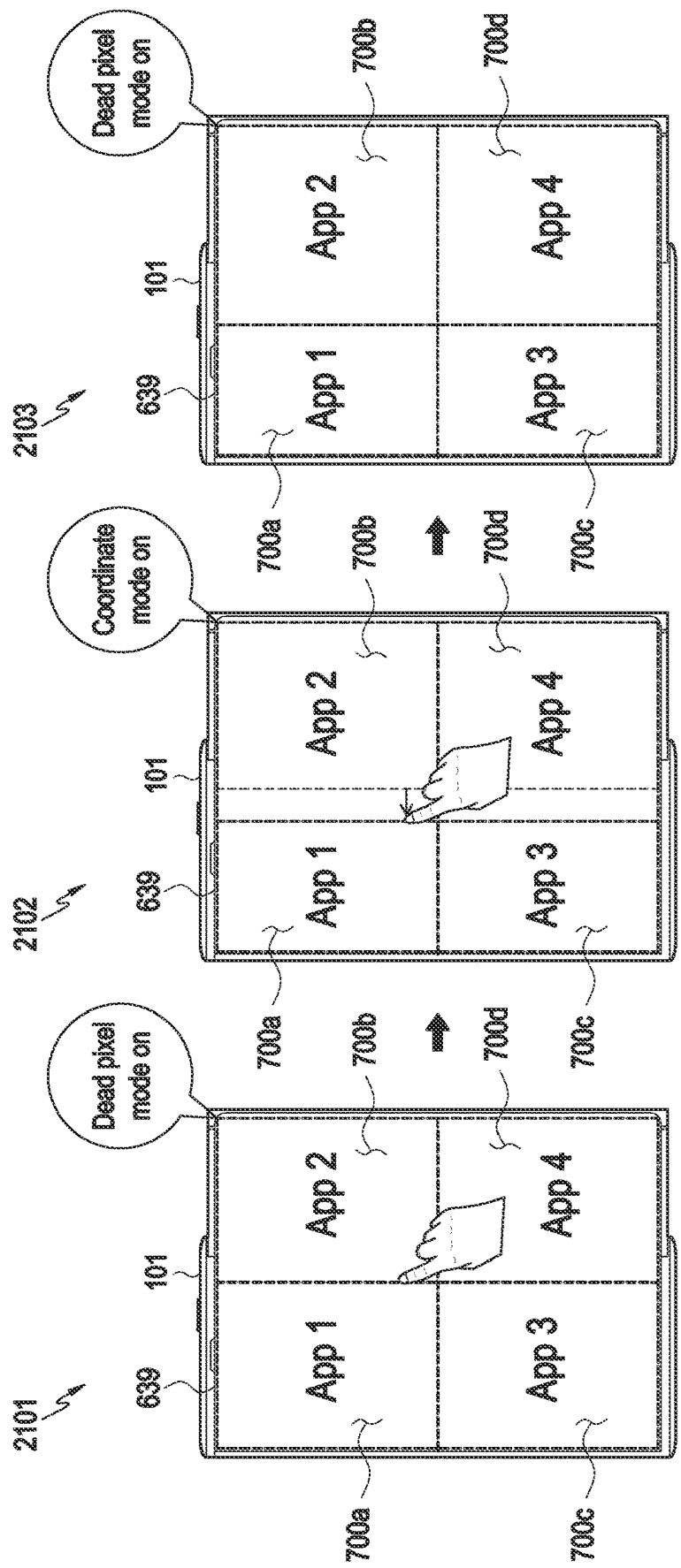
FIG. 21 is a diagram for illustrating an operation of configuring an identification information transmission mode according to whether a state of a plurality of regions of an electronic device according to an embodiment of the disclosure.

FIG. 21 is a diagram for illustrating an operation of configuring an identification information transmission mode according to whether a state of a plurality of regions of an electronic device according to an embodiment of the disclosure.

Referring to FIG. 21, according to various embodiments of the disclosure, in operation 2001, the electronic device 101 may receive at least one interrupt from the display driver IC 631 based on at least one scanning rate configured to a plurality of regions 700a, 700b, 700c, and 700d of the display 639. For example, in case that the display driver IC 631 generates a vertical synchronization signal at a designated period to display a frame image for each of a plurality of regions 700a, 700b, 700c, and 700d based on information on a scanning rate for each of the plurality of regions 700a, 700b, 700c, and 700d (e.g., the first regions 700a, the second region 700b, the third regions 700c, and the fourth region 700d), the processor 650 (e.g., the display control module 655) may receive an interrupt at a designated period from the display panel 630 through an interface. Operation 2001 of the electronic device 101 is performed in the same manner as operation 1101 of the electronic device 101 as described above, and thus a redundant description will be omitted.

According to various embodiments of the disclosure, the electronic device 101 may obtain at least one vertical synchronization signal associated with at least a portion of a plurality of regions 700a, 700b, 700c, and 700d based on the received interrupt in operation 2003 and may obtain at least one content to be displayed on at least a portion of the plurality of regions 700a, 700b, 700c, and 700d based on the at least one vertical synchronization signal in operation 2005. For example, the electronic device 101 (e.g., the display control module 655) may identify information on at least one region on which a content is to be displayed at a time point when an interrupt is received based on the obtained information and generate (or obtain) at least one vertical synchronization signal corresponding to the identified at least one region. The electronic device 101 (e.g., the content obtainment module 651) may request a screen update to at least one application corresponding to the generated at least one vertical synchronization signal and obtain at least one content (e.g., a screen, surface, and view) from the at least one application. Operations 2003 to 2005 of the electronic device 101 may be performed in the same manner as operations 1103 to 1105 of the electronic device 101 described above, and thus a redundant description will be omitted.

According to various embodiments of the disclosure, in operation 2007, the electronic device 101 may determine whether an area of at least a portion of a plurality of regions 700a, 700b, 700c and 700d is changed. For example, as shown in 2101, 2102, and 2103 of FIG. 21, the electronic device 101 may change an area of at least a portion of a plurality of regions 700a, 700b, 700c and 700d by a user input. In an embodiment of the disclosure, the electronic device 101 may display an object (e.g., a boundary line) for distinguishing a plurality of regions 700a, 700b, 700c and 700d and in case that the object is moved by a user input (e.g., dragging), change an area of at least a portion of a plurality of regions 700a, 700b, 700c and 700d according to the movement. Without limitation thereto, the plurality of regions 700a, 700b, 700c, and 700d may change an area thereof based on occurrence of various events. The electronic device 101 may determine whether the area of at least a portion is changed and configure a mode of the electronic device 101. The mode of the electronic device 101 may include a first mode (e.g., a coordinate mode) for transmitting coordinate information of a content to be displayed to the display driver IC 631 and a second mode (e.g., a dead pixel mode) for transmitting identification information of a region to be displayed to the display driver IC 631. Without limitation thereto, the electronic device 101 may determine whether various types of characteristics of the regions, such as shapes and positions are changed, in addition to an area of at least a portion of the plurality of regions 700a, 700b, 700c, and 700d, configure the first mode (e.g., the coordinate mode) when the characteristic is changed, and configure a second mode (e.g., the dead pixel mode) when the characteristic is not changed.

According to various embodiments of the disclosure, in case that the characteristic of the plurality of regions 700a, 700b, 700c, and 700d is changed, in operation 2009, the electronic device 101 may transfer, to the display driver IC 631, information on a portion of the at least one content to be displayed on at least a portion of the plurality of regions 700a, 700b, 700c, and 700d and coordinate information on at least a portion of the plurality of regions 700a, 700b, 700c, and 700d. For example, as shown in 2102 of FIG. 21, the processor 650 (e.g., the display control module 655) may configure a mode of the electronic device 101 as the first mode (e.g., the coordinate mode) for transmitting coordinate information of a content to be displayed to the display driver IC 631 in case that an area of at least a portion of the plurality of regions 700a, 700b, 700c, and 700d is changed. The processor 650 (e.g., the display control module 655) may transmit information indicating the first mode (e.g., the coordinate mode) together with the obtained content and coordinate information on the content. Accordingly, the display driver IC 631 may perform an operation of identifying that the electronic device 101 is in the first mode, based on the information indicating the first mode (e.g., the coordinate mode) and displaying content on the display 639 based on the obtained content and coordinate information of the content. The operation of the display driver IC 631 for displaying content may be performed in the same manner as the description above, and thus the overlapping description will be omitted.

According to various embodiments of the disclosure, in case that the characteristic of the plurality of regions 700a, 700b, 700c, and 700d is not changed (or maintained), in operation 2011, the electronic device 101 may transfer, to the display driver IC 631, information on a portion of the at least one content to be displayed on at least a portion of the plurality of regions 700a, 700b, 700c, and 700d and coordinate information for identifying at least a portion of the plurality of regions 700a, 700b, 700c, and 700d. For example, as shown in 2101 and 2103 of FIG. 21, the processor 650 (e.g., the display control module 655) may configure a mode of the electronic device 101 to be the second mode (e.g., the dead pixel mode) for transmitting identification information to be displayed to the display driver IC 631 in case that an area of at least a portion of the plurality of regions 700a, 700b, 700c, and 700d is not changed (or maintained). In an embodiment of the disclosure, the processor 650 may configure a mode of the electronic device 101 to be the second mode in case that a time during which an area of at least a portion of the plurality of regions 700a, 700b, 700c, and 700d is not changed is maintained for a predetermined time or more. The processor 650 (e.g., the display control module 655) may transmit information indicating the second mode (e.g., the dead pixel mode) together with the obtained content and information (e.g., dead pixel information) for identifying regions to be displayed at a next time point. Accordingly, the display driver IC 631 may perform an operation of identifying that the electronic device 101 is in the second mode, based on the information indicating the second mode (e.g., the dead pixel mode) and displaying content on the display 639 based on the obtained content and dead pixel information of the content. The operation of the display driver IC 631 for displaying content may be performed in the same manner as the description above, and thus the overlapping description will be omitted.

Various embodiments of the disclosure may provide an electronic device (e.g., the electronic device 101 in FIG. 1) including a display driver IC (e.g., the display driver IC 631 in FIG. 6), a display (e.g., the display 639 in FIG. 6), and at least one processor (e.g., the processor 650 in FIG. 6), wherein the at least one processor (e.g., the processor 650 in FIG. 6) is configured to receive an interrupt from the display driver IC (e.g., the display driver IC 631 in FIG. 6) based on a plurality of scanning rates configured for a plurality of regions of the display (e.g., the display 639 in FIG. 6), obtain a plurality of vertical synchronization signals associated with a portion of the plurality of regions, based on the received interrupt, obtain content to be displayed on a portion of the plurality of regions based on the plurality of vertical synchronization signals, synthesize a portion of content based on the coordinate information on the content, and transfer, to the display driver IC (e.g., the display driver IC 631 in FIG. 6), information on a portion of the synthesized content and information on a remaining portion of the synthesized content so that a portion of the synthesized content and a remaining portion of the synthesized content are displayed on a portion of the plurality of regions.

Various embodiments of the disclosure may provide the electronic device (e.g., the electronic device 101 in FIG. 1), wherein the at least one processor (e.g., the processor 650 in FIG. 6) is configured to identify a portion of the plurality of regions on which the content is to be displayed at a first time point at which the interrupt is received, based on the plurality of scanning rates configured for the plurality of regions and obtain the plurality of vertical synchronization signals corresponding to the identified portion of the plurality of regions.

Various embodiments of the disclosure may provide the electronic device (e.g., the electronic device 101 in FIG. 1), wherein the at least one processor (e.g., the processor 650 in FIG. 6) is configured to receive a first interrupt from the display driver IC (e.g., the display driver IC 631 in FIG. 6) after the first time point at which the interrupt is received, identify at least a portion of the plurality of regions, on which the at least one content is to be displayed at a second time point at which the first interrupt is received, based on the plurality of scanning rates configured to the plurality of regions, and obtain at least one first vertical synchronization signal corresponding to the identified portion of the plurality of regions.

Various embodiments of the disclosure may provide the electronic device (e.g., the electronic device 101 in FIG. 1), wherein the at least one processor (e.g., the processor 650 in FIG. 6) is configured to execute multiple applications, obtain screens of some applications corresponding to the plurality of vertical synchronization signals among the plurality of applications based on obtaining the plurality of vertical synchronization signals, and obtain coordinate information of the screens.

Various embodiments of the disclosure may provide the electronic device (e.g., the electronic device 101 in FIG. 1), wherein the at least one processor (e.g., the processor 650 in FIG. 6) is configured to identify some applications corresponding to the plurality of vertical synchronization signals among the plurality of applications, request a screen update to the identified some applications among the plurality of applications, and obtain screens of the applications and coordinate information on the screens based on the request.

Various embodiments of the disclosure may provide the electronic device (e.g., the electronic device 101 in FIG. 1), wherein the at least one processor (e.g., the processor 650 in FIG. 6) is configured to obtain a first vertical synchronization signal among the plurality of vertical synchronization signals and obtain remaining at least one vertical synchronization signal among the plurality of vertical synchronization signals during a designated time from a time point at which the first vertical synchronization signal is received.

Various embodiments of the disclosure may provide the electronic device (e.g., the electronic device 101 in FIG. 1), wherein the designated time is configured to be shorter than a period corresponding to a highest scanning rate among the plurality of scanning rates.

Various embodiments of the disclosure may provide the electronic device (e.g., the electronic device 101 in FIG. 1), wherein first screens synthesizable in units of rectangles among the screens of the some applications are identified based on the coordinate information of the screens, the identified first screens are synthesized, first coordinate information of the synthesized first screens is obtained, and the synthesized first screens, the first coordinate information of the first screens, at least one screen other than the synthesized first screens among the screens of the some applications, and second coordinate information of at least one screen are configured to be transmitted to the display driver IC (e.g., the display driver IC 631 in FIG. 6).

Various embodiments of the disclosure may provide the electronic device (e.g., the electronic device 101 in FIG. 1), wherein the at least one processor (e.g., the processor 650 in FIG. 6) is configured to identify the first screens synthesizable with a largest area in units of rectangles among the screens of some applications based on the coordinate information of the screens.

Various embodiments of the disclosure may provide the electronic device (e.g., the electronic device 101 in FIG. 1), wherein the at least one processor (e.g., the processor 650 in FIG. 6) is configured to transfer, to the display driver IC (e.g., the display driver IC 631 in FIG. 6), identification information on at least a portion of the plurality of regions, on which the at least one content is to be displayed at the second time point together with information on a portion of the synthesized content and information on a remaining portion of the synthesized content and control the display driver IC (e.g., the display driver IC 631 in FIG. 6) to identify at least a portion of the plurality of regions at the second time point based on the identification information.

Various embodiments of the disclosure may provide the electronic device (e.g., the electronic device 101 in FIG. 1), wherein the display driver IC (e.g., the display driver IC 631 in FIG. 6) is configured to display the at least one content on the identified at least a portion of the plurality of regions at the second time point.

Various embodiments of the disclosure may provide the electronic device (e.g., the electronic device 101 in FIG. 1), wherein the identification information on at least a portion of the plurality of regions includes information on a dead pixel of at least a portion of the plurality of regions and the display driver IC (e.g., the display driver IC 631 in FIG. 6) is configured to identify at least a portion of the plurality of regions corresponding to the information on the dead pixel.

Various embodiments of the disclosure may provide the electronic device (e.g., the electronic device 101 in FIG. 1), wherein the at least one processor (e.g., the processor 650 in FIG. 6) is configured to identify whether an area of at least a portion of the plurality of regions is changed, transfer identification information on at least a portion of the plurality of regions to the display driver IC (e.g., the display driver IC 631 in FIG. 6) in case that the area of at least a portion of the plurality of regions is maintained and transfer, to the display driver IC (e.g., the display driver IC 631 in FIG. 6), first coordinate information of a portion of the synthesized content and second coordinate information of a remaining portion of the synthesized content together with information on a portion of the synthesized content and information on a remaining portion of the synthesized content in case that an area of at least a portion of the plurality of regions is changed.

Various embodiment of the disclosure may provide an operating method for an electronic device (e.g., the electronic device 101 in FIG. 1), the method including an operation of receiving an interrupt from the display driver IC (e.g., the display driver IC 631 in FIG. 6) based on a plurality of scanning rates configured for a plurality of regions of the display (e.g., the display 639 in FIG. 6), an operation of obtaining a plurality of vertical synchronization signals associated with a portion of the plurality of regions, based on the received interrupt, an operation of obtaining content to be displayed on a portion of the plurality of regions based on the plurality of vertical synchronization signals, an operation of synthesizing a portion of content based on the coordinate information on the content, and an operation of transferring, to the display driver IC (e.g., the display driver IC 631 in FIG. 6), information on a portion of the synthesized content and information on a remaining portion of the synthesized content so that a portion of the synthesized content and a remaining portion of the synthesized content are displayed on a portion of the plurality of regions.

Various embodiments of the disclosure may provide the operating method including an operation of identifying a portion of the plurality of regions on which the content is to be displayed at a first time point at which the interrupt is received, based on a plurality of scanning rates configured to the plurality of regions and an operation of obtaining the plurality of vertical synchronization signals corresponding to the identified portion of the plurality of regions.

Various embodiments of the disclosure may provide the operating method including an operation of receiving a first interrupt from the display driver IC (e.g., the display driver IC 631 in FIG. 6) after the first time point at which the interrupt is received, an operation of identifying at least a portion of the plurality of regions, on which the at least one content is to be displayed at a second time point at which the first interrupt is received, based on the plurality of scanning rates configured to the plurality of regions, and an operation of obtaining at least one first vertical synchronization signal corresponding to the identified portion of the plurality of regions.

Various embodiments of the disclosure may provide the operating method including an operation of executing a plurality of applications and an operation of obtaining screens of some applications corresponding to the plurality of vertical synchronization signals among the plurality of applications based on obtaining the plurality of vertical synchronization signals and obtaining coordinate information of the screens.

Various embodiments of the disclosure may provide the operating method including an operation of executing multiple applications and an operation of identifying some applications corresponding to the plurality of vertical synchronization signals among the plurality of applications, an operation of requesting a screen update to applications among the identified some plurality of applications, and an operation of obtaining screens of the applications and coordinate information on the screens based on the request.

Various embodiments of the disclosure may provide the operating method including an operation of executing a plurality of applications and an operation of obtaining a first vertical synchronization signal among the plurality of vertical synchronization signals and an operation of obtaining remaining at least one vertical synchronization signal among the plurality of vertical synchronization signals during a predetermined time from a time point at which the first vertical synchronization signal is received.

Various embodiment of the disclosure may provide an electronic device (e.g., the electronic device 101 in FIG. 1) including a display driver IC (e.g., the display driver IC 631 in FIG. 6), a display (e.g., the display 639 in FIG. 6), and at least one processor (e.g., the processor 650 in FIG. 6), wherein the at least one processor (e.g., the processor 650 in FIG. 6) is configured to receive an interrupt from the display driver IC (e.g., the display driver IC 631 in FIG. 6) based on a plurality of scanning rates configured for a plurality of regions of the display (e.g., the display 639 in FIG. 6), obtain at least one vertical synchronization signal associated with at least a portion of the plurality of regions (at least a portion of the plurality of regions are associated with a first frame) based on the received interrupt, obtain at least one content to be displayed on at least a portion of the plurality of regions during the first frame, based on the at least one vertical synchronization signal, and transfer, to the display driver IC (e.g., the display driver IC 631 in FIG. 6), information on a portion of the at least one content so that a portion of the at least one content is displayed on at least a portion of the plurality of regions.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
 a display driver integrated circuit (IC);
 a display;
 memory storing one or more computer programs; and one or more processors communicatively coupled to the display driver IC, the display, and the memory, wherein the one or more computer programs include computer-executable instructions that, when executed by the one or more processors individually or collectively, cause the electronic device to:

receive an interrupt from the display driver IC, based on a plurality of scanning rates configured for a plurality of regions of the display, identify a portion of the plurality of regions on which content is to be displayed at a first time point at which the interrupt is received, based on the plurality of scanning rates configured for the plurality of regions, obtain a plurality of vertical synchronization signals associated with the portion of the plurality of regions, based on the received interrupt, obtain content to be displayed on the portion of the plurality of regions, based on the plurality of vertical synchronization signals, synthesize a portion of content based on coordinate information of the content, and transfer, to the display driver IC, information on a portion of the synthesized content and information on a remaining portion of the synthesized content so that the portion of the synthesized content and the remaining portion of the synthesized content are displayed on the portion of the plurality of regions.

2. The electronic device of claim 1, wherein the at one or more computer programs further include computer-executable instructions that, when executed by the one or more processors individually or collectively, cause the electronic device to:

obtain the plurality of vertical synchronization signals corresponding to the identified portion of the plurality of regions.

3. The electronic device of claim 2, wherein the at one or more computer programs further include computer-executable instructions that, when executed by the one or more processors individually or collectively, cause the electronic device to:

receive a first interrupt from the display driver IC after the first time point at which the interrupt is received, identify at least a portion of the plurality of regions, on which at least one content is to be displayed at a second time point at which the first interrupt is received, based on the plurality of scanning rates configured for the plurality of regions, and obtain at least one first vertical synchronization signal corresponding to the at least portion of the plurality of regions.

4. The electronic device of claim 3, wherein the one or more computer programs further include computer-executable instructions that, when executed by the one or more processors individually or collectively, cause the electronic device to:

transfer, to the display driver IC, identification information on the at least portion of the plurality of regions, on which the at least one content is to be displayed at the second time point, together with information on the portion of the synthesized content and information on the remaining portion of the synthesized content; and control the display driver IC to identify the at least portion of the plurality of regions at the second time point based on the identification information.

5. The electronic device of claim 4, wherein the display driver IC is configured to display the at least one content on the identified the at least portion of the plurality of regions at the second time point.

6. The electronic device of claim 4, wherein the identification information on at least a portion of the plurality of regions includes information on a dead pixel of at least a portion of the plurality of regions, and wherein the display driver IC is configured to identify the at least portion of the plurality of regions corresponding to information on the dead pixel.

7. The electronic device of claim 4, wherein the one or more computer programs further configured include computer-executable instructions that. when executed by the one or more processors individually or collectively, cause the electronic device to:

identify whether an area of the at least portion of the plurality of regions is changed, transfer identification information on the at least portion of the plurality of regions to the display driver IC in case that the area of the at least portion of the plurality of regions is maintained, and transfer, to the display driver IC, first coordinate information of the portion of the synthesized content and second coordinate information of the remaining portion of the synthesized content together with information on the portion of the synthesized content and information on the remaining portion of the synthesized content in case that the area of the at least portion of the plurality of regions is changed.

8. The electronic device of claim 2, wherein the at one or more computer programs further include computer-executable instructions that, when executed by the one or more processors individually or collectively, cause the electronic device to:

execute a plurality of applications, obtain screens of at least one application of the plurality of applications corresponding to the plurality of vertical synchronization signals among the plurality of applications based on obtaining the plurality of vertical synchronization signals, and obtain coordinate information of the screens.

9. The electronic device of claim 8, wherein the one or more computer programs further configured include computer-executable instructions that, when executed by the one or more processors individually or collectively, cause the electronic device to:

identify the at least one application of the plurality of applications corresponding to the plurality of vertical synchronization signals among the plurality of applications, request a screen update to the at least one application of the plurality of applications among the plurality of applications, and obtain screens of the at least one application of the plurality of applications and coordinate information on the screens based on the request.

10. The electronic device of claim 8, wherein the at one or more computer programs further include computer-executable instructions that, when executed by the one or more processors individually or collectively, cause the electronic device to:

obtain a first vertical synchronization signal among the plurality of vertical synchronization signals, and obtain at least one vertical synchronization signal among a plurality of vertical synchronization signals other than the first vertical synchronization signal among the plurality of vertical synchronization signals during a designated time from a time point at which the first vertical synchronization signal is received.

11. The electronic device of claim 10, wherein the designated time is configured to be shorter than a period corresponding to a highest scanning rate among the plurality of scanning rates.

12. The electronic device of claim 8, wherein the at one or more computer programs further include computer-executable instructions that, when executed by the one or more processors individually or collectively, cause the electronic device to:
    identify first screens synthesizable in units of rectangles among the screens of the at least one application of the plurality of applications, based on the coordinate information of the screens,
    synthesize the identified first screens,
    obtain first coordinate information of the synthesized first screens, and transfer the synthesized first screens, the first coordinate information of the first screens, at least one screen other than the synthesized first screens among screens of the at least one application of the plurality of applications, and second coordinate information of at least one screen, to the display driver IC.

13. The electronic device of claim 12, wherein the one or more computer programs further include computer-executable instructions that, when executed by the one or more processors individually or collectively, cause the electronic device to identify the first screens synthesizable with a largest area in units of rectangles among the screens of the at least one application of the plurality of applications based on the coordinate information of the screens.

14. A method performed by an electronic device, the method comprising:
    receiving an interrupt from a display driver integrated circuit (IC) of the electronic device, based on a plurality of scanning rates configured for a plurality of regions of a display of the electronic device;
    identifying a portion of the plurality of regions on which content is to be displayed at a first time point at which the interrupt is received, based on the plurality of scanning rates configured for the plurality of regions;
    obtaining a plurality of vertical synchronization signals associated with the portion of the plurality of regions, based on the received interrupt;
    obtaining content to be displayed on the portion of the plurality of regions based on the plurality of vertical synchronization signals;
    synthesizing a portion of content based on coordinate information on the content; and
    transferring, to the display driver IC, information on a portion of the synthesized content and information on a remaining portion of the synthesized content so that the portion of the synthesized content and the remaining portion of the synthesized content are displayed on the portion of the plurality of regions.

15. The method of claim 14, further comprising:
    obtaining the plurality of vertical synchronization signals corresponding to the identified portion of the plurality of regions.

16. The method of claim 15, further comprising:
    receiving a first interrupt from the display driver IC after the first time point at which the interrupt is received;
    identifying at least a portion of the plurality of regions, on which at least one content is to be displayed at a second time point at which the first interrupt is received, based on the plurality of scanning rates configured for the plurality of regions; and
    obtaining at least one first vertical synchronization signal corresponding to the at least portion of the plurality of regions.

17. The method of claim 15, further comprising:
    executing a plurality of applications;
    obtaining screens of at least one application of the plurality of applications corresponding to the plurality of vertical synchronization signals among the plurality of applications based on obtaining the plurality of vertical synchronization signals; and
    obtaining coordinate information of the screens.

18. The method of claim 17, further comprising:
    identifying the at least one application of the plurality of applications corresponding to the plurality of vertical synchronization signals among the plurality of applications;
    requesting a screen update to the at least one application of the plurality of applications among the plurality of applications; and
    obtaining screens of the at least one application of the plurality of applications and coordinate information on the screens based on the request.

19. The method of claim 17, further comprising:
    obtaining a first vertical synchronization signal among the plurality of vertical synchronization signals; and
    obtaining at least one vertical synchronization signal among a plurality of vertical synchronization signals other than the first vertical synchronization signal among the plurality of vertical synchronization signals during a designated time from a time point at which the first vertical synchronization signal is received.

20. The method of claim 19, wherein the designated time is configured to be shorter than a period corresponding to a highest scanning rate among the plurality of scanning rates.

* * * * *